(12) United States Patent
Takenaka et al.

(10) Patent No.: US 8,135,528 B2
(45) Date of Patent: Mar. 13, 2012

(54) VEHICLE CONTROL DEVICE

(75) Inventors: Toru Takenaka, Wako (JP); Hiroshi Kono, Wako (JP); Takayuki Toyoshima, Wako (JP); Hiroyuki Urabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 843 days.

(21) Appl. No.: 12/278,455

(22) PCT Filed: May 24, 2007

(86) PCT No.: PCT/JP2007/060593
§ 371 (c)(1),
(2), (4) Date: Aug. 6, 2008

(87) PCT Pub. No.: WO2008/001560
PCT Pub. Date: Jan. 3, 2008

(65) Prior Publication Data
US 2009/0024293 A1    Jan. 22, 2009

(30) Foreign Application Priority Data

Jun. 30, 2006 (JP) .................................. 2006-181984

(51) Int. Cl.
B60T 8/24 (2006.01)
B62D 6/00 (2006.01)
(52) U.S. Cl. ............................. 701/72; 701/42; 701/82
(58) Field of Classification Search .................. 701/1, 37, 701/41, 42, 70, 72, 82, 83, 88; 180/446; 303/139, 140, 146
See application file for complete search history.

(56) References Cited

U.S. PATENT DOCUMENTS

| 5,481,457 | A | 1/1996 | Yamamoto et al. |
| 5,931,887 | A * | 8/1999 | Hac .................................. 701/71 |
| 6,035,251 | A * | 3/2000 | Hac et al. ......................... 701/70 |
| 6,122,584 | A * | 9/2000 | Lin et al. .......................... 701/70 |
| 6,547,343 | B1 * | 4/2003 | Hac ................................ 303/146 |
| 2004/0158375 | A1 * | 8/2004 | Tsutsumi et al. ............... 701/41 |
| 2006/0069489 | A1 * | 3/2006 | Chen et al. ...................... 701/70 |
| 2007/0145819 | A1 * | 6/2007 | Lin et al. ....................... 303/146 |
| 2008/0133066 | A1 * | 6/2008 | Takenaka ......................... 701/1 |

FOREIGN PATENT DOCUMENTS

EP    1 775 188    4/2007
JP    07-304460    11/1995

(Continued)

*Primary Examiner* — John Nguyen
*Assistant Examiner* — Brian J Broadhead
(74) *Attorney, Agent, or Firm* — Rankin, Hill & Clark LLP

(57) ABSTRACT

An actual vehicle actuator operation control input and a model operation control input are determined by an FB distribution law such that the difference between a reference state amount determined in a vehicle model and an actual state amount of an actual vehicle approximates zero, and then an actuator device of the actual vehicle and the vehicle model are operated on the basis of the control inputs. The value of a parameter of the vehicle model set according to an actual vehicle motional state such that the attenuation property of a reference state amount when a drive manipulated variable is changed is higher than the attenuation property of an actual state amount. Accordingly, the actual vehicle actuator device is properly controlled independently of an actual vehicle motional state such that a state amount related to an actual vehicle motion approximates a vehicle state amount on a dynamic characteristic model.

5 Claims, 21 Drawing Sheets

FOREIGN PATENT DOCUMENTS

| | | |
|---|---|---|
| JP | 11-091608 | 4/1999 |
| JP | 2000-159138 | 6/2000 |
| JP | 2002-019485 | 1/2002 |
| JP | 2003-170822 | 6/2003 |
| JP | 2005-041386 | 2/2005 |
| WO | 2006/013922 | 2/2006 |

\* cited by examiner $\beta f\_act = \beta f--$ $\beta f\_act = \beta f-$ $\beta f\_act = 0$ $\beta f\_act = \beta f+$ $\beta f\_act = \beta f++$ $\beta r\_act = \beta r--$ $\beta r\_act = \beta r-$ $\beta r\_act = 0$ $\beta r\_act = \beta r+$ $\beta r\_act = \beta r++$

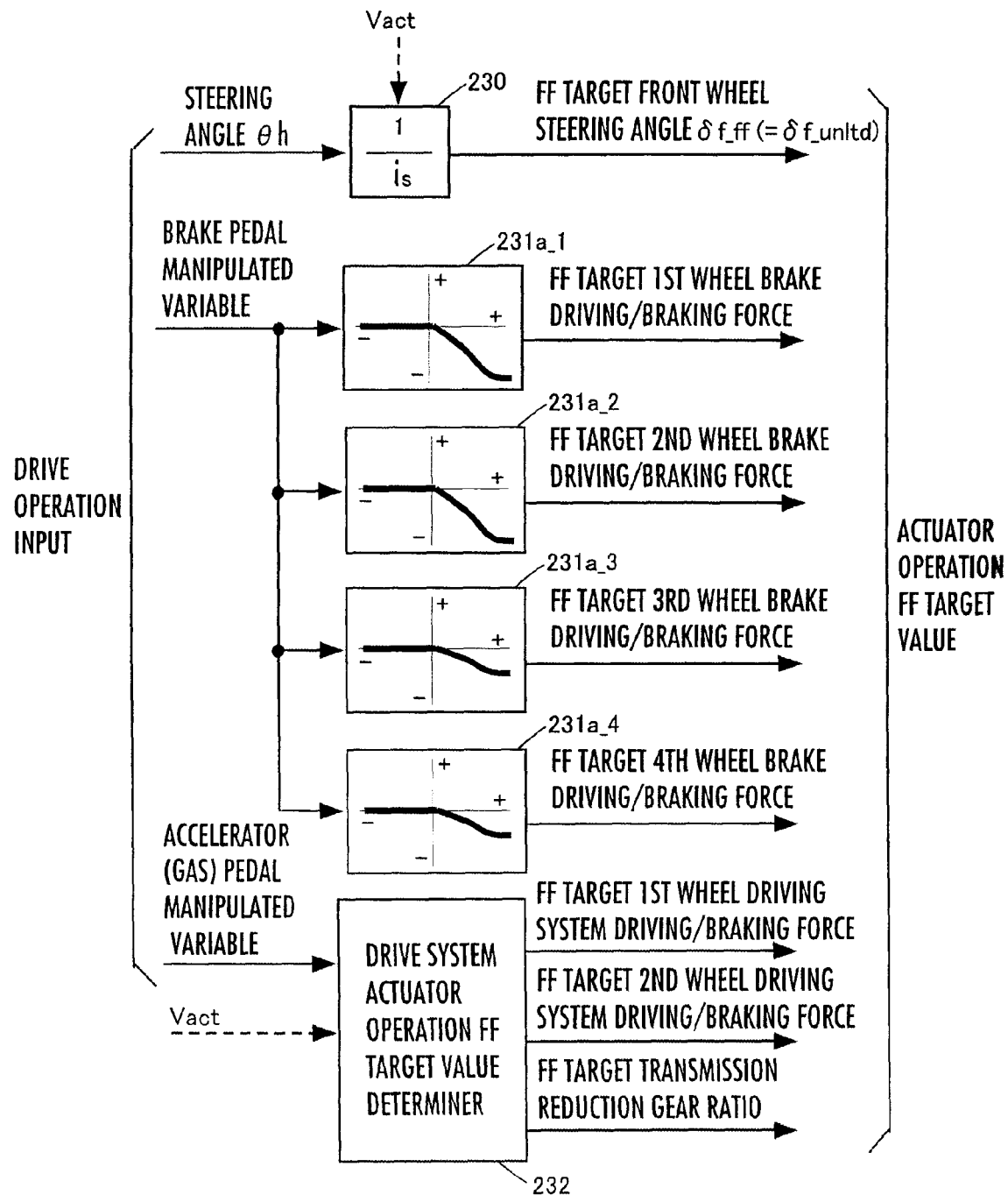

VEHICLE CONTROL DEVICE

TECHNICAL FIELD

The present invention relates to a control device of a vehicle having a plurality of wheels, such as an automobile (engine automobile), a hybrid car, and a two-wheeled motor vehicle.

BACKGROUND ART

Hitherto, there has been known a technique for controlling an actuator device provided in an actual vehicle, whereby a model representing the dynamic characteristics of a vehicle is used to set the target values of the motional state amounts, such as a yaw rate and a lateral velocity, of a vehicle, and then an actual device provided in an actual vehicle is controlled such that the state amounts of the actual vehicle follow the target values, as disclosed in, for example, Japanese Patent Application Laid-Open No. H11-91608 (hereinafter referred to as patent document 1) and Japanese Patent Application Laid-Open No. 2000-15938 (hereinafter referred to as patent document 2).

According to the technique disclosed in these patent documents 1 and 2, a target yaw rate and a target lateral velocity are set from a detection value of a vehicle velocity and a detection value of a steering angle of a steering wheel by a dynamic characteristic model having a yaw rate and a lateral velocity of a vehicle as state amounts. Then, a target value of a steering angle of a rear wheel of the vehicle required relative to the target yaw rate (a first target rear wheel steering angle) and a target value of a steering angle of a rear wheel of the vehicle required relative to the target lateral velocity (a second target rear wheel steering angle) are calculated. Further, a value (a weighted mean value) obtained by linearly coupling the first target rear wheel steering angle and the second target rear wheel steering angle is determined as the final target value of the steering angle of the rear wheel. Then, an actuator for steering the rear wheel is controlled to make the steering angle of the rear wheel of an actual vehicle follow the target value.

Further, as disclosed in, for example, PCT international publication WO2006/013922A1 (hereinafter referred to as patent document 3), the present applicant has proposed a technique whereby an actuator device of an actual vehicle is controlled to bring a state amount of the actual vehicle close to a state amount on a dynamic characteristic model of the vehicle and also the dynamic characteristic model is operated (an additional control input is supplied to the dynamic characteristic model) to bring a state amount on the dynamic characteristic model close to a state amount of the actual vehicle.

Meanwhile, when carrying out the control to make a state amount related to a motion of an actual vehicle follow a state amount on a dynamic characteristic model of a vehicle, if a change in an input, such as a steering angle of a steering wheel, causes the state amount on the dynamic characteristic model of the vehicle to develop an oscillatory response, then a state amount of the actual vehicle, which is to follow the state amount on the dynamic characteristic model, will also develop an oscillatory response. It is considered desirable, therefore, that the response characteristic (the transient response characteristic) of a state amount on the dynamic characteristic model relative to a change in an input, such as the steering angle of the steering wheel, exhibits a response characteristic having a highest possible attenuation property independently of a motional state of the actual vehicle in order to maintain a good behavior characteristic of the actual vehicle as much as possible.

Here, in the present description, "the high attenuation property" means a short time constant of attenuation of an amplitude value of an oscillatory component of a state amount (a control amount) when an input to a target system is changed in steps, that is, a high attenuation speed of the amplitude value of the oscillatory component. Incidentally, the so-called critical braking (critical damping) or over-braking (over-damping) response characteristic is a non-oscillatory response characteristic with no oscillatory component; however, it is regarded as a characteristic with a highest attenuation property.

Nevertheless, it has been difficult for the technique disclosed in the aforesaid patent documents 1 and 2 to fully satisfy the above requirement for the following reason. In general, the response characteristic of a state amount, such as a yaw rate or a lateral velocity, of an actual vehicle relative to a change in the steering angle of a steering wheel tends to exhibit an oscillatory response characteristic (a characteristic in which a state amount converges to a steady-state value while oscillating) when a traveling velocity is relatively high.

Hence, if the response characteristic of a dynamic characteristic model of a vehicle is set to a characteristic with a high attenuation property, such as a critical braking or over-braking characteristic (non-oscillatory characteristic), independently of the traveling velocity of the actual vehicle (at an arbitrary traveling velocity) according to the technique disclosed in patent documents 1 and 2, then there will be a significant discrepancy between the response characteristic of a state amount of a vehicle on the dynamic characteristic model and the response characteristic of a state amount of an actual vehicle especially when the traveling velocity of the vehicle is high. As a result, the difference between a yaw rate and a lateral velocity as the state amounts on the dynamic characteristic model and a yaw rate and a lateral velocity of an actual vehicle according to the technique disclosed in patent documents 1 and 2 will become large. Consequently, a required manipulated variable of an actuator device for making a state amount of the actual vehicle follow a state amount on the dynamic characteristic model tends to be excessive. As a result, a situation wherein it actually becomes impossible to satisfy the required manipulated variable within the capability of the actuator device frequently occurs. Further, in this case, it actually becomes difficult to make the state amount of the actual vehicle follow the state amount on the dynamic characteristic model.

Hence, according to the technique disclosed in patent documents 1 and 2, it is actually impossible to set the response characteristic of a state amount on the dynamic characteristic model of a vehicle to a characteristic with a high attenuation property, such as a non-oscillatory characteristic, independently of a traveling velocity of an actual vehicle. This means that, actually, the response characteristic of a state amount on the dynamic characteristic model of a vehicle can be set to a characteristic with a high attenuation property only in limited motional states (motional states wherein the response characteristic of a state amount of the actual vehicle becomes a characteristic with a high attenuation property), such as in a situation wherein the traveling velocity of a vehicle is low. For this reason, the technique disclosed in patent documents 1 and 2 cannot fully satisfy the aforesaid requirement.

Meanwhile, according to the technique disclosed in the aforesaid patent document 3, in addition to operating the actuator device of the actual vehicle on the basis of the difference between a state amount of the actual vehicle and a state amount on the dynamic characteristic model, the dynamic characteristic model of the vehicle is also operated so as to bring the state amount on the dynamic characteristic model close to the state amount of the actual vehicle. In other words, the difference is fed back not only to the actual vehicle but also to the dynamic characteristic model. This makes it possible to restrain the difference between the state amount of the actual vehicle and the state amount on the dynamic characteristic model from becoming excessive. Thus, as shown in patent document 3, if the difference between the state amount of the actual vehicle and the state amount on the dynamic characteristic model is fed back to both the actual vehicle and the dynamic characteristic model, then it is considered possible to restrain a required manipulated variable of the actuator device from becoming excessive even when there is a relatively large discrepancy between the response characteristic of a state amount of the actual vehicle and the response characteristic of a state amount of the vehicle on the dynamic characteristic model. Therefore, it is considered possible to make the state amount of the actual vehicle properly follow the state amount on the dynamic characteristic model.

Hence, as disclosed in patent document 3, if the difference between a state amount of the actual vehicle and a state amount on the dynamic characteristic model is fed back to both the actual vehicle and the dynamic characteristic model, then it is considered possible to set the response characteristic of a state amount on the dynamic characteristic model of a vehicle to a response characteristic with a high attenuation property independently of a motional state of the actual vehicle.

The present invention has been made in view of the background described above, and it is an object of the present invention to provide a vehicle control device capable of properly controlling an actuator device of a vehicle, independently of a motional state of the vehicle, by using a dynamic characteristic model with a high attenuation property such that the state amount related to a motion of an actual vehicle approximates the state amount of a vehicle on the dynamic characteristic model, thus allowing a good behavior characteristic of the vehicle to be maintained.

DISCLOSURE OF INVENTION

To fulfill the object, according to the present invention, there is provided a vehicle control device equipped with a drive manipulated variable detecting means which detects a drive manipulated variable that indicates a state of drive manipulation of a vehicle by a driver of the vehicle having a plurality of wheels, an actuator device provided in the vehicle so as to permit the manipulation of a predetermined motion of the vehicle, an actual state amount grasping means which detects or estimates an actual state amount vector, which is a set of the values of a plurality of types of state amounts related to a predetermined motion of an actual vehicle, a model state amount determining means which determines a model state amount vector, which is a set of the values of a plurality of types of state amounts of a vehicle on a vehicle model established beforehand as a model representing the dynamic characteristic of the vehicle, and a state amount error calculating means which calculates a state amount error, which is the difference between the value of each type of state amount of the detected or estimated actual state amount vector and the value of a state amount of each type of the determined model state amount vector, to control the operation of at least the actuator device such that the state amount error approximates zero, the vehicle control device comprising:

a state amount error response control means which determines an actual vehicle actuator operation control input for operating the actuator device of the actual vehicle and a vehicle model operation control input for manipulating a motion of the vehicle on the vehicle model on the basis of at least the calculated state amount error such that the state amount error approximates zero;

an actuator device control means which controls the operation of the actuator device on the basis of at least the determined actual vehicle actuator operation control input;

the model state amount determining means being a means which determines the model state amount vector on the basis of at least the detected drive manipulated variable and the determined vehicle model operation control input; and a vehicle model characteristics setting means which variably sets the value of at least one parameter of the vehicle model on the basis of a motional state of the actual vehicle such that the attenuation property of the value of each type of state amount of the model state amount vector based on a stepped change in the drive manipulated variable in a state wherein the vehicle model operation control input is maintained at zero will be a high attenuation characteristic which is a characteristic higher than the attenuation property of the value of each type of state amount of the actual state amount vector based on a stepped change in the drive manipulated variable in a state wherein the actual vehicle actuator operation control input is maintained at zero (a first invention).

According to the first invention, the attenuation property of the value of each type of state amount of the model state amount vector can be set to the high attenuation characteristic that is higher than the attenuation property of the value of each type of state amount of an actual state amount vector in any motion state of the vehicle by variably setting at least one parameter of the vehicle model on the basis of a motional state of the actual vehicle. In this case, especially in a motional state of the vehicle wherein the response characteristic of the value of each type of state amount of the actual state amount vector becomes an oscillatory characteristic, there will be a discrepancy between the response characteristic of the value of each type of state amount of the actual state amount vector and the response characteristic of the value of each type of state amount of the model state amount vector. However, the vehicle model operation control input supplied to the vehicle model restrains the state amount error from becoming excessive and therefore restrains the actual actuator operation control input from becoming excessive. This arrangement makes it possible to make the value of each type of state amount of the actual state amount vector properly approximate (follow) the value of each type of state amount of the model state amount vector. Moreover, the attenuation property of the value of each type of state amount of the model state amount vector is the high attenuation characteristic, so that the value of the state amount quickly converges to a steady-state value. As a result, the oscillation of the value of each type of state amount of the actual state amount vector when the drive manipulated variable changes can be restrained, allowing a good vehicle behavior characteristic to be maintained.

Thus, the first invention makes it possible to properly control the actuator device of the vehicle, independently of a motional state of a vehicle, such that a state amount related to a motion of the actual vehicle approximates a state amount of the vehicle on the vehicle model by using the vehicle model as the dynamic characteristic model with a high attenuation property. Consequently, an excellent behavior characteristic of the vehicle can be maintained.

In the present description, as described above, the response characteristic of critical braking or over-braking is a response characteristic with a highest attenuation property. Hence, in the present invention, the high attenuation characteristic in a motional state of the vehicle wherein the response characteristic of the value of each type of state amount of the actual state amount vector (the response characteristic based on the stepped change of the drive manipulated variable in the situation wherein the actual vehicle actuator operation control input is maintained at zero) leads to critical braking or over-braking means a critical braking or over-braking characteristic.

In the aforesaid first invention, preferably, the response characteristic of the value of each type of state amount of the model state amount vector based on the stepped change in the drive manipulated variable does not have an oscillatory component as much as possible in any motional state of the vehicle. Accordingly, the high attenuation characteristic is ideally a response characteristic of critical braking or over-braking (a second invention).

The second invention makes it possible to effectively restrain or remove the oscillation of the value of each type of state amount of an actual state amount vector when the drive manipulated variable changes. As a result, the behavior characteristic of the vehicle can be turned into a further improved characteristic.

Further, in the first or the second invention described above, if the plurality of types of state amounts includes, for example, two or more types of state amounts related to a side slip and a rotation about a yaw axis of the vehicle, then the attenuation property of the value of each type of state amount of the actual state amount vector based on the stepped change in the drive manipulated variable changes according to the traveling velocity of the actual vehicle. In this case, therefore, the vehicle model characteristics setting means variably sets the value of a parameter of the vehicle model is variably set according to the traveling velocity of the actual vehicle (a third invention).

The third invention makes it possible to accurately turn the attenuation property of the value of each type of state amount of a model state amount vector into the aforesaid high attenuation characteristic. The two or more types of state amounts may not separately include a state amount related to a side slip of the vehicle and a state amount related to the rotation about the yaw axis. For instance, the two or more types of state amounts may include two types of linear coupling values of a state amount related to a side slip of the vehicle and a state amount related to the rotation about the yaw axis.

In the third invention described above, if the value of a parameter of the vehicle model is variably set according to the traveling velocity of the vehicle so as to enhance the attenuation property of the value of each type of state amount of the model state amount vector, then the absolute value of an eigenvalue of the vehicle model tends to be excessive especially in a motional state of the vehicle in which the traveling velocity is relatively high. The "eigenvalue" of the vehicle model means the "eigenvalue" in a usual sense when the vehicle model is a linear model. If the vehicle model is a nonlinear model, then the above "eigenvalue" means the eigenvalue of a model obtained by linearly approximating the vehicle model at any value of each type of state amount of the model state amount vector with the vehicle model operation control input being set to zero (a model that has linearity in the vicinity of the value of the state amount).

In the motional state of the vehicle in which the traveling velocity is a relatively high velocity, as described above, the absolute value of an eigenvalue of the vehicle model is apt to become excessive. For this reason, in a velocity range wherein the traveling velocity of the vehicle is relatively high, there is a danger that the responsiveness of the value of each type of state amount of the model state amount vector based on a change in the drive manipulated variable (the changing rate of the value of each type of state amount immediately after a change in the drive manipulated variable) may become excessively higher than the responsiveness of the value of each type of state amount of an actual state amount vector. In this case, it is possible to control the state amount error to be small by the model operation control input. However, especially when the gain of the model operation control input relative to the state amount error is set to a small value, there is a danger that the state amount error immediately after a change in the drive manipulated variable becomes excessively large, causing the actual actuator operation control input to become excessive.

According to the third invention, therefore, preferably, the vehicle model characteristics setting means variably sets the value of a parameter of the vehicle model according to the traveling velocity such that the absolute value of the eigenvalue of the vehicle model becomes a predetermined value or less at least when the traveling velocity is higher than a predetermined velocity (a fourth invention).

According to the fourth invention, in addition to setting the attenuation property of the value of each type of state amount of the model state amount vector to the high attenuation characteristic, the value of a parameter of the vehicle model is set according to the traveling velocity such that the absolute value of the eigenvalue of the vehicle model becomes a predetermined value or less at least when the traveling velocity is higher than a predetermined velocity. This arrangement makes it possible to prevent the responsiveness of the value of the state amount from becoming excessively high in relation to the responsiveness of the value of each type of state amount of the actual state amount vector, while enhancing the attenuation property of the value of each type of state amount of the model state amount vector on the basis of a stepped change in the drive manipulated variable. As a result, it is possible to further securely prevent the state amount error from becoming excessive. This in turn makes it possible to further securely prevent the actual actuator operation control input from becoming excessive. Thus, it is possible to further properly carry out the control for making the value of each type of state amount of the actual state amount vector follow the value of each type of state amount of the model state amount vector.

Incidentally, in the fourth invention, the attenuation property and the responsiveness of the value of each type of state amount of the model state amount vector are to be manipulated on the basis of a traveling velocity, thus requiring two or more parameters of the vehicle model to be variably set according to the traveling velocity.

Further, in the first to the fourth inventions described above, the vehicle model characteristics setting means preferably variably sets the value of a parameter of the vehicle model such that the relationship between the steady-state value of the drive manipulated variable when the drive manipulated variable is changed in steps in a state wherein the vehicle model operation control input is maintained at zero and the steady-state value of the value of each type of state amount of the model state amount vector is maintained at a certain relationship (a fifth invention).

According to the fifth invention, the relationship between the steady-state value of a drive manipulated variable when the drive manipulated variable is changed in steps and the steady-state value of the value of each type of state amount of the model state amount vector, that is, the steady-state characteristic of the vehicle model, is maintained to be constant even if the value of a parameter of the vehicle model is variably set (independently of a change in the value of the parameter). Therefore, the steady-state characteristic of the vehicle model can be turned into a characteristic that is substantially equivalent to the steady-state characteristic of the actual vehicle (more precisely, the relationship between the steady-state value of a drive manipulated variable in the situation wherein the actual vehicle actuator operation control input is maintained at zero and the steady-state value of each type of state amount of the actual state amount vector). As a result, the state amount error in the steady state when the actual vehicle is in motion (in a state wherein the drive manipulated variable is constant and an environmental condition, such as a road surface or the like, is constant or uniform, and sufficient time has elapsed for a transient behavior to disappear) can be always controlled to be minute. Thus, the actual actuator operation control input in the steady state of the actual vehicle can be controlled to a minimum, preventing the actuator device from being excessively actuated.

BEST MODE FOR CARRYING OUT THE INVENTION

The following will describe embodiments of the vehicle control device in accordance with the present invention.

First, referring to FIG. 1, a schematic construction of a vehicle in the embodiments in the present description will be described. FIG. 1 is a block diagram illustrating the schematic construction of the vehicle. A vehicle illustrated in the embodiments in the present description is a car provided with four wheels (two wheels each at the front and the rear of the vehicle) The construction itself of the car may be a publicly known one, so that detailed illustration and explanation will be omitted in the present description.

As illustrated in FIG. 1, a vehicle 1 (car) is provided with a driving/braking device 3A (a driving/braking system) that imparts a rotational driving force (a rotational force that provides an impelling force for the vehicle 1) to driving wheels among four wheels W1, W2, W3, and W4, or imparting a braking force (a rotational force that provides a braking force for the vehicle 1) to each of the wheels W1 to W4, a steering device 3B (a steering system) for controlling steering control wheels among the four wheels W1 to S4, and a suspension device 3C (a suspension system) that resiliently supports a vehicle body 1B on the four wheels W1 to W4, as with a publicly known regular car. The wheels W1, W2, W3, and W4 are a front left wheel, a front right wheel, a rear left wheel, and a rear right wheel, respectively, of the vehicle 1. Further, the driving wheel and the steering control wheel are the two front wheels W1 and W2 in the embodiments to be described in the present description. Hence, the rear wheels W3 and W4 are driven wheels and non-steering-control wheels.

However, the driving wheels may alternatively be the two rear wheels W3 and W4 or both the front wheels W1, W2 and the rear wheels W3, W4 (the four wheels W1 through W4). Further, the steering control wheels may include not only the two front wheels W1 and W2 but the rear wheels W3 and W4 also.

These devices 3A, 3B and 3C have functions for manipulating the motions of the vehicle 1. For example, the driving/braking device 3A has a function for mainly manipulating the motions in advancing directions of the vehicle 1 (positions, velocities, accelerations and the like in the advancing directions of the vehicle 1). The steering device 3B has a function for mainly manipulating the rotational motions in the yaw direction of the vehicle 1 (postures, angular velocities, angular accelerations and the like in the yaw direction of the vehicle 1). The suspension device 3C has a function for primarily manipulating the motions in the pitch direction and the roll direction of a vehicle body 1B of the vehicle 1 (postures and the like in the pitch direction and the roll direction of the vehicle body 1B of the vehicle 1) or the motions in the vertical directions of the vehicle body 1B (mainly a height of the vehicle body 1B from a road surface (a vertical position of the vehicle body 1B relative to the wheels W1 to W4)). Incidentally, a "posture" of the vehicle 1 or the vehicle body 1B means a spatial orientation in the present description.

Supplementally, in general, side slips of the wheels W1 to W4 occur when the vehicle 1 makes turns or the like. The side slips are subjected to the influences of the steering angles of the steering control wheels of the vehicle 1, a yaw rate (an angular velocity in the yaw direction) of the vehicle 1, the driving/braking forces of the wheels W1 to W4, and the like. For this reason, the driving/braking device 3A and the steering device 3B have functions for manipulating the translational motions in lateral directions (right/left directions) of the vehicle 1. Incidentally, the "driving/braking force" of a wheel means a translational force component, which is in a longitudinal direction of the wheel, of a road surface reaction force acting on the wheel from a road surface (more specifically, in the direction of a line of intersection between a rotational plane of the wheel (a plane which passes the central point of the wheel and which is orthogonal to the rotational axis of the wheel) and a road surface or a horizontal plane). Further, in the road surface reaction force, a translational force component in the direction of the width of a wheel (the direction parallel to the rotational axis of the wheel) is referred to as a "lateral force." In the road surface reaction force, a translational force component in a direction perpendicular to a road surface or a horizontal plane is referred to as a "ground contact load."

Although not illustrated in detail, more specifically, the driving/braking device 3A is equipped with a driving system constructed of an engine (an internal-combustion engine) serving as a motive power generating source of the vehicle 1 (an impellent force generating source of the vehicle 1) and a motive power transmitting system for transmitting an output (a rotational driving force) of the engine to the driving wheels among the wheels W1 to W4, and a braking device (a braking system) that imparts braking forces to the wheels W1 to W4. The motive power transmitting system includes a transmission, a differential gear, and the like.

The vehicle 1 to be described in the embodiments is equipped with an engine as a motive power generating source; however, the vehicle 1 may alternatively be a vehicle provided with an engine and an electric motor as motive power generating sources (a so-called parallel type hybrid vehicle) or a vehicle provided with an electric motor as a motive power generating source (a so-called electric car or a series type hybrid vehicle).

Further, a steering wheel (driver's wheel), an accelerator (gas) pedal, a brake pedal, a shift lever, and the like functioning as manipulating devices 5 (man-induced manipulating devices) operated by a driver to steer the vehicle 1 (car) are provided in a vehicle interior of the vehicle 1. The illustration of the elements of the manipulating devices 5 is omitted.

The steering wheel among the manipulating devices 5 is related to an operation of the steering device 3B. More specifically, as the steering wheel is rotationally manipulated, the steering device 3B is operated in response thereto, thus steering the steering control wheels W1 and W2 among the wheels W1 to W4.

The accelerator (gas) pedal, the brake pedal, and the shift lever among the manipulating devices 5 are related to the operations of the driving/braking device 3A. More specifically, the opening of a throttle valve provided in the engine changes according to a manipulated variable (a depression amount) of the accelerator (gas) pedal so as to adjust an intake air volume and a fuel injection amount of the engine (consequently an output of the engine). Further, the braking device is operated according to a manipulated variable (a depression amount) of a brake pedal, and a braking torque based on the manipulated variable of the brake pedal is imparted to the wheels W1 to W4. Further, manipulating the shift lever changes an operation state of the transmission, such as a change gear ratio of the transmission, thus effecting the adjustment or the like of the driving torque transmitted from the engine to the driving wheels.

The drive manipulation states of the manipulating devices 5, such as the steering wheel operated by the driver (the steerer of the vehicle 1) are detected by appropriate sensors, which are not shown. Hereinafter, detection values (detection outputs of the sensors) of the drive manipulation states will be referred to as drive manipulation inputs. The drive manipulation inputs include the detection values of a steering angle, which is a rotational angle of the steering wheel, an accelerator (gas) pedal manipulated variable, which is a manipulated variable of the accelerator (gas) pedal, a brake pedal manipulated variable, which is a manipulated variable of the brake pedal, and a shift lever position, which is a manipulation position of the shift lever. The sensors that output the drive manipulation inputs correspond to the drive manipulated variable detecting means in the present invention.

In the embodiments in the present description, the driving/braking device 3A and the steering device 3B described above are adapted to permit active control of the operations thereof (consequently the motions of the vehicle 1) in response to not only the drive manipulation inputs but also factors other than the drive manipulation inputs (e.g., a motion state of the vehicle 1 or an environmental condition). Here, "to permit active control" means that the operations of the devices 3A and 3B can be controlled into the operations obtained by correcting basic operations based on the drive manipulation inputs (basic desired operations determined on the basis of drive manipulation inputs).

Specifically, the driving/braking device 3A is a driving/braking device having a function that makes it possible to actively control the difference or the ratio between a driving/braking force of the left wheels W1, W3 and a driving/braking force of the right wheels W2, W4 on at least one of the pair of the front wheels W1, W2 and the pair of the rear wheels W3, W4 through the intermediary of actuators, such as a hydraulic actuator, an electric motor, and an electromagnetic control valve, provided in the driving/braking device 3A (hereinafter, the control function will be referred to as the right/left motive power distribution control function).

To be more specific, according to the embodiments in the present description, the driving/braking device 3A is a driving/braking device capable of actively controlling the driving/braking forces to be applied to the wheels W1 to W4 (specifically, the driving/braking forces in the braking direction of the vehicle 1) by operating a braking device through the intermediary of actuators provided in the braking device (a driving/braking device capable of controlling the driving/braking forces to be applied to the wheels W1 to W4 by the braking device by increasing or decreasing the basic driving/braking forces determined on the basis of the manipulated variables of the brake pedal). Hence, the driving/braking device 3A is a driving/braking device capable of actively controlling, through the intermediary of the actuators, the difference or the ratio between a driving/braking force of the left wheels W1, W3 and a driving/braking force of the right wheels W2, W4 by the braking device on both pairs, namely, the pair of the front wheels W1, W2 and the pair of the rear wheels W3, W4 (a driving/braking device that has the right/left motive power distribution control function for both pairs of the pair of the front wheels W1, W2 and the pair of the rear wheels W3, W4).

The driving/braking device 3A may have a function that permits active control, through the intermediary of actuators provided in the driving system, of the difference or the ratio between the driving/braking forces to be applied to the front wheels W1 and W2, which are driving wheels, by operating the driving system of the driving/braking device 3A, in addition to the function for actively controlling the driving/braking forces of the wheels W1 to W4 by operating the braking device.

As the driving/braking device 3A having the right/left motive power distribution control function as described above, a publicly known one may be used.

Supplementally, the driving/braking device 3A having the right/left motive power distribution control function as described above will have a function for actively manipulating a rotational motion in the yaw direction of the vehicle 1 or a translational motion in the lateral direction by the control function thereof.

Incidentally, the driving/braking device 3A includes an actuator for generating braking torque for the braking device, an actuator for driving a throttle valve of the engine, an actuator for driving a fuel injection valve, an actuator for performing speed change drive of the transmission, and the like in addition to the actuators associated with the right/left motive power distribution control function.

Further, the steering device 3B is a steering device capable of secondarily steering the front wheels W1 and W2 by an actuator, such as an electric motor, as necessary, in addition to, for example, a function for mechanically steering the front wheels W1 and W2, which are steering control wheels, through the intermediary of a steering mechanism, such as a rack-and-pinion, according to a rotational operation of the steering wheel (a steering device capable of controlling the steering angle of the front wheels W1 and W2 by increasing or decreasing the steering angle mechanically determined on the basis of the rotational angle of the steering wheel). Alternatively, the steering device 3B is a steering device which steers the front wheels W1 and W2 by using only a driving force of an actuator (a so-called steering-by-wire steering device). Therefore, the steering device 3B is a steering device capable of actively controlling the steering angle of the front wheels W1 and W2 through the intermediary of an actuator (hereinafter referred to as an active steering device).

If the steering device 3B is an active steering device which secondarily steers the steering control wheels by an actuator in addition to mechanically steering the steering control wheels W1 and W2 according to a rotational operation of the steering wheel (hereinafter, such an active steering device will be referred to as an actuator-assisted steering device), then the resultant angle of the steering angle of a steering control wheel mechanically determined by a rotational operation of the steering wheel and a steering angle based on an operation of an actuator (a correction amount of a steering angle) will be the steering angle of the steering control wheel.

If the steering device 3B is an active steering device which steers the steering control wheels W1 and W2 by using only a driving force of an actuator (hereinafter, such an active steering device will be referred to as an actuator-driven type steering device), then a target value of the steering angle of the steering control wheels is determined on the basis of at least a detection value of the steering angle and the actuator is controlled such that the actual steering angle of the steering control wheels takes the target value.

As the steering device 3B capable of actively controlling the steering angle of the steering control wheels W1 and W2 through the intermediary of an actuator (the active steering device), a publicly known one may be used.

The steering device 3B in the embodiments in the present description is an active steering device capable of actively controlling the steering angle of the front wheels W1 and W2 through the intermediary of an actuator; alternatively, however, the steering device 3B may be a type that performs only the mechanical steering of the front wheels W1 and W2 on the basis of a rotational operation of the steering wheel (hereinafter referred to as a mechanical type steering device). Further, in a vehicle having all wheels W1 to W4 as steering control wheels, the steering device may be capable of actively controlling the steering angles of both the front wheels W1, W2 and the rear wheels W3, W4 through the intermediary of actuators. Alternatively, the steering device may be a type which steers the front wheels W1 and W2 on the basis of a rotational operation of the steering wheel only by a mechanical means, such as a rack-and-pinion, and which is capable of actively controlling only the steering angles of the rear wheels W3 and W4 through the intermediary of an actuator.

According to the embodiments in the present description, the suspension device 3C is a suspension device which passively operates on the basis of, for example, a motion of the vehicle 1.

However, the suspension device 3C may be a suspension device capable of variably controlling, for example, a damping force, hardness or the like of a damper interposed between the vehicle body 1B and the wheels W1 to W4 through the intermediary of an actuator, such as an electromagnetic control valve or an electric motor. Alternatively, the suspension device 3C may be a suspension device capable of directly controlling a stroke (an amount of vertical displacement between the vehicle body 1B and the wheels W1 to W4) of a suspension (a mechanical portion, such as a spring, of the suspension device 3C) or a vertical expanding/contracting force of the suspension generated between the vehicle body 1B and the wheels W1 to W4 by a hydraulic cylinder or a pneumatic cylinder (a so-called electronically controlled suspension). If the suspension device 3C is a suspension device capable of controlling the damping force or the hardness of the damper and the stroke or the expanding/contracting force of the suspension as described above (hereinafter referred to as the active suspension device), then the suspension device 3C permits active control of the operations thereof.

In the following explanation, among the driving/braking device 3A, the steering device 3B, and the suspension device 3C, those devices capable of actively controlling the operations as described above may be referred to generically as actuator devices 3. In the embodiments in the present description, the actuator devices 3 include the driving/braking device 3A and the steering device 3B. If the suspension device 3C is an active suspension device, then the suspension device 3C is also included in the actuator devices 3.

Further, the vehicle 1 is provided with a controller 10 which determines a manipulated variable of an actuator (a control input to the actuator; hereinafter referred to as an actuator manipulated variable) provided in each of the actuator devices 3 on the basis of the above-mentioned drive manipulation inputs and the like, and controls the operation of each of the actuator devices 3 on the basis of the actuator manipulated variable. This controller 10 is constituted of an electronic circuit unit that includes a microcomputer and the like. The controller 10 receives the drive manipulation inputs from sensors of the manipulating devices 5 and also the detection values of the state amounts of the vehicle 1, such as a traveling velocity, a yaw rate and the like of the vehicle 1, and information on traveling environments and the like of the vehicle 1 from various sensors, which are not shown. Then, based on those inputs, the controller 10 sequentially determines actuator manipulated variables at a predetermined control processing cycle so as to sequentially control the operations of the actuator devices 3.

The above has described the general schematic construction of the vehicle 1 (the car) of the embodiments in the present description. This schematic construction will be the same in all embodiments to be described below.

Supplementally, according to the embodiments in the present description, among the driving/braking device 3A, the steering device 3B, and the suspension device 3C described above, those corresponding to the actuator devices in the present invention (the actuator devices to which the present invention will be applied to carry out operation control) will be the driving/braking device 3A or the driving/braking device 3A and the steering device 3B.

Further, the controller 10 implements a variety of means in the present invention by the control processing functions thereof.

FIRST EMBODIMENT

The control processing by a controller 10 in a first embodiment will now be schematically described with reference to FIG. 2. FIG. 2 is a functional block diagram illustrating an overview of the entire control processing function of the controller 10. In the description from now on, a real vehicle 1 will be referred to as an actual vehicle 1.

The portion excluding the actual vehicle 1 in FIG. 2 (more precisely, the portion excluding the actual vehicle 1 and sensors included in a sensor/estimator 12, which will be discussed later) corresponds to the primary control processing function of the controller 10. The actual vehicle 1 in FIG. 2 is provided with the driving/braking device 3A, the steering device 3B, and the suspension device 3C described above.

As illustrated, the controller 10 is equipped with, as its main processing function components, the sensor/estimator 12, a reference manipulated variable determiner 14, a reference dynamic characteristic model 16, a subtractor 18, a feedback distribution law (FB distribution law) 20, a feedforward law (FF law) 22, the actuator operation target value synthesizer 24, and an actuator drive control unit 26. The solid-line arrows in FIG. 2 indicate primary inputs to the processing function components and the dashed-line arrows indicate secondary inputs to the processing function components.

The controller 10 carries out the processing by these processing function components at a predetermined control processing cycle to sequentially determine actuator manipulated variables at each control processing cycle. Then, the controller 10 sequentially controls the operations of the actuator devices 3 of the actual vehicle 1 on the basis of the actuator manipulated variables.

The following will present an outline of each processing function component of the controller 10 and an outline of the overall processing. Hereinafter, regarding the values of the variables determined at each control processing cycle of the controller 10, a value finally obtained by the processing at a current (a latest) control processing cycle will be referred to as a current time value, and a value finally obtained by a last time control processing cycle will be referred to as a last time value.

At each control processing cycle, the controller 10 first detects or estimates a state amount of the actual vehicle 1 or a state amount of a traveling environment of the actual vehicle 1 by the sensor/estimator 12. In the present embodiment, detection targets or estimation targets of the sensor/estimator 12 include, for example, a yaw rate γact, which is an angular velocity in the yaw direction of the actual vehicle 1, a traveling velocity Vact (ground speed) of the actual vehicle 1, a vehicle center-of-gravity point side slip angle βact, which is a side slip angle of the center-of-gravity point of the actual vehicle 1, a front wheel side slip angle βf_act, which is a side slip angle of the front wheels W1 and W2 of the actual vehicle 1, a rear wheel side slip angle βr_act, which is a side slip angle of the rear wheels W3 and W4 of the actual vehicle 1, a road surface reaction force (a driving/braking force, a lateral force, and a ground contact load), which is a reaction force acting on the wheels W1 to W4 of the actual vehicle 1 from a road surface, a slip ratio of each of the wheels W1 to W4 of the actual vehicle 1, and a steering angle δf_act of the front wheels W1 and W2 of the actual vehicle 1.

Among these detection targets or estimation targets, the vehicle center-of-gravity point side slip angle βact is an angle formed by the vector of the traveling velocity Vact of the actual vehicle 1 with respect to the longitudinal direction of the actual vehicle 1 when the actual vehicle 1 is observed from above (on the horizontal plane). The front wheel side slip angle βf_act is an angle formed by the advancing velocity vector of the front wheels W1 and W2 with respect to the longitudinal direction of the front wheels W1 and W2 when the actual vehicle 1 is observed from above (on the horizontal plane). The rear wheel side slip angle βr_act is an angle formed by the advancing velocity vector of the rear wheels W3 and W4 with respect to the longitudinal direction of the rear wheels W3 and W4 when the actual vehicle 1 is observed from above (on the horizontal plane). The steering angle δf_act is an angle formed by the rotational surfaces of the front wheels W1 and W2 with respect to the longitudinal direction of the actual vehicle 1 when the actual vehicle 1 is observed from above (on the horizontal plane).

The front wheel side slip angle βf_act may be detected or estimated on each of the front wheels W1 and W2; alternatively, however, the side slip angle of one of the front wheels W1 and W2 may be detected or estimated representatively as βf_act, or a mean value of the side slip angles of both may be detected or estimated as βf_act. The same applies to the rear wheel side slip angle βr_act.

Further, the estimation targets of the sensor/estimator 12 include a coefficient of friction between the wheels W1 to W4 of the actual vehicle 1 and an actual road surface in contact therewith (hereinafter, an estimated value of the friction coefficient will be referred to as the estimated friction coefficient μestm). Preferably, the processing for estimating a friction coefficient includes filtering or the like of a low-pass characteristic so as to restrain frequent fluctuation in the estimated friction coefficient μestm.

The sensor/estimator 12 is equipped with various sensors mounted on the actual vehicle 1 to detect or estimate the above-mentioned detection targets or estimation targets. The sensors include, for example, a rate sensor for detecting angular velocities of the actual vehicle 1, an acceleration sensor for detecting accelerations in the longitudinal direction and the lateral direction of the actual vehicle 1, a velocity sensor for detecting the traveling velocity (ground speed) of the actual vehicle 1, a rotational velocity sensor for detecting the rotational velocities of the wheels W1 to W4 of the actual vehicle 1, and a force sensor for detecting road surface reaction forces acting on the wheels W1 to W4 of the actual vehicle 1 from a road surface.

In this case, for an estimation target that cannot be directly detected by a sensor installed in the actual vehicle 1 among the detection targets or the estimation targets, the sensor/estimator 12 estimates the estimation target by an observer or the like on the basis of a detection value of a state amount correlated to the estimation target or the value or a target value of an actuator manipulated variable determined by the controller 10. For instance, the vehicle center-of-gravity point side slip angle βact is estimated on the basis of mainly a detection value of the acceleration sensor installed in the actual vehicle 1. Further, for example, the friction coefficient is estimated by a publicly known method on the basis of mainly a detection value of the acceleration sensor.

Supplementally, the sensor/estimator 12 has a function as an actual state amount grasping means in the present invention. In the present embodiment, the type of a first state amount related to vehicle motions includes a vehicle yaw rate and a vehicle center-of-gravity point side slip angle. In this case, the yaw rate has a meaning as a state amount related to the rotational motions in the yaw direction of the vehicle, and the vehicle center-of-gravity point side slip angle has a meaning as a state amount related to the side slip of the vehicle (the lateral translational motion of the vehicle). Hence, the set of the yaw rate γact and the vehicle center-of-gravity point side slip angle βact is detected or estimated by the sensor/estimator 12 as an actual state amount vector in the present invention.

Hereinafter, the designations of the state amounts or the like of the actual vehicle 1 to be detected or estimated by the sensor/estimator 12 will be frequently accompanied by "actual." For instance, the yaw rate γact of the actual vehicle 1, the traveling velocity Vact of the actual vehicle 1, and the vehicle center-of-gravity point side slip angle βact of the actual vehicle 1 will be referred to as the actual yaw rate γact, the actual traveling velocity Vact, and the actual vehicle center-of-gravity point side slip angle βact, respectively.

Subsequently, the controller 10 determines, by a reference manipulated variable determiner 14, a reference model manipulated variable as an input to a reference dynamic characteristic model 16, which will be discussed later. In this case, the reference manipulated variable determiner 14 receives a drive manipulation input detected by a sensor of the manipulating devices 5 and determines the reference model manipulated variable on the basis of at least the drive manipulation input.

More specifically, in the present embodiment, the reference model manipulated variable determined by the reference manipulated variable determiner 14 is the steering angle of the front wheels of a vehicle on a reference dynamic characteristic model 16, which will be discussed later, (hereinafter referred to as the model front wheel steering angle). To determine the model front wheel steering angle, a steering angle θh (current time value) of the drive manipulation input is input as a main input amount to the reference manipulated variable determiner 14. Further, the actual traveling velocity Vact (current time value) and the estimated friction coefficient μestm (current time value) detected or estimated by the sensor/estimator 12, and a state amount (last time value) of the vehicle on the reference dynamic characteristic model 16 are input to the reference manipulated variable determiner 14. Then, the reference manipulated variable determiner 14 determines the model front wheel steering angle on the basis of these inputs. Basically, the model front wheel steering angle may be determined on the basis of the steering angle θh. In the present embodiment, however, a predetermined restriction is placed on the model front wheel steering angles input to the reference dynamic characteristic model 16. To place the restriction, Vact, μestm and the like in addition to the steering angle θh are supplied to the reference manipulated variable determiner 14.

Supplementally, the type of reference model manipulated variable generally depends on the form of the reference dynamic characteristic model 16 or the type of state amount to be determined by the reference dynamic characteristic model 16. The reference dynamic characteristic model 16 may include the reference manipulated variable determiner 14. If the reference dynamic characteristic model 16 is constructed to require a drive manipulation input itself, then the reference manipulated variable determiner 14 may be omitted.

Subsequently, the controller 10 determines and outputs a reference state amount, which is the state amount of a reference motion of the actual vehicle 1 (hereinafter referred to as the reference motion), by the reference dynamic characteristic model 16. The reference dynamic characteristic model 16 is a model which is established beforehand and which represents dynamic characteristics of a vehicle, and it sequentially determines a state amount of a reference motion (a reference state amount) on the basis of predetermined inputs, including the reference model manipulated variable mentioned above. The reference motion basically means an ideal motion or a motion close thereto of the actual vehicle 1 which is considered desirable to a driver.

In this case, the reference dynamic characteristic model 16 receives mainly the reference model manipulated variable determined by the reference manipulated variable determiner 14 and control inputs (feedback control inputs) Mvir and Fvir for operating the reference dynamic characteristic model 16 determined by an FB distribution law 20, which will be discussed later. Then, the reference dynamic characteristic model 16 determines a reference motion (eventually the time series of a reference state amount) on the basis of the inputs.

More specifically, in the present embodiment, a reference state amount determined and output by the reference dynamic characteristic model 16 is composed of a set of a reference state amount related to a rotational motion in the yaw direction of a vehicle and a reference state amount related to a translational motion in the lateral direction (a side slip motion) of a vehicle. A reference state amount related to the rotational motion in the yaw direction of the vehicle is, for example, a yaw rate reference value γd (hereinafter referred to as the reference yaw rate γd in some cases) and the reference state amount related to the translational motion in the lateral direction of the vehicle is, for example, a vehicle center-of-gravity point side slip angle reference value βd (hereinafter referred to as the reference vehicle center-of-gravity point side slip angle βd in some cases). To sequentially determine these reference state amounts γd and βd at each control processing cycle, the model front wheel steering angle (current time value) and the feedback control inputs Mvir and Fvir (last time values) as reference model manipulated variables are supplied. In this case, in the present embodiment, the traveling velocity of the vehicle on the reference dynamic characteristic model 16 is set to agree with the actual traveling velocity Vact. Thus, the actual traveling velocity Vact (current time value) detected or estimated by the sensor/estimator 12 is also supplied to the reference dynamic characteristic model 16. Then, based on these inputs, the reference dynamic characteristic model 16 determines the yaw rate and the vehicle center-of-gravity point side slip angle of the vehicle on the reference dynamic characteristic model 16 and outputs the determined results as the reference state amounts γd and βd.

Incidentally, the feedback control inputs Mvir and Fvir supplied to the reference dynamic characteristic model 16 are feedback control inputs additionally supplied to the reference dynamic characteristic model 16 in order to restrain alienation (separation) between a motion of the actual vehicle 1 and a reference motion due to, for example, a change in a traveling environment (such as a road surface condition) of the actual vehicle 1 (a change not considered in the reference dynamic characteristic model 16), a modeling error in the reference dynamic characteristic model 16, or a detection error or an estimation error of the sensor/estimator 12 (or in order to approximate a reference motion to a motion of the actual vehicle 1). In the present embodiment, the feedback control inputs Mvir and Fvir are virtual external forces virtually applied to the vehicle on the reference dynamic characteristic model 16. Mvir of the virtual external forces Mvir and Fvir denotes a virtual moment in the yaw direction which is to act about the center-of-gravity point of the vehicle 1 on the reference dynamic characteristic model 16, and Fvir denotes a virtual translational force in the lateral direction which is to act on the center-of-gravity point.

Supplementally, the set of the reference state amounts γd and βd corresponds to the model state amount vector in the present invention, and the reference dynamic characteristic model 16 corresponds to the vehicle model in the present invention. Further, the processing by the reference manipulated variable determiner 14 and the reference dynamic characteristic model 16 constitutes the model state amount determining means in the present invention. In the present embodiment, the processing by the reference dynamic characteristic model 16 includes a function as the vehicle model characteristics setting means in the present invention.

Subsequently, the controller 10 calculates, by a subtractor 18, a state amount error, which is the difference between the actual state amount (an actual state amount of the same type as a reference state amount) detected or estimated by the sensor/estimator 12 and the reference state amount determined by the reference dynamic characteristic model 16.

More specifically, the subtractor 18 determines, as state amount errors, the differences γerr (=γact−γd) and βerr (=βact−γd) between the values (current time values) of the actual yaw rate γact and the actual vehicle center-of-gravity point side slip angle βact and the values (current time values) of the reference yaw rate γd and the reference vehicle center-of-gravity point side slip angle βd determined by the reference dynamic characteristic model 16.

Supplementally, the processing by the subtractor 18 constitutes the state amount error calculating means in the present invention.

Subsequently, the controller 10 supplies the state amount errors γerr and βerr determined as described above to the FB distribution law 20. The FB distribution law 20 determines the virtual external forces Mvir and Fvir, which are feedback control inputs for manipulating the reference dynamic characteristic model 16 and an actuator operation feedback target value (actuator operation FB target value), which is a feedback control input for operating the actuator devices 3 of the actual vehicle 1.

In the present embodiment, the actuator operation FB target value includes a feedback control input related to the operation of the braking device of the driving/braking device 3A (more specifically, a feedback control input for manipulating a driving/braking force to be applied to the wheels W1 to W4 by operating the braking device). Alternatively, the actuator operation FB target value includes a feedback control input related to the operation of the steering device 3B (more specifically, a feedback control input for manipulating the lateral forces of the front wheels W1 and W2 by operating the steering device 3B) in addition to a feedback control input related to the operation of the driving/braking device 3A. The actuator operation FB target value is, in other words, a feedback control input for manipulating (correcting) a road surface reaction force, which is an external force to be applied to the actual vehicle 1.

The FB distribution law 20 basically determines the virtual external forces Mvir and Fvir and the actuator operation FB target value such that the received state amount errors γerr and βerr are approximated to zero.

However, when determining the virtual external forces Mvir and Fvir, the FB distribution law 20 determines the virtual external forces Mvir and Fvir such that not only the state amount errors γerr and βerr are approximated to zero but the deviation of a predetermined restriction object amount of the actual vehicle 1 or the vehicle on the reference dynamic characteristic model 16 from a predetermined permissible range is restrained. Further, the FB distribution law 20 determines, as the actuator operation FB target value, a feedback control input related to the operation of the braking device of the driving/braking device 3A or the feedback control input and a feedback control input related to the operation of the steering device 3B such that a predetermined moment in the yaw direction for approximating the state amount errors γerr and βerr to zero is generated about the center-of-gravity point of the actual vehicle 1 (more generally, such that a predetermined external force (road surface reaction force) for approximating the state amount errors γerr and βerr to zero acts on the actual vehicle 1).

To determine the virtual external forces Mvir, Fvir and the actuator operation FB target value, the FB distribution law 20 receives not only the state amount errors γerr and βerr but also at least either the reference state amounts γd and βd, which are outputs of the reference dynamic characteristic model 16, or the actual state amounts γact and βact detected or estimated by the sensor/estimator 12. Furthermore, the FB distribution law 20 also receives actual state amounts, such as the actual traveling velocity Vact, the actual front wheel side slip angle βf_act, and the actual rear wheel side slip angle βr_act, detected or estimated by the sensor/estimator 12. Then, based on these inputs, the FB distribution law 20 determines the virtual external forces Mvir, Fvir and the actuator operation FB target value.

Supplementally, the virtual external forces Mvir, Fvir correspond to the vehicle model operation control inputs in the present invention, and the actuator operation FB target value corresponds to the actual vehicle actuator operation control input in the present invention. Thus, the FB distribution law 20 has a function as a state amount error response control means.

Meanwhile, in parallel to the control processing (or by time-sharing processing) by the reference manipulated variable determiner 14, the reference dynamic characteristic model 16, the subtractor 18, and the FB distribution law 20 described above, the controller 10 supplies the aforesaid drive manipulation inputs to an FF law 22 to determine an actuator operation FF target value, which is a feedforward target value (basic target value) of the operation of the actuator devices 3, by the FF law 22.

According to the present embodiment, the actuator operation FF target value includes the feedforward target values related to the driving/braking forces of the wheels W1 to W4 of the actual vehicle 1 by the operation of the braking device of the driving/braking device 3A, the feedforward target values related to the driving/braking forces of the driving wheels W1 and W2 of the actual vehicle 1 by the operation of the driving system of the driving/braking device 3A, the feedforward target values related to the reduction gear ratio (change gear ratio) of the transmission of the driving/braking device 3A, and the feedforward target values related to the steering angles of the steering control wheels W1 and W2 of the actual vehicle 1 by the steering device 3B.

To determine these actuator operation FF target values, the FF law 22 receives the drive manipulation input and also receives the actual state amount (the actual traveling velocity Vact or the like) detected or estimated by the sensor/estimator 12. Then, based on these inputs, the FF law 22 determines the actuator operation FF target value. The actuator operation FF target value is an operation target value of the actuator devices 3 which is determined without depending on the state amount errors γerr and βerr.

Supplementally, if the suspension device 3C is an active suspension device, then the actuator operation FF target value generally includes a feedforward target value related to an operation of the suspension device 3C.

Subsequently, the controller 10 inputs the actuator operation FF target value (the current time value) determined by the FF law 22 and the actuator operation FB target value (the current time value) determined by the FB distribution law 20 to the actuator operation target value synthesizer 24. Then, the controller 10 synthesizes the actuator operation FF target value and the actuator operation FB target value by the actuator operation target value synthesizer 24 to determine the actuator operation target value, which is a target value defining the operation of the actuator devices 3.

According to the present embodiment, the actuator operation target values include a target value of the driving/braking forces of the wheels W1 to W4 of the actual vehicle 1 (a target value of the total driving/braking force by the operations of the driving system of the driving/braking device 3A and the braking device), a target value of a slip ratio of the wheels W1 to W4 of the actual vehicle 1, a target value of a steering angle of the steering control wheels W1 and W2 of the actual vehicle 1 by the steering device 3B, a target value of the driving/braking force of the driving wheels W1 and W2 of the actual vehicle 1 by the operation of the driving system of the driving/braking device 3A, and a target value of a reduction gear ratio of the transmission of the driving/braking device 3A.

To determine these actuator operation target values, the actuator operation target value synthesizer 24 receives not only the actuator operation FF target value and the actuator operation FB target value but also the actual state amounts (the actual side slip angle βf_act of the front wheels W1, W2 and the estimated friction coefficient μestm, etc.) detected or estimated by the sensor/estimator 12. Then, based on these inputs, the actuator operation target value synthesizer 24 determines the actuator operation target value.

Supplementally, the actuator operation target value is not limited to the types of target values described above. For example, in place of the target values, the target values of the actuator manipulated variables of the actuator devices that are associated with the aforesaid target values may be determined as actuator operation target values. Basically, the actuator operation target values may take any values as long as they make it possible to define the operations of the actuator devices. For instance, as the actuator operation target value related to an operation of the braking device, the target value of a braking pressure may be determined or the target value of the actuator manipulated variable of the braking device associated therewith may be determined.

Subsequently, the controller 10 inputs the actuator operation target value, which has been determined by the actuator operation target value synthesizer 24, into the actuator drive control unit 26, and determines the actuator manipulated variable of each of the actuator devices 3 of the actual vehicle 1 by the actuator drive control unit 26. Then, the actuator of each of the actuator devices 3 of the actual vehicle 1 is controlled on the basis of the determined actuator manipulated variable.

In this case, the actuator drive control unit 26 determines the actuator manipulated variable such that the input actuator operation target value is satisfied or in exact accordance with the actuator operation target value. Further, for this determination, the actuator drive control unit 26 also receives the actual state amounts of the actual vehicle 1 detected or estimated by the sensor/estimator 12 in addition to the actuator operation target value. Among the control functions of the actuator drive control unit 26, the control function related to the braking device of the driving/braking device 3A desirably incorporates a so-called antilock braking system.

The above has provided an overview of the control processing for each control processing cycle of the controller 10.

The order of the processing of each control processing function section of the controller 10 may be changed, as necessary. For example, the processing by the sensor/estimator 12 may be executed at the end of each control processing cycle and a detected value or an estimated value obtained thereby may be used for the processing of the next control processing cycle.

More detailed processing of the control processing function section of the controller 10 in the present embodiment will now be described.

[About a Reference Dynamic Characteristic Model]

First, the reference dynamic characteristic model 16 in the present embodiment will be described by referring to FIG. 3. FIG. 3 is a diagram illustrating the construction of a vehicle on the reference dynamic characteristic model 16 in the present embodiment. This reference dynamic characteristic model 16 is a model which expresses the dynamic characteristics of a vehicle in terms of the dynamic characteristics (kinetic characteristics) on a horizontal plane of a vehicle equipped with one front wheel Wf and one rear wheel Wr at the front and the back (a so-called two-wheeled model). Hereinafter, the vehicle on the reference dynamic characteristic model 16 (the vehicle corresponding to the actual vehicle 1 on the reference dynamic characteristic model 16) will be referred to as the model vehicle. The front wheel Wf of the model vehicle corresponds to a wheel that combines the two front wheels W1 and W2 of the actual vehicle 1 into one piece and provides the steering control wheel of the model vehicle. The rear wheel Wr corresponds to a wheel that combines the rear wheels W3 and W4 of the actual vehicle 1 into one piece and provides a non-steering control wheel in the present embodiment.

An angle $\beta d$ formed with respect to the longitudinal direction of the model vehicle by the velocity vector Vd (the vector of the traveling velocity Vd of the model vehicle) on the horizontal plane of a center-of-gravity point Gd of the model vehicle (i.e., a vehicle center-of-gravity point side slip angle $\beta d$ of the model vehicle) and the angular velocity $\gamma d$ about the vertical axis of the model vehicle (i.e., the yaw rate $\gamma d$ of the model vehicle) are the reference state amounts sequentially determined by the reference dynamic characteristic model 16 as the reference vehicle center-of-gravity point side slip angle and the reference yaw rate, respectively. Further, an angle $\delta f\_d$ formed with respect to the longitudinal direction of the model vehicle by a line of intersection of the rotational plane of the front wheel Wf of the model vehicle and the horizontal plane is the reference model manipulated variable input to the reference dynamic characteristic model 16 as the model front wheel steering angle. Further, a translational force Fvir in the lateral direction additionally applied to the center-of-gravity point Gd of the model vehicle (in the lateral direction of the model vehicle) and a moment Mvir in the yaw direction (about the vertical axis) additionally applied about the center-of-gravity point Gd of the model vehicle are the feedback control inputs supplied as the virtual external forces to the reference dynamic characteristic model 16.

In FIG. 3, Vf_d denotes an advancing velocity vector of the front wheel Wf of the model vehicle on the horizontal plane, Vr_d denotes an advancing velocity vector of the rear wheel Wr of the model vehicle on the horizontal plane, $\beta f\_d$ denotes a side slip angle of the front wheel Wf (an angle formed with respect to the longitudinal direction of the front wheel Wf (the direction of the line of intersection of the rotational plane of the front wheel Wf and the horizontal plane) by the advancing velocity vector Vf_d of the front wheel Wf. Hereinafter referred to as the front wheel side slip angle $\beta f\_d$), $\beta r\_d$ denotes a side slip angle of the rear wheel Wr (an angle formed with respect to the longitudinal direction of the rear wheel Wr (the direction of the line of intersection of the rotational plane of the rear wheel Wr and the horizontal plane) by the advancing velocity vector Vr_d of the rear wheel Wr. Hereinafter this angle is referred to as the rear wheel side slip angle $\beta r\_d$), and $\beta f0$ denotes an angle formed with respect to the longitudinal direction of the model vehicle by the advancing velocity vector Vf_d of the front wheel Wf of the model vehicle (hereinafter referred to as the vehicle front wheel position side slip angle $\beta f0$).

Supplementally, according to the embodiments in the present description, regarding a side slip angle of a vehicle or a wheel, a steering angle of a wheel, a yaw rate of the vehicle and a moment in the yaw direction, the counterclockwise direction as observed from above the vehicle is defined as the positive direction. Further, of the virtual external forces Mvir and Fvir, the translational force Fvir defines the leftward direction of the vehicle as the positive direction. For a driving/braking force of a wheel, the direction of a force for accelerating the vehicle forward in the direction of the line of intersection of the rotational surface of a wheel and a road surface or a horizontal plane (road surface reaction force) is defined as the positive direction. In other words, a driving/braking force in the direction that provides a driving force relative to the advancing direction of the vehicle takes a positive value, while a driving/braking force in the direction that provides a braking force relative to the advancing direction of the vehicle takes a negative value.

Specifically, the dynamic characteristics (the dynamic characteristics in a continuous system) of the model vehicle are represented by expression 01 given below. The expression which defines "K" of the right side of the expression 01 as a unit matrix and which excludes the third term (the term including Fvir and Mvir) in the parenthesis of the right side is equivalent to, for example, the publicly known expressions (3.12), (3.13) shown in the publicly known document titled "Motion and Control of Automobile" (written by Masato Abe; published by Sankaido Co., Ltd.; and 2nd printing, 2nd edition published on Jul. 23, 2004: hereinafter referred to as non-patent document 1).

[Mathematical Expression 1]

$$\frac{d}{dt}\begin{bmatrix} \beta d \\ \gamma d \end{bmatrix} = K \cdot \left( \begin{bmatrix} a11 & a12 \\ a21 & a22 \end{bmatrix} \cdot \begin{bmatrix} \beta d \\ \gamma d \end{bmatrix} + \begin{bmatrix} b1 \\ b2 \end{bmatrix} \delta f\_d + \begin{bmatrix} b11 & 0 \\ 0 & b22 \end{bmatrix} \cdot \begin{bmatrix} Fvir \\ Mvir \end{bmatrix} \right)$$ Expression 01 where $$K = \begin{bmatrix} k1 & 0 \\ 0 & k2 \end{bmatrix}$$

$$a11 = -\frac{2 \cdot (Kf + Kr)}{m \cdot Vd}$$

$$a12 = -\frac{m \cdot Vd^2 + 2 \cdot (Lf \cdot Kf - Lr \cdot Kr)}{m \cdot Vd^2}$$

$$a21 = -\frac{2 \cdot (Lf \cdot Kf - Lr \cdot Kr)}{I}$$

$$a22 = -\frac{2 \cdot (Lf^2 \cdot Kf + Lr^2 \cdot Kr)}{I \cdot Vd}$$

$$b1 = \frac{2 \cdot Kf}{m \cdot Vd}$$

$$b2 = \frac{2 \cdot Lf \cdot Kf}{I}$$

$$b11 = \frac{1}{m \cdot Vd}$$

$$b22 = \frac{1}{I}$$

In the note of the expression 01, m denotes the total mass of the model vehicle, Kf denotes the cornering power per wheel when the front wheel Wf of the model vehicle is regarded as a connected body of the two right and left front wheels, Kr denotes the cornering power per wheel when the rear wheel Wr of the model vehicle is regarded as a connected body of the two right and left rear wheels, Lf denotes the distance in the longitudinal direction between the center of the front wheel Wf of the model vehicle and the center-of-gravity point Gd (the distance in the longitudinal direction between the rotational axis of the front wheel Wf and the center-of-gravity point Gd when the steering angle of the front wheel Wf is zero. Refer to FIG. 3), Lr denotes the distance in the longitudinal direction between the center of the rear wheel Wr of the model vehicle and the center-of-gravity point Gd (the distance in the longitudinal direction between the rotational axis of the rear wheel Wr and the center-of-gravity point Gd. Refer to FIG. 3), and I denotes the inertia (inertial moment) about the yaw axis at the center-of-gravity point Gd of the model vehicle. The values of these parameters m, I, Lf, Lr, Kf, and Kr (or the values of the parameters a11, a12, a21, a22, b1, b2, b11, and b22 of the right side of expression 01) are preset values. In this case, for example, m, I, Lf and Lr are set to the same or substantially the same values as those thereof in the actual vehicle 1. Further, Kf and Kr are set, by considering the characteristics of the tires (or the characteristics required of the tires) of the front wheels W1, W2 and the rear wheels W3, W4, respectively, of the actual vehicle 1. For example, Kf and Kr are respectively set to be the same or substantially the same as the cornering power of the tires of the front wheels W1, W2 and the rear wheels W3, W4 of the actual vehicle 1.

More generally, the values of m, I, Lf, Lr, Kf, and Kr (or the values of a11, a12, a21, a22, b1, b2, b11, and b22) are set such that the motional characteristics of the model vehicle (the steady-state characteristics of the model vehicle) in a steady state (in a state wherein a drive manipulation input, such as the steering angle θh, is constant and an environmental condition of a road surface condition or the like is constant or uniform, and sufficient time has elapsed for a transient behavior to disappear) approximates the motional characteristics in the steady state of the actual vehicle 1 (the steady-state characteristics of the actual vehicle 1). In this case, the steady-state characteristics of the model vehicle in the present embodiment is represented by the relationship between the steering angle θh and the vehicle center-of-gravity point side slip angle βd and the yaw rate γd of the model vehicle when the temporal changes in the motional state amounts βd and γd of the model vehicle (the left side of expression 01) are set to zero and the virtual external forces Fvir and Mvir are set to zero (provided Vd=Vact). Hence, the values of m, I, Lf, Lr, Kf, and Kr (or the values of a11, a12, a21, a22, b1, b2, b11, and b22) of the model vehicle are set such that the above relationship approximately coincides with the relationship between the steering angle θh and the actual vehicle center-of-gravity point side slip angle βact and the actual yaw rate γact of the actual vehicle 1 in a steady state (the relationship when the actuator operation FB target value is set to zero).

Further, the matrix K in expression 01 is a characteristics adjusting matrix (diagonal matrix) for multiplying the values of the first row and the second row of each term in the parenthesis of the right side of expression 01 by k1 and k2 (provided k1≠0 and k2≠0), respectively, to adjust the dynamic characteristics of the model vehicle (more specifically, the transient response characteristics of the state amounts βd and γd of the model vehicle). Hereinafter, the diagonal components k1 and k2 of the characteristics adjusting matrix K will be referred to as the model characteristics adjusting parameters.

In the present embodiment, the value of k2 out of the model characteristics adjusting parameters k1 and k2 of the characteristics adjusting matrix K is variably set by the processing by the reference dynamic characteristic model 16 to adjust the transient response characteristics of the state amounts βd and γd of the model vehicle. Further, the value of k1 is fixed to "1." Hence, in the present embodiment, the value of the model characteristics adjusting parameter k2 for multiplying the value of the second row of each term in the parenthesis of the right side of expression 01 by k2 is variably set thereby to adjust the transient response characteristics of the state amounts βd and γd of the model vehicle. Incidentally, the method for setting the value of the model characteristics adjusting parameter k2 will be discussed later.

Supplementally, the characteristics adjusting matrix K is a matrix used to equally multiply all terms of the same row in the parenthesis of the right side of expression 01, so that the steady state characteristics of the model vehicle are maintained constant without depending on the values of k1 and k2 unless the value of each of the diagonal components k1 and k2 of the characteristics adjusting matrix K is zero. Therefore, the characteristics adjusting matrix K (the model characteristics adjusting parameters k1 and k2) are used to adjust transient response characteristics while maintaining the steady-state characteristics of the model vehicle constant.

In the processing by the reference dynamic characteristic model 16 in the present embodiment, the arithmetic processing of the expression 1 (more specifically, the arithmetic processing of an expression obtained by representing expression 01 by means of a discrete-time system) is sequentially implemented at a control processing cycle of the controller 10, using δf_d, Fvir, and Mvir of the above expression 01 as inputs, thereby to sequentially calculate βd and γd in time series. In this case, at each control processing cycle, a latest value (a current time value) of the actual traveling velocity Vact detected or estimated by the sensor/estimator 12 is used as the value of the traveling velocity Vd of the model vehicle. In other words, the traveling velocity Vd of the model vehicle is always made to agree with the actual traveling velocity Vact. Based on the traveling velocity Vd of the model vehicle, which is made to coincide with the actual traveling velocity Vact as described above (in other words, based on the actual traveling velocity Vact), the value of k2 out of the model characteristics adjusting parameters k1 and k2 is variably set. As the values of Fvir and Mvir, the latest values (the last time values) of the virtual external forces determined as will be discussed later by the FB distribution law 20 are used. As the value of δf_d, the latest value (the current time value) of the model front wheel steering angle determined as will be discussed later by the reference manipulated variable determiner 14 is used. Incidentally, the last time values of βd and γd are also used to calculate new βd and γd (current time values).

Supplementally, the relationship among βf0, βd, βf_d, βr_d, γd, and δf_d of the model vehicle is represented by expressions 02a, 02b, and 02c given below.

$$\beta f\_d = \beta d + Lf \cdot \gamma d/Vd - \delta f\_d \qquad \text{Expression 02a}$$

$$\beta r\_d = \beta d - Lr \cdot \gamma d/Vd \qquad \text{Expression 02b}$$

$$\beta f0 = \beta f\_d + \delta f\_d = \beta d + Lf \cdot \gamma d/Vd \qquad \text{Expression 02c}$$

Further, as illustrated in FIG. 3, if the cornering force of the front wheel Wf of the model vehicle (≈ lateral force of the front wheel Wf) is denoted by Ffy_d and the cornering force of the rear wheel Wr of the model vehicle (≈ lateral force of the rear wheel Wr) is denoted by Fry_d, then the relationship between Ffy_d and βf_d and the relationship between Fry_d and βr_d are represented by expressions 03a and 03b given below.

$$Ffy\_d = -2 \cdot Kf \cdot \beta f\_d \qquad \text{Expression 03a}$$

$$Fry\_d = -2 \cdot Kr \cdot \beta r\_d \qquad \text{Expression 03b}$$

The following will describe the method for setting the value of the model characteristics adjusting parameter in the present embodiment.

In the dynamic characteristics (the dynamic characteristics in the situation wherein the actuator operation FB target value is maintained at zero) of the actual vehicle 1, generally, the response characteristic (the transient response characteristic) of the actual state amounts βact and γact when the steering angle θh among drive manipulation inputs is changed in steps (when the actual front wheel steering angle δf_act is consequently changed in steps) will be a non-oscillatory response characteristic (over-braking or critical-braking response characteristic) when the traveling velocity Vact is a certain value Vd_critical or less. In other words, in response to the stepped change in the steering angle θh (in response to the stepped change in the actual front wheel steering angle δf_act), each of the actual state amounts βact and γact will converge to a steady state value without having an oscillatory component which centers around a final steady state value. If Vact=Vd_critical, then the response characteristics of the actual state amounts βact and γact will be critical braking characteristics. Hereinafter, Vd_critical will be referred to as the critical braking velocity.

If the actual traveling velocity Vact becomes higher than the critical braking velocity Vd_critical, then the response characteristics of the actual state amounts βact and γact when the steering angle θh is changed in steps will be response characteristics (oscillatory characteristics) which include oscillatory components. In other words, in response to the stepped change in the steering angle θh, the actual state amounts γact and βact oscillate, centering around final steady state values, until they converge to the steady state values, as indicated by dashed lines a and b shown in FIGS. 4(a) and (b), respectively. Further, the attenuation velocities of the oscillatory components become lower as Vact increases (the time constants of the attenuations of the amplitudes of the oscillatory components become longer). Therefore, if the actual traveling velocity Vact exceeds the critical braking velocity Vd_critical, then the attenuation properties of the actual state amounts βact and γact lower as Vact increases.

Meanwhile, in the present embodiment, the motion of the actual vehicle 1 is controlled through the intermediary of the actuator device 3 such that the state amount errors βerr and γerr approximate zero, as described above. For this reason, if the state amounts βd and γd of the model vehicle oscillate, then the state amounts βact and γact of the actual vehicle 1 tend to oscillate accordingly. Therefore, in order to improve the behavior characteristics of the actual vehicle 1 while minimizing the chances of the occurrence of the situation wherein the state amounts βact and γact of the actual vehicle 1 oscillate when the steering angle θ is changed, it is desired that the response characteristics of the state amounts βd and γd of the model vehicle are non-oscillatory or the attenuation velocities of the oscillatory components of the state amounts βd and γd are as high as possible. More generally, the attenuation properties in the response characteristics of the state amounts βd and γd of the model vehicle relative to stepped changes in the steering angle θh are preferably higher than at least the attenuation properties in the response characteristics of the state amounts βact and γact of the actual vehicle 1.

According to the present embodiment, therefore, the value of the model characteristic adjusting parameter k2 is variably set on the basis of the traveling velocity Vact (=Vd), so that the response characteristics (to be specific, the response characteristics when the virtual external forces Fvir and Mvir of expression 01 are steadily set to zero) of the state amounts βd and γd of the model vehicle when the steering angle θh is changed in steps relative to an arbitrary traveling velocity Vact become non-oscillatory (become a critical braking or over-braking characteristic). This arrangement causes the attenuation properties of the state amounts βd and γd of the model vehicle relative to changes in the steering angle θh to be higher than the attenuation properties of the state amounts βact and γact of the actual vehicle 1.

To be more specific, according to the present embodiment, the value of the model characteristic adjusting parameter k1 is set to "1" relative to an arbitrary traveling velocity Vd (=Vact) which leads to Vd≦Vd_critical (Vact≦Vd_critical). Further, the value of the model characteristic adjusting parameter k2 is set such that the response characteristics of the state amounts of βd and γd of the model vehicle (a system represented by expression 01 which includes the characteristic adjusting matrix K) become non-oscillatory characteristics, such as the critical braking characteristics, at an arbitrary traveling velocity Vd (=Vact) which leads to Vd>Vd_critical (Vact>Vd_critical). More specifically, the value of k2 is set on the basis of Vd (=Vact) such that, for an arbitrary value of Vd (=Vact) which leads to Vd>Vd_critical, the solution of a characteristics equation det(λ·I−K·A)≦0 (where λ: scalar variable; det( ) matrix expression; and I: unit matrix) of a system (model vehicle) represented by expression 01 which includes the characteristics adjusting matrix K (provided k1=1 in the present embodiment), i.e., the eigenvalue of the model vehicle, takes a multiple root. Incidentally, "A" denotes the matrix of the first term in the parenthesis of the right side of expression 01 (a matrix of 2 rows and 2 columns, having a11, a12, a21, and a22, as the components thereof).

The value of k2 set as described above is the value of k2 that satisfies the following expression 101 relative to an arbitrary value of Vd (=Vact) which leads to Vd>Vd_critical.

$$(a11+k2 \cdot a22)^2 - 4 \cdot k2 \cdot (a11 \cdot a22 + a12 \cdot a21) = 0 \quad \text{Expression 101}$$

Supplementally, the critical braking velocity Vd_critical takes a value that approximates a value of Vd that causes the eigenvalue of matrix A of the first term in the parenthesis of the right side of expression 01 to take a multiple root. More specifically, the critical braking velocity Vd_critical takes a value approximating a value of Vd that causes the eigenvalue of a system, which is represented by an expression obtained by setting the characteristics adjusting matrix K of expression 01 to a unit matrix and by excluding the term that includes the virtual external forces Fvir and Mvir (this means an expression that linearly approximates the dynamic characteristic of the actual vehicle 1), to take a multiple root, the eigenvalue of the system being the solution of a characteristics equation det(λ·I−A)=0 (where λ: scalar variable; det( ): matrix expression; and I: unit matrix). Thus, Vd_critical is set to a value of Vd that satisfies expression 102 given below (more specifically, a positive value among the values of Vd that satisfies expression 102 given below).

$$(a11+a22)^2 - 4 \cdot (a11 \cdot a22 + a12 \cdot a21) = 0 \quad \text{Expression 102}$$

FIG. 5 is a graph illustrating changes in the value of k2 set on the basis of the traveling velocity Vact (=Vd), as described above. As illustrated, the value of k2 is set to a value that is larger than "1" in a situation wherein Vact>Vd_critical holds. At this time, as Vact (=Vd) increases, the value of k2 monotonously increases.

As described above, variably setting the value of the model characteristics adjusting parameter k on the basis of the traveling velocity Vact (=Vd) makes it possible to set the response characteristics of the state amounts γd and βd of the model vehicle to non-oscillatory characteristics according to a stepped change in the steering angle θh, independently of the traveling velocity Vact. For instance, the response characteristics of the state amounts γd and βd of the model vehicle at a traveling velocity Vact which is higher than the critical braking velocity Vd_critical will be the critical braking characteristics (non-oscillatory characteristics), as illustrated by the solid lines c and d in the aforesaid FIGS. 4(a) and (b), respectively. In FIGS. 4(a) and (b), the motional characteristic of the model vehicle has been set such that the steady-state characteristics of the actual vehicle 1 and the model vehicle agree when the actual vehicle 1 and the model vehicle agree in the coefficient of friction μ between a wheel and a road surface. Further, the response characteristics of the state amounts γd and βd of the model vehicle at the traveling velocity Vact of the critical braking velocity Vd_critical or less will be the critical braking or over-braking characteristics.

Accordingly, in a velocity range of Vd_critical or more, the attenuation property of each of the state amounts γd and βd of the model vehicle based on the stepped changes of the steering angle θh can be made higher than the attenuation property of each of the state amounts γact and βact of the actual vehicle 1.

Further, the steady-state characteristics of the model vehicle, which do not depend on the value of k2 as described above, can be maintained to characteristics that approximate the steady-state characteristics of the actual vehicle 1. This arrangement, therefore, makes it possible to prevent the response characteristics of the state amounts γd and βd of the model vehicle based on the stepped changes in the steering angle θh from becoming oscillatory characteristics while maintaining the steady-state characteristics of the model vehicle at the characteristics which approximate the steady-state characteristics of the actual vehicle 1.

As described above, according to the present embodiment, in the processing by the reference dynamic characteristic model 16 at each control processing cycle of the controller 10, the value of the model characteristics adjusting parameter k2 is variably set on the basis of the traveling velocity Vact (=Vd). The processing for setting the value of k2 corresponds to the vehicle model characteristics setting means in the present invention. In the processing by the reference dynamic characteristic model 16, when actually setting the value of k2, a map or an arithmetic expression representing the relationship between the value of k2 and the traveling velocity Vact of the actual vehicle 1 (the relationship shown in FIG. 5) may be established beforehand and then the value of k2 may be determined from the value (the current time value) of Vact at each control processing cycle according to the map or the arithmetic expression.

Supplementally, the value of k2 in the situation wherein Vact>Vd_critical holds does not necessarily have to be set such that the response characteristics of the state amounts γd and βd of the model vehicle become the critical braking characteristics; instead, the value of k2 may be set such that the response characteristics become the over-braking characteristics. More specifically, the value of k2 in the situation wherein Vact>Vd_critical holds may be set such that the solution of the aforesaid characteristics equation det(λ·I−K·A)=0 (the eigenvalue of the model vehicle) takes the real number of two different values. In this case, the value of k2 is set to a larger value than the value of k2 which causes the response characteristics of the state amounts γd and βd of the model vehicle to become the critical braking characteristics. However, in order to prevent the response characteristics (attenuation properties) of the state amounts γd and βd of the model vehicle from developing a significant discrepancy from the response characteristics of the actual state amounts γact and βact in the motional state of the actual vehicle 1 wherein Vact>Vd_critical holds, the value of k2 is preferably set to a value close to the value of k2 that turns the response characteristics of the state amounts γd and βd of the model vehicle into the critical braking characteristics.

Further, the value of k2 in the motional state of the actual vehicle 1 wherein Vact>Vd_critical holds may be set to a value which is slightly closer to "1" than a value of k2 that turns the response characteristics of the state amounts γd and βd of the model vehicle into the critical braking characteristics in the range wherein the attenuation properties of the state amounts γd and βd of the model vehicle are higher than the attenuation properties of the actual state amounts γact and βact. This arrangement makes it possible to prevent the response characteristics (the attenuation properties) of the state amounts γd and βd of the model vehicle from considerably deviating from the response characteristics of the actual state amounts γact and βact. However, in the response characteristics of the state amounts γd and βd of the model vehicle in this case, the attenuation properties of the state amounts γd and βd will be higher than in the case where k2=1, whereas the attenuation properties of the state amounts γd and βd will be lower than the critical braking characteristic.

Further, in the model vehicle represented by expression 01, if the traveling velocity Vact (=Vd) is an extremely low velocity which is sufficiently lower than the critical braking velocity Vd_critical, then the responsiveness (the velocity responsiveness) of the state amounts γd and βd of the model vehicle in response to a change in the steering angle θh (a change in the front wheel steering angle δd) tends to increase, compared with the actual vehicle 1. Therefore, the value of k2 may be set to a value that is smaller than "1" in a situation wherein the traveling velocity Vact becomes an extremely low velocity (a traveling velocity which is not more than a predetermined value which is smaller than the critical braking velocity Vd_critical). In this case, however, the value of k2 at an extremely low velocity is set to a value which is not less than the value of k2 which turns the response characteristics of the state amounts γd and βd of the model vehicle into the critical braking characteristics, thereby preventing the response characteristics of the state amounts γd and βd of the model vehicle from becoming oscillatory characteristics. Setting the value of k2 at an extremely low velocity as described above makes it possible to bring the responsiveness of the state amounts γd and βd of the model vehicle in response to a change in the steering angle θh (the rising speed of βd and γd in response to a change in the steering angle θh) close to the responsiveness of the actual state amounts γact and βact.

Meanwhile, multiplying the second row of each term in the parenthesis of expression 01 by k2 is equivalent to multiplying the inertia I of the model vehicle by (1/k2). Therefore, instead of using the characteristics adjusting matrix K, an inertia I' defined by I'=1/k2 may be used to represent the dynamic characteristics of the model vehicle according to expression 103 given below.

[Mathematical Expression 2]

$$\frac{d}{dt}\begin{bmatrix}\beta d \\ \gamma d\end{bmatrix} = \begin{bmatrix}a11 & a12 \\ a21 & a22\end{bmatrix} \cdot \begin{bmatrix}\beta d \\ \gamma d\end{bmatrix} + \begin{bmatrix}b1 \\ b2\end{bmatrix} \cdot \delta f\_d + \begin{bmatrix}b11 & 0 \\ 0 & b22\end{bmatrix} \cdot \begin{bmatrix}Fvir \\ Mvir\end{bmatrix} \quad \text{Expression 103}$$

where $$a11 = -\frac{2 \cdot (Kf + Kr)}{m \cdot Vd}$$

$$a12 = -\frac{m \cdot Vd^2 + 2 \cdot (Lf \cdot Kf - Lr \cdot Kr)}{m \cdot Vd^2}$$

$$a21 = -\frac{2 \cdot (Lf \cdot Kf - Lr \cdot Kr)}{I'}$$

$$a22 = -\frac{2 \cdot (Lf^2 \cdot Kf + Lr^2 \cdot Kr)}{I' \cdot Vd}$$

$$b1 = \frac{2 \cdot Kf}{m \cdot Vd}$$

$$b2 = \frac{2 \cdot Lf \cdot Kf}{I'}$$

$$b11 = \frac{1}{m \cdot Vd}$$

$$b22 = \frac{1}{I'}$$

$$I' = \frac{I}{k2}$$

In this case, the value of k2 may be set according to the traveling velocity Vact (=Vd), as described above. At this time, the inertia I' monotonously decreases as Vact increases in the situation wherein Vact>Vd_critical holds.

Incidentally, the dynamic characteristics of the actual vehicle 1 in the present embodiment exhibit characteristics somewhere between the open characteristics of the actual vehicle 1 observed when the present invention is not applied (the dynamic characteristics of the actual vehicle 1 observed when the actuator FB operation target value is steadily maintained at zero) and the dynamic characteristics of the reference dynamic characteristic model 16 when the virtual external forces Mvir and Fvir are steadily maintained at zero. For this reason, in general, the reference dynamic characteristic model 16 is desirably set to a model that exhibits dynamic characteristics considered more desirable for a driver than the open characteristics of the actual vehicle 1. To be more specific, the reference dynamic characteristic model 16 is desirably set to a model having a higher linearity than that of the actual vehicle 1. For example, the reference dynamic characteristic model 16 is desirably set such that the relationship between the side slip angle or the slip ratio of a wheel of the model vehicle and a road surface reaction force acting from a road surface to the wheel (a lateral force or a driving/braking force) is a linear relationship or a relationship close thereto. The reference dynamic characteristic model 16 representing the dynamic characteristics according to the aforesaid expression 01 is an example of the model that satisfies these requirements.

[About the Reference Manipulated Variable Determiner]

The details of the processing by the reference manipulated variable determiner 14 will now be described with reference to FIG. 6 and FIG. 7. FIG. 6 is a functional block diagram illustrating the details of the processing function of the reference manipulated variable determiner 14, and FIG. 7 is a graph for describing the processing by an excessive centrifugal force prevention limiter 14f provided in the reference manipulated variable determiner 14.

Referring to FIG. 6, the reference manipulated variable determiner 14 first determines, in a processor 14a, an unlimited front wheel steering angle δf_unltd by dividing a steering angle θh (a current time value) in the drive manipulation inputs, which are to be supplied, by an overall steering ratio "is". This unlimited front wheel steering angle δf_unltd has a meaning as a basic required value of a model front wheel steering angle δf_d based on the steering angle θh.

Here, the overall steering ratio "is" is the ratio between the steering angle θh and the steering angle of the front wheel Wf of the model vehicle, and it is set on the basis of, for example, the relationship between the steering angle θh of the actual vehicle 1 and the feedforward value of the steering angle of the front wheels W1 and W2 of the actual vehicle 1 associated therewith.

The overall steering ratio "is" may be variably set on the basis of the traveling velocity Vact of the actual vehicle 1 detected or estimated by the sensor/estimator 12 rather than setting it at a constant value (a fixed value). In this case, it is desirable to set the "is" such that the overall steering ratio "is" increases as the traveling velocity Vact of the actual vehicle 1 increases.

Subsequently, the vehicle front wheel position side slip angle βf0 of the model vehicle on the reference dynamic characteristic model 16 is determined by a βf0 calculator 14b. The βf0 calculator 14b receives the last time values of the reference yaw rate γd and the reference vehicle center-of-gravity point side slip angle βd determined by the reference dynamic characteristic model 16. From these values, the last time value of βf0 is determined by calculating the expression 02c (calculating the right side of the second equal sign of expression 02c). In this case, a last time value of the actual traveling velocity Vact is used as the value of Vd required for the calculation of expression 02c. Thus, βf0 calculated by the βf0 calculator 14b takes the value of the vehicle front wheel position side slip angle βf0 of the model vehicle at the last time control processing cycle.

Alternatively, the last time value of the front wheel side slip angle βf_d of the model vehicle may be determined by the calculation of the expression 02a from the last time values of γd and βd, the last time value of the model front wheel steering angle δf_d determined by the reference manipulated variable determiner 14, and the last time value of the actual traveling velocity Vact, then the last time value of the model front wheel steering angle δf_d determined by the reference manipulated variable determiner 14 may be added to the determined βf_d (calculating the right side of the first equal sign of expression 02c) thereby to determine βf0. Alternatively, at each control processing cycle, the calculation of βf0 may be carried out by the processing performed by the reference dynamic characteristic model 16, and the last time value of the calculated βf0 may be input to the reference manipulated variable determiner 14. In this case, the arithmetic processing by the βf0 calculator 14b in the reference manipulated variable determiner 14 is unnecessary.

Subsequently, the unlimited front wheel steering angle δf_unltd is subtracted by a subtractor 14c from the vehicle front wheel position side slip angle βf0 determined as described above, thereby determining the unlimited front wheel side slip angle. The unlimited front wheel side slip angle means an instantaneous predicted value of the front wheel side slip angle βf_d of the model vehicle generated if it is assumed that the model front wheel steering angle δf_d of the model vehicle is instantaneously controlled to the unlimited front wheel steering angle δf_unltd (current time value) from the last time value.

Subsequently, the reference manipulated variable determiner 14 passes the unlimited front wheel side slip angle through a front wheel side slip angle limiter 14d to determine a limited front wheel side slip angle. Here, the graph of the front wheel side slip angle limiter 14d illustrated in the figure is a graph illustrating the relationship between an unlimited front wheel side slip angle and a limited front wheel side slip angle, the values in the direction of the axis of abscissas related to the graph indicating the values of the unlimited front wheel side slip angles while the values in the direction of the axis of ordinates indicating the values of the limited front wheel side slip angles.

The front wheel side slip angle limiter 14d is a limiter for restraining the magnitude of the front wheel side slip angle βf_d of the model vehicle from becoming excessive (furthermore, for preventing the lateral forces of the front wheels W1 and W2 required for the actual vehicle 1 from becoming excessive).

In the present embodiment, the front wheel side slip angle limiter 14d sets the permissible range of the front wheel side slip angle βf_d (more specifically, the upper limit value βf_max(>0) and the lower limit value βf_min(<0) of the permissible range) on the basis of the estimated friction coefficient μestm (current time value) and the actual traveling velocity Vact (current time value) input from the sensor/estimator 12 into the reference manipulated variable determiner 14. In this case, basically, the permissible range is set such that the permissible range [βf_min, βf_max] is narrower (βf_max and βf_min are brought more closely to zero) as the estimated friction coefficient μestm is smaller or the actual traveling velocity Vact is higher. At this time, the permissible range [βf_min, βf_max] is set in the range of the values of side slip angle that maintains the relationship between, for example, the side slip angle and the lateral force of the front wheels W1 and W2 of the actual vehicle 1 or the cornering force at a substantially linear relationship (a proportional relationship).

The permissible range [f_min, βf_max] may be set on the basis of either μestm or Vact, or may be set to a pre-fixed permissible range independently of μestm and Vact.

And, if the value of the received unlimited front wheel side slip angle is within the permissible range [βf_min, βf_max] set as described above (if βf_min≦Unlimited front wheel side slip angle≦βf_max), then the front wheel side slip angle limiter 14d directly outputs the value of the unlimited front wheel side slip angle as the limited front wheel side slip angle. If the value of the received unlimited front wheel side slip angle deviates from the permissible range, then the front wheel side slip angle limiter 14d outputs the lower limit value βf_min or the upper limit value βf_max of the permissible range [βf_min, βf_max] as the limited front wheel side slip angle. To be more specific, if the unlimited front wheel side slip angle >βf_max, then the βf_max is output as the limited front wheel side slip angle. If the unlimited front wheel side slip angle <βf_min, then the βf_min is output as the limited front wheel side slip angle. Thus, the limited front wheel side slip angle is determined such that it agrees with an unlimited front wheel side slip angle or takes a value that is closest to the unlimited front wheel side slip angle within the permissible range [βf_min, βf_max].

Subsequently, the limited front wheel side slip angle determined as described above is subtracted by a subtractor 14e from the vehicle front wheel position side slip angle βf0 determined by the βf0 calculator 14b thereby to determine a first limited front wheel steering angle δf_ltd1. The first limited front wheel steering angle δf_ltd1 determined as described above has a meaning as a model front wheel steering angle δf_d obtained by restricting the unlimited front wheel steering angle δf_unltd such that the front wheel side slip angle βf_d of the model vehicle does not deviate from the permissible range [βf_min, βf_max].

Subsequently, the reference manipulated variable determiner 14 passes the first limited front wheel steering angle δf_ltd1 through the excessive centrifugal force prevention limiter 14f to determine a second limited front wheel steering angle δf_ltd2. This δf_ltd2 is used as the value of the model front wheel steering angle δf_d to be input to the reference dynamic characteristic model 16. The graph of the excessive centrifugal force prevention limiter 14f illustrated in the figure is a graph illustrating the relationship between the first limited front wheel steering angle δf_ltd1 and the second limited front wheel steering angle δf_ltd2, the values in the direction of the axis of abscissas related to the graph indicating the values of δf_ltd1 while the values in the direction of the axis of ordinates indicating the values of δf_ltd2.

The excessive centrifugal force prevention limiter 14f is a limiter for restraining the centrifugal force generated in the model vehicle from becoming excessive (furthermore, for preventing the centrifugal force required for the actual vehicle 1 from becoming excessive).

In the present embodiment, the excessive centrifugal force prevention limiter 14f sets the permissible range of the model front wheel steering angle δf_d (more specifically, the upper limit value δf_max(>0) and the lower limit value δf_min(<0) of the permissible range) on the basis of the estimated friction coefficient μestm (current time value) and the actual traveling velocity Vact (current time value) input to the reference manipulated variable determiner 14. This permissible range [δf_min, δf_max] is the permissible range of the model front wheel steering angle δf_d that allows the model vehicle to make a normal circular turn without exceeding the limit of friction against a road surface when it is assumed that the virtual external forces Mvir and Fvir are steadily held at zero.

More specifically, first, a maximum yaw rate γmax (>0) at a normal circular turn, which is a yaw rate that satisfies expression 05 given below, is determined on the basis of the values (current time values) of Vact and μestm input to the reference manipulated variable determiner 14.

$$m \cdot \gamma max \cdot Vact = C1 \cdot \mu estm \cdot m \cdot g \qquad \text{Expression 05}$$

where m in expression 05 denotes the total mass of the model vehicle, as described above. Further, g denotes a gravitational acceleration and C1 denotes a positive coefficient of 1 or less. The left side of this expression 05 means a centrifugal force generated in the model vehicle (more specifically, a predicted convergence value of the centrifugal force) when the normal circular turn of the model vehicle is made while holding the yaw rate γd and the traveling velocity Vd of the model vehicle at γmax and Vact, respectively. Further, the value of the computation result of the right side of expression 05 indicates a road surface reaction force determined on the basis of μestm (more specifically, the value obtained by multiplying the limit value of the magnitude of a total frictional force that can be applied to the model vehicle from a road surface through the intermediary of the wheels Wf and Wr (the total sum of the translational force horizontal components of a road surface reaction force) by the coefficient C1 (≦the limit value). Hence, the maximum yaw rate γmax at a normal circular turn is determined such that the centrifugal force generated in the model vehicle when the normal circular turn of the model vehicle is made while holding the virtual external forces Mvir and Fvir to be applied to the model vehicle at zero and the yaw rate γd and the traveling velocity Vd of the model vehicle at γmax and Vact, respectively, does not exceed the limit value of the total frictional force (the total sum of the translational force horizontal components of a road surface reaction force) which can be applied to the model vehicle on the basis of the estimated friction coefficient μestm.

Incidentally, the value of the coefficient C1 of expression 05 may be variably set on the basis of the value of at least either one of μestm and Vact. In this case, preferably, the value of C1 is set to be smaller as μestm is smaller or as Vact is higher.

Subsequently, the value of the model front wheel steering angle δf_d associated with γmax at the normal circular turn of the model vehicle is determined as a limit steering angle at normal circular turn δf_max_c(>0). Here, in the reference dynamic characteristic model 16 represented by the expression 01, the relationship of expression 06 given below holds between the yaw rate γd of the model vehicle at the normal circular turn and the model front wheel steering angle δf_d.

[Mathematical Expression 3]

$$\gamma d = \frac{1}{1 - \frac{m}{2 \cdot L^2} \cdot \frac{Lf \cdot Kf - Lr \cdot Kr}{Kf \cdot Kr} \cdot Vd^2} \cdot \frac{Vd}{L} \cdot \delta f\_d \qquad \text{Expression 06}$$

where $$L = Lf + Lr$$

If Vd is sufficiently small, then expression 06 can be approximately rewritten to the following expression 07.

$$\gamma d = (Vd/L) \cdot \delta f\_d \qquad \text{Expression 07}$$

Hence, in the present embodiment, the limit steering angle δf_max_c at normal circular turn associated with γmax is determined by making a solution on δf_d, denoting the values of γd and Vd, respectively, in expression 06 or expression 07 as γmax and Vact.

The permissible range [δf_min, δf_max] of the model front wheel steering angle δf_d for preventing a centrifugal force generated in the model vehicle from becoming excessive may be basically set to a permissible range [−δf_max_c, δf_max_c]. In that case, however, the model front wheel steering angle δf_d may be subjected to unwanted restriction in a countersteering state of the actual vehicle 1 (a state wherein the front wheels W1 and W2 are steered in the direction of the opposite polarity from the polarity of the yaw rate of the actual vehicle 1).

In the present embodiment, therefore, δf_max_c and −δf_max_c are corrected according to expressions 08a and 08b given below on the basis of the yaw rates γd and γmax of the model vehicle thereby to set the upper limit value δf_max and the lower limit value δf_min of the permissible range of the model front wheel steering angle δf_d.

$$\delta f\_max = \delta f\_max\_c + fe(\gamma d, \gamma max) \qquad \text{Expression 08a}$$

$$\delta f\_min = -\delta f\_max\_c - fe(-\gamma d, -\gamma max) \qquad \text{Expression 08b}$$

fe(γd, γmax) and fe(−γd, −γmax) in expressions 08a and 08b are functions of γd and γmax, and the function values thereof are, for example, functions that vary according to the values of γd and γmax, as illustrated in the graphs of FIGS. 7(a) and (b). In this example, the value of the function fe(γd, γmax) takes a positive fixed value fex if γd takes a value of a predetermined value γ1, which is slightly larger than zero, or less (including a case where γd<0), as illustrated in the graph of FIG. 7(a) And, the value of fe(γd, γmax) monotonously decreases as γd increases if γd>γ1 and reaches zero by the time γd reaches γ2(>γ1), which is a predetermined value of γmax or less. Further, the value of fe(γd, γmax) is maintained at zero if γd>γ2 (including the case where γd≧γmax).

Further, a function fe(−γd, −γmax) is a function obtained by reversing the polarities of the variables γd and γmax of the function fe(γd, γmax), so that the value of the function fe(−γd, −γmax) varies in relation to γd, as illustrated in the graph of FIG. 7(b). More specifically, if γd takes a value of a predetermined negative value −γ1, which is slightly smaller than zero, or more (including the case where γd>0), then the function takes a positive fixed value fex. And, the value of fe(−γd, −γmax) monotonously decreases as γd decreases if γd<−γ1 and reaches zero by the time when γd reaches −γ2, which is a predetermined value of −γmax or more. Further, the value of fe(−γd, −γmax) is maintained at zero if γd<−γ2 (including the case where γd<−γmax).

As the value of γd required for determining the values of the functions fe(γd, γmax) and fe(−γd, −γmax), the last time value of the reference yaw rate γd determined by the reference dynamic characteristic model 16 may be used.

Further, the values γ1 and γ2 of γd at breakpoints of the graph of the function fe(γd, γmax) or the aforesaid positive fixed value fex may be variably changed according to the estimated friction coefficient μestm or the actual traveling velocity Vact.

The permissible range of the model front wheel steering angle δf_d [δf_min, δf_max] is set by correcting δf_max_c on the basis of the value of the function fe as described above, so that the magnitude (the absolute value) of the limit value δf_max or δf_min of the model front wheel steering angle δf_d in the direction opposite from the direction of γd is set to be larger than the limit steering angle δf_max_c at a normal circular turn associated with the limit of a centrifugal force generated in the model vehicle. This makes it possible to prevent the model front wheel steering angle δf_d from being subjected to unwanted restriction in the countersteering state of the actual vehicle 1. Incidentally, the permissible range [−δf_min, δf_max] narrows as the actual traveling velocity Vact increases or as the estimated friction coefficient μestm decreases.

After setting the permissible range of the model front wheel steering angle δf_d as described above, the excessive centrifugal force prevention limiter 14f directly outputs the value of ef_ltd1 as the second limited front wheel steering angle δf_ltd2 (=the model front wheel steering angle δf_d to be input to the reference dynamic characteristic model 16) if the received first limited front wheel steering angle δf_ltd1 takes a value within the permissible range [δf_min, δf_max] (if δf_min≦δf_ltd1≦δf_max). Further, if the value of the received δf_ltd1 deviates from the permissible range [δf_min, δf_max], then the excessive centrifugal force prevention limiter 14f outputs a value obtained by forcibly restricting the input value as the second limited front wheel steering angle δf_ltd2. To be more specific, if δf_ltd1>δf_max, then δf_max is output as the second limited front wheel steering angle [δf_ltd2], and if δf_ltd1<δf_min, then δf_min is output as the second limited front wheel steering angle δf_ltd2. Thus, δf_ltd2 is determined such that it agrees with the first limited front wheel steering angle δf_ltd1 or takes a value that is closest to the first limited front wheel steering angle δf_ltd1 within the permissible range [δf_min, δf_max].

In the reference dynamic characteristic model 16 represented by the expression 01, the relationship of expression 09 given below holds between βd and γd at a normal circular turn of the model vehicle.

[Mathematical Expression 4]

$$\beta d = \left(1 - \frac{m}{2 \cdot L} \cdot \frac{Lf}{Lr \cdot Kr} \cdot Vd^2\right) \cdot \frac{Lr}{Vd} \cdot \gamma d \qquad \text{Expression 09}$$

If Vd is sufficiently small, then expression 09 can be approximately rewritten to the following expression 10.

$$\beta d = (Lr/Vd) \cdot \gamma d \qquad \text{Expression 10}$$

Hence, the value of γd or γmax at the normal circular turn of the model vehicle can be converted into a value of βd (provided Vd=Vact) according to expression 09 or expression 10. Therefore, the permissible range of the model front wheel steering angle δf_d may be set on the basis of the value of the vehicle center-of-gravity point side slip angle βd associated with the yaw rates γd and γmax instead of setting the permissible range of the model front wheel steering angle δf_d on the basis of the values of the yaw rates γd and γmax as described above.

The above has presented the details of the processing by the reference manipulated variable determiner 14.

The processing by the reference manipulated variable determiner 14 described above determines, at each control processing cycle, the second limited front wheel steering angle δf_ltd2 as the model front wheel steering angle δf_d to be input to the reference dynamic characteristic model 16 on the basis of the steering angle θh among drive manipulation inputs such that an instantaneous value of the front wheel side slip angle βf_d of the model vehicle on the reference dynamic characteristic model 16 does not become excessive and the centrifugal force generated in the model vehicle does not become excessive.

Supplementally, in the excessive centrifugal force prevention limiter 14f, limiting the model front wheel steering angle δf_d to be input to the reference dynamic characteristic model 16 as described above to prevent the centrifugal force generated in the model vehicle from becoming excessive is equivalent to limiting the model front wheel steering angle δf_d to prevent the vehicle center-of-gravity point side slip angle βd (or the rear wheel side slip angle βr_d) of the model vehicle from becoming excessive. Further, in general, a centrifugal force in the vehicle or a vehicle center-of-gravity point side slip angle (or a rear wheel side slip angle) is generated with a delay from a steering operation, so that the processing for limiting the model front wheel steering angle δf_d performed by the excessive centrifugal force prevention limiter 14f may be said to be the processing for limiting the model front wheel steering angle δf_d on the basis of a predicted convergence values of a centrifugal force of the vehicle or a vehicle center-of-gravity point side slip angle (or a rear wheel side slip angle). In contrast to this, the limiting processing by the front wheel side slip angle limiter 14d may be said to be the processing for limiting the model front wheel steering angle δf_d to prevent an instantaneous value of the front wheel side slip angle βf_d of the model vehicle from becoming excessive.

In the present embodiment, the function fe used to set the permissible range [δf_min, δf_max] by the excessive centrifugal force prevention limiter 14f has been set as illustrated in FIGS. 7(a) and (b) described above; however, the method for setting the function fe it is not limited thereto.

For instance, the function fe(γd, γmax) may be set as shown by the solid-line graph in FIG. 8. In this example, the value of fe(γd, γmax) monotonously decreases as the value of γd increases (increases from a value on the negative side to a value on the positive side) and becomes zero when γd=γmax. At this time, the function fe(−γd, −γmax) will be as indicated by the dashed-line graph in FIG. 8. In this case, the upper limit value δf_max of the permissible range of the model front wheel steering angle δf_d determined by the expression 08a will be closer to zero than the limit steering angle δf_max_c at normal circular turn as γd increases when γd exceeds γmax. Similarly, the lower limit value δf_min of the permissible range of the model front wheel steering angle δf_d determined by the expression 08b will be closer to zero than −δf_max as γd decreases (as the magnitude increases) when γd exceeds −γmax onto the negative side.

Further, instead of the expressions 08a and 08b, the following expressions 11a and 11b may be used to set the upper limit value δf_max and the lower limit value δf_min of the permissible range of δf_d, and the functions fe(γd, γmax) and fe(−γd, −γmax) may be set as indicated by, for example, the solid-line and dashed-line graphs in FIG. 9.

$$\delta f\_max = \delta f\_max\_c \cdot fe(\gamma d, \gamma max) \qquad \text{Expression 11a}$$

$$\delta f\_min = -\delta f\_max\_c \cdot fe(-\gamma d, -\gamma max) \qquad \text{Expression 11b}$$

In this example, the values of fe(γd, γmax) and fe(−γd, −γmax) are always 1 or more and change with γd in the same manner as those illustrated in FIGS. 7(a) and (b). Then, δf_max_c and δf_min c are multiplied by these values of fe(γd, γmax) and fe(−γd, −γmax), respectively, to set the upper limit value δf_max and the lower limit value δf_min.

Further, the second limited front wheel steering angle δf_ltd2 may be determined by, for example, the processing described below in place of setting the permissible range [δf_min, δf_max] of the model front wheel steering angle δf_d by correcting δf_max_c on the basis of a value of the function fe. FIG. 10 is a functional block diagram for explaining the processing function.

A front wheel steering angle correction Δδf for correcting the first limited front wheel steering angle δf_ltd1 calculated by the subtractor 14e (refer to FIG. 6) is determined on the basis of the yaw rate γd (last time value) of the model vehicle in a processor 14g. At this time, Δδf is basically determined such that the value of Δδf monotonously increases on the positive side as γd increases on the positive side, while the value of Δδf monotonously decreases on the negative side as γd decreases on the negative side, as illustrated by the graph in the processor 14g. In the graph in the processor 14g, the value of Δδf is provided with an upper limit value (>0) and a lower limit value (<0). In this case, the upper limit value and the lower limit value are set such that, for example, the absolute values thereof are the same values as the fixed values fex illustrated in FIGS. 7(a) and (b) described above.

Subsequently, the front wheel steering angle correction Δδf determined as described above is added by an adder 14h to the first limited front wheel steering angle δf_ltd1 calculated by the subtractor 14e (refer to FIG. 6) thereby to determine a first limited front wheel steering angle with input correction. In this case, if the direction of δf_ltd1 and the direction of γd are opposite from each other, then the magnitude of the first limited front wheel steering angle with input correction will be smaller than the magnitude of δf_ltd1. However, if the direction of δf_ltd1 and the direction of γd are the same, then the magnitude of the first limited front wheel steering angle with input correction will be larger than the magnitude of δf_ltd1.

Subsequently, the first limited front wheel steering angle with input correction is passed through the excessive centrifugal force prevention limiter 14f to determine a second limited front wheel steering angle with input correction obtained by restricting the first limited front wheel steering angle with input correction to a value within the permissible range [δf_min, δf_max] of the model front wheel steering angle δf_d. In other words, if the first limited front wheel steering angle with input correction has a value within the permissible range, then the first limited front wheel steering angle with input correction is directly determined as the second limited front wheel steering angle with input correction. Further, if the first limited front wheel steering angle with input correction deviates from the permissible range, then either one of δf_max and δf_min which has a value closer to the first limited front wheel steering angle with input correction is determined as the second limited front wheel steering angle with input correction.

In this case, the upper limit value δf_max(>0) of the permissible range of the model front wheel steering angle δf_d in the excessive centrifugal force prevention limiter 14f is set to a value that is slightly larger than the steering angle limit value at normal circular turn δf_max_c (e.g., δf_max_c+fex), taking into account the correction of δf_ltd1 when the direction of δf_ltd1 and the direction of γd are the same. Similarly, the lower limit value δf_min(<0) of the permissible range of the model front wheel steering angle δf_d is set such that the absolute value thereof will be a value that is slightly larger than δf_max_c (e.g., −δf_max_c-fex).

Subsequently, the front wheel steering angle correction Δδf is subtracted by a subtractor 14i from the second limited front wheel steering angle with input correction determined as described above, thereby determining the second limited front wheel steering angle δf_ltd2.

The model front wheel steering angle δf_d (=δf_ltd2) to be input to the reference dynamic characteristic model 16 can be determined while preventing the centrifugal force generated in the model vehicle from becoming excessive and also preventing unwanted restriction from being placed in the countersteering state of the actual vehicle 1 even when the second limited front wheel steering angle δf_ltd2 is determined as described above.

In the present embodiment, the processing by the front wheel side slip angle limiter 14d and the excessive centrifugal force prevention limiter 14f has been carried out to determine the model front wheel steering angle δf_d to be input to the reference dynamic characteristic model 16; however, the processing by one or both of them may be omitted. More specifically, the unlimited front wheel steering angle δf_unltd determined by the processor 14a or a value obtained by supplying the δf_unltd to the excessive centrifugal force prevention limiter 14f or the first limited front wheel steering angle δf_ltd1 determined by the subtractor 14e may be determined as the model front wheel steering angle δf_d to be input to the reference dynamic characteristic model 16.

The current time value of the model front wheel steering angle δf_d (=the current time value of δf_ltd2) determined by the reference manipulated variable determiner 14 as described above is input to the reference dynamic characteristic model 16, and the current time values of the reference yaw rate γd and the reference vehicle center-of-gravity point side slip angle βd are newly determined by the reference dynamic characteristic model 16 (according to the expression 01 or expression 103) from the above input value and the virtual external forces Fvir and Mvir (last time values) determined by the FB distribution law 20, as will be discussed later. This processing is actually carried out according to an expression obtained by representing expression 01 in terms of a discrete-time system, so that the last time values of γd and βd are also used to determine the current time values of γd and βd. Further, the value of the model characteristics adjusting parameter k2 of the characteristics adjusting matrix K in expression 01 or the value of inertia I' in expression 103 is set on the basis of the traveling velocity Vd (=Vact), as described above.

In this case, the model front wheel steering angle δf_d input to the reference dynamic characteristic model 16 is restricted by the reference manipulated variable determiner 14 as previously described, thus preventing the occurrence of a spin or an extreme side slip of the model vehicle.

[About the FB Distribution Law]

The details of the processing by the FB distribution law 20 will now be described with reference to FIG. 11 to FIG. 18.

FIG. 11 is a functional block diagram illustrating the processing function of the FB distribution law 20. As illustrated in the figure, the processing function of the FB distribution law 20 is roughly constituted of a virtual external force determiner 20a which carried out the processing for determining the virtual external forces Mvir and Fvir and an actuator operation FB target value determiner 20b which carries out the processing for determining an actuator operation FB target value.

First, the virtual external force determiner 20a will be described with reference to FIG. 11. The processing function of the virtual external force determiner 20a is roughly divided into a virtual external force temporary value determiner 201 and a γβ limiter 202.

In the processing by the virtual external force determiner 20a, first, temporary values Mvirtmp and Fvirtmp of virtual external forces are determined by the virtual external force temporary value determiner 201 on the basis of state amount errors γerr (=γact−γd), βerr (=βact−βd) input from the subtractor 18. Mvirtmp of the temporary values Mvirtmp and Fvirtmp means a moment (a moment in the yaw direction) to be additionally generated about the center-of-gravity point Gd of the model vehicle of the reference dynamic characteristic model 16 in order to approximate the state amount errors γerr and βerr to zero, and Fvirtmp means a translational force (a lateral translational force of the model vehicle) to be additionally applied to the center-of-gravity point Gd of the model vehicle of the reference dynamic characteristic model 16 in order to approximate the state amount errors γerr and βerr to zero.

To be specific, as shown by expression 15 given below, a vector composed of the input state amount errors γerr and βerr (γerr, βerr)$^T$ (the superscript T means transposition) is multiplied by a predetermined gain matrix Kfvir thereby to determine the temporary values Mvirtmp and Fvirtmp of the virtual external force (hereinafter referred to as the virtual external force temporary values Mvirtmp and Fvirtmp).

[Mathematical Expression 5]

$$\begin{bmatrix} Fvirtmp \\ Mvirmp \end{bmatrix} = Kfvir \cdot \begin{bmatrix} \beta\ err \\ \gamma\ err \end{bmatrix} \quad \text{Expression 15}$$

where $$Kfvir \equiv \begin{bmatrix} Kfvir11 & Kfvir12 \\ Kfvir21 & Kfvir22 \end{bmatrix}$$

According to the expression 15, the virtual external force temporary values Mvirtmp and Fvirtmp are determined as the temporary values of control inputs to be fed back to the reference dynamic characteristic model 16 to approximate the state amount errors γerr and βerr to zero.

If it is required that the γβ limiter 202, which will be described in detail below, generates an intense action for bringing βd or βact back to a predetermined permissible range only if the vehicle center-of-gravity point side slip angle βd of the model vehicle or the actual vehicle center-of-gravity point side slip angle βact of the actual vehicle 1 is about to exceed or has exceeded the permissible range, then βerr is desirably converged to zero by a characteristic close to a primary delay characteristic with a small time constant. For this purpose, for example, Kfvir12 among gain matrix Kfvir components may be set to zero and Kfvir11 may be set such that the absolute value thereof increases.

Subsequently, the γβ limiter 202 carries out the processing for correcting the virtual external force temporary values Mvirtmp and Fvirtmp so as to restrain the yaw rate γd and the vehicle center-of-gravity point side slip angle βd of the model vehicle on the reference dynamic characteristic model 16 from deviating from the respective predetermined permissible ranges thereof.

More specifically, the γβ limiter 202 first carries out the processing by a prediction calculator 203. The prediction calculator 203 predicts the yaw rate γd and the vehicle center-of-gravity point side slip angle βd of the model vehicle after predetermined time (after the time equivalent to a predetermined number of one or more control processing cycles), and outputs those predicted values as the predicted yaw rate γda and a predicted vehicle center-of-gravity point side slip angle βda.

At this time, the prediction calculator 203 receives the reference yaw rate γd (current time value) and the reference vehicle center-of-gravity point side slip angle βd (current time value) determined by the reference dynamic characteristic model 16, the actual traveling velocity Vact (current time value) detected or estimated by the sensor/estimator 12, the second limited front wheel steering angle δf_ltd2 (current time value) determined by the reference manipulated variable determiner 14, and the virtual external force temporary values Mvirtmp and Fvirtmp (current time values) determined as described above by the virtual external force temporary value determiner 201. Then, the prediction calculator 203 calculates the predicted yaw rate γda and the predicted vehicle center-of-gravity point side slip angle βda on the basis of expression 01 or expression 103 described above on the assumption that the model front wheel steering angle δf_d is held at the input δf_ltd2, the virtual external forces Mvir and Fvir to be applied to the model vehicle are held at the input Mvirtmp and Fvirtmp, and the traveling velocity Vd of the model vehicle is held at the input Vact.

Subsequently, the γβ limiter 202 passes the γda and βda calculated by the prediction calculator 203 as described above through a γ dead-zone processor 204 and a β dead-zone processor 205, respectively, to determine the amounts of deviation γover and βover from predetermined permissible ranges of γda and βda, respectively. The graph of the γ dead-zone processor 204 illustrated in the figure is a graph illustrating the relationship between γda and γover, the values in the direction of the axis of abscissas related to the graph indicating the values of γda, while the values in the direction of the axis of ordinates indicating the values of γover. Similarly, the graph of the β dead-zone processor 205 illustrated in the figure is a graph illustrating the relationship between βda and βover, the values in the direction of the axis of abscissas related to the graph indicating the values of βda, while the values in the direction of the axis of ordinates indicating the values of βover.

The permissible range in the γ dead-zone processor 204 is a permissible range (a permissible range of the yaw rate γd) having the lower limit value and the upper limit value thereof set to γdamin(<0) and γdamax(>0), respectively, and the permissible range in the β dead-zone processor 205 is a permissible range (a permissible range of the vehicle center-of-gravity point side slip angle βd) having the lower limit value and the upper limit value thereof set to βdamin(<0) and βdamax(>0), respectively.

In the present embodiment, the permissible range [γdamin, γdamax] related to the yaw rate γd is set such that, for example, the centrifugal force generated in the model vehicle when a normal circular turn is made while holding the traveling velocity Vd of the model vehicle at Vact (current time value) and also holding the yaw rate γd of the model vehicle at γdamin or γdamax does not exceed a limit value of a frictional force based on the estimated friction coefficient μestm (current time value). In other words, γdamax and γdamin are set on the basis of Vact (current time value) and μestm (current time value) such that expressions 16a and 16b shown below are satisfied.

$$m \cdot Vact \cdot \gamma damax < \mu estm \cdot m \cdot g \quad \text{Expression 16a}$$

$$m \cdot Vact \cdot \gamma damin > -\mu estm \cdot m \cdot g \quad \text{Expression 16b}$$

γdamax, γdamin may be set such that, for example, the absolute value of each thereof will be the same value as the maximum yaw rate γmax at a normal circular turn determined according to the expression 05 (provided γdamax=γmax and γdamin=−γmax). Alternatively, however, the γdamax and γdamin may be set such that the absolute values thereof are different values from γmax (e.g., values that are smaller than γmax).

Further, the permissible range [βdamin, βdamax] related to the vehicle center-of-gravity point side slip angle βd is set, for example, within a range of a vehicle center-of-gravity point side slip angle that maintains the relationship between the vehicle center-of-gravity point side slip angle of the actual vehicle 1 and the translational force in the lateral direction applied to the center-of-gravity point of the actual vehicle 1 to be a substantially linear relationship (proportional relationship). In this case, βdamin and βdamax are desirably set on the basis of at least one of Vact (current time value) and μestm (current time value).

Further, specifically, the processing by the γ dead-zone processor 204 sets γover=0 if an input γda is a value within a predetermined permissible range [γdamin, γdamax] (if γdamin≦γda≦γdamax), or sets γover=γda−γdamin if γda<γdamin, or sets γover=γda−γdamax if γda>γdamax.

Thus, the amount of deviation γover of the predicted yaw rate γda from the permissible range [γdamin, γdamax] is determined.

Similarly, the processing by the β dead-zone processor 205 sets βover=0 if the value of an input βda is a value within a predetermined permissible range [βdamin, βdamax] (if βdamin≦βda≦βdamax), or sets βover=βda−βdamin if βda<βdamin, or sets βover=βda−βdamax if βda>βdamax. Thus, the amount of deviation βover of the predicted vehicle center-of-gravity point side slip angle βda from the permissible range [βdamin, βdamax] is determined.

Subsequently, the γβ limiter 202 calculates, by a processor 206, the temporary value manipulated variables Mvir_over and Fvir_over, which are the correction amounts of the virtual external force temporary values Mvirtmp and Fvirtmp, such that these amounts of deviation γover and βover are approximated to zero.

To be more specific, as indicated by expression 17 given below, a vector (γover, βover) T composed of γover and βover is multiplied by a predetermined gain matrix Kfov to determine Mvir_over and Fvir_over.

[Mathematical Expression 6]

$$\begin{bmatrix} Fvir\_over \\ Mvir\_over \end{bmatrix} = Kfov \cdot \begin{bmatrix} \beta\ over \\ \gamma\ over \end{bmatrix} \quad \text{Expression 17}$$

where $$Kfov \equiv \begin{bmatrix} Kfov11 & Kfov12 \\ Kfov21 & Kfov22 \end{bmatrix}$$

Subsequently, the γβ limiter 202 subtracts the temporary value manipulated variables Mvir_over and Fvir_over from the virtual external force temporary values Mvirtmp and Fvirtmp by a subtractor 207 to determine the current time values of the virtual external forces Mvir and Fvir. In other words, the virtual external forces Mvir and Fvir are determined according to the following expressions 18a and 18b.

$$Mvir = Mvirtmp - Mvir\_over \quad \text{Expression 18a}$$

$$Fvir = Fvirtmp - Fvir\_over \quad \text{Expression 18b}$$

The processing by the virtual external force determiner 20a is carried out as described above thereby to determine the virtual external forces Mvir and Fvir such that the state amount errors γerr and βerr are approximated to zero, while restraining the predicted yaw rate γda and the predicted vehicle center-of-gravity point side slip angle βda from deviating from the permissible ranges [γdamin, γdamax] and [βdamin, βdamax], respectively.

The γβ limiter 202 of the virtual external force determiner 20a described above determines the virtual external forces Mvir and Fvir by correcting the virtual external force temporary values Mvirtmp and Fvirtmp on the basis of the temporary value manipulated variables Mvir_over and Fvir_over (more generally speaking, Mvir and Fvir are determined by the linear coupling of Mvir_over and Mvirtmp and the linear coupling of Fvir_over and Fvirtmp, respectively). Alternatively, however, the virtual external forces Mvir and Fvir may be determined as described below. FIG. 12 is a functional block diagram for explaining the processing.

Referring to the figure, in this example, the processing by the virtual external force temporary value determiner 201, the prediction calculator 203, the γ dead-zone processor 204, the β dead-zone processor 205, and a processor 206 is the same as that illustrated in FIG. 11. Meanwhile, in the present example, the temporary value manipulated variables Fvir_over and Mvir_over determined by the processor 206 are input to processors 208 and 209, respectively, and correction coefficients Katt1(≧0) and Katt2(≧0) for correcting the virtual external force temporary values Mvirtmp and Fvirtmp, respectively, are determined in the processors 208 and 209. These correction coefficients Katt1 and Katt2 are correction coefficients serving as multipliers for the virtual external force temporary values Mvirtmp and Fvirtmp, respectively. The graph related to the processor 208 illustrated in the figure is a graph illustrating the relationship between Mvir_over and Katt1, the values in the direction of the axis of abscissas related to the graph indicating the values of Mvir_over and the values in the direction of the axis of ordinates indicating the values of Katt1. Similarly, the graph related to the processor 209 illustrated in the figure is a graph illustrating the relationship between Fvir_over and Katt2, the values in the direction of the axis of abscissas related to the graph indicating the values of Fvir_over and the values in the direction of the axis of ordinates indicating the values of Katt2.

The processing by the processor 208 sets Katt1=1 if Mvir_over is zero and sets the value of Katt1 such that the value of Katt1 monotonously decreases from 1 to 0 as the absolute value of Mvir_over increases from zero, as illustrated by the graph in the figure. Further, the value of Katt1 is maintained at zero if the absolute value of Mvir_over exceeds a predetermined value (a value at which Katt1 reaches zero).

Similarly, the processing by the processor 209 sets Katt2=1 if Fvir_over is zero and sets the value of Katt2 such that the value of Katt2 monotonously decreases from 1 to 0 as the absolute value of Fvir_over increases from zero, as illustrated by the graph in the figure. Further, the value of Katt2 is maintained at zero if the absolute value of Fvir_over exceeds a predetermined value (a value at which Katt2 reaches zero).

Subsequently, the correction coefficients Katt1 and Katt2 determined as described above are multiplied by the virtual external force temporary values Mvirtmp and Fvirtmp by multipliers 210 and 211, respectively, thereby determining the current time values of the virtual external forces Mvir and Fvir.

Thus, in the example illustrated in FIG. 12, the virtual external force Mvir is determined such that the magnitude of the virtual external force Mvir is narrowed (approximated to zero) relative to the virtual external force temporary value Mvirtmp as the absolute value of the amount of deviation Mvir_over increases. Similarly, the virtual external force Fvir is determined such that the magnitude of the virtual external force Mvir is narrowed (approximated to zero) relative to the virtual external force temporary value Mvirtmp as the absolute value of the amount of deviation Fvir_over increases. Thus, determining the virtual external forces Mvir and Fvir means to regard that the deviation of γda and βda from their permissible ranges is attributable to the virtual external forces Mvir and Fvir and to determine the virtual external forces Mvir and Fvir such that the state amount errors γerr and βerr are approximated to zero while restraining the deviation of γda and βda from their permissible ranges [γdamin, γdamax] and [βdamin, βdamax]. In this case, desirably, in the reference manipulated variable determiner 14, the model front wheel steering angle δf_d to be input to the reference dynamic characteristic model 16 is limited, as described above.

Further, in the γβ limiter 202 described above, the predicted yaw rate γda and the predicted vehicle center-of-gravity point side slip angle βda determined using expression 01 or expression 103 as described above by the prediction calculator 203 have been input to the γ dead-zone processor 204 and the β dead-zone processor 205 to determine the deviation amounts γover and βover. At this time, however, in place of γda and βda, the current time values of the reference yaw rate γd and the reference vehicle center-of-gravity point side slip angle βd, or the current time values of the actual yaw rate γact and the actual vehicle center-of-gravity point side slip angle βact, or the values obtained by filtering these values may be used.

For example, at each control processing cycle, the current time value of γd in place of γda may be input to the γ dead-zone processor 204, and a value obtained by filtering, in which a transfer function is represented in the form of $(1+T1 \cdot s)/(1+T2 \cdot s)$, the βd sequentially calculated by the reference dynamic characteristic model 16 (T1 and T2 denoting certain time constants and s denoting a Laplace operator) may be input in place of βda into the β dead-zone processor 205. In this case, if the time constants T1 and T2 are set such that, for example, T1>T2, then the filtering processing functions as a so-called phase advancing compensation element. At this time, advancing the phase of a frequency component of βd in a frequency band which is high to a certain degree and enhancing a gain relative to the frequency component make it possible to limit the virtual external forces Mvir and Fvir on the basis of βover before the value itself of βd determined at each control processing cycle deviates from the permissible range [βdamin, βdamax].

Further, in the prediction calculator 203, as indicated by the following expressions 19a and 19b, an appropriate coefficient cij may be used to determine, as γda and βda, the values obtained by linearly coupling the current time values of γd and βd.

$$\gamma da = c11 \cdot \gamma d + c12 \cdot \beta d \quad \text{Expression 19a}$$

$$\beta da = c21 \cdot \gamma d + c22 \cdot \beta d \quad \text{Expression 19b}$$

Alternatively, as indicated by the following expressions 20a and 20b, an appropriate coefficient cij may be used to determine, as γda and βda, the values obtained by linearly coupling the current time values of γd, βd, Mvirtmp, Fvirtmp, and δf_ltd2.

$$\gamma da = \qquad\qquad 20a$$
$$c11 \cdot \gamma d + c12 \cdot \beta d + c13 \cdot Mvirtmp + c14 \cdot Fvirtmp + c15 \cdot \delta f\_ltd2$$

$$\beta da = \qquad\qquad 20b$$
$$c21 \cdot \gamma d + c22 \cdot \beta d + c23 \cdot Mvirtmp + c24 \cdot Fvirtmp + c25 \cdot \delta f\_ltd2$$

These expressions 20a and 20b present more generalized representation of the processing by the prediction calculator 203 described above.

Alternatively, as shown by the following expressions 21a and 21b, an appropriate coefficient cij may be used to determine, as γda and βda, the values obtained by linearly coupling the current time values of γact and βact.

$$\gamma da = c11 \cdot \gamma act + c12 \cdot \beta act \quad \text{Expression 21a}$$

$$\beta da = c21 \cdot \gamma act + c22 \cdot \beta act \quad \text{Expression 21b}$$

Alternatively, as shown by the following expressions 22a and 22b, an appropriate coefficient cij may be used to determine, as γda and βda, the values obtained by linearly coupling the current time values of γd, βd and a temporal differential value dβd/dt of βd, γact, βact and a temporal differential value dβact/dt of βact, Mvirtmp, Fvirtmp, and δf_ltd2.

$$\gamma da = c11 \cdot \gamma d + c12 \cdot \beta d + c13 \cdot \frac{d\beta d}{dt} + c14 \cdot \gamma act + c15 \cdot \beta act + \qquad 22a$$
$$c16 \cdot \frac{d\beta act}{dt} + c17 \cdot Mvirtmp + c18 \cdot Fvirtmp + c19 \cdot \delta f\_ltd2$$

$$\gamma da = c21 \cdot \gamma d + c22 \cdot \beta d + c23 \cdot \frac{d\beta d}{dt} + c24 \cdot \gamma act + c25 \cdot \beta act + \qquad 22b$$
$$c26 \cdot \frac{d\beta act}{dt} + c27 \cdot Mvirtmp + c28 \cdot Fvirtmp + c29 \cdot \delta f\_ltd2$$

Alternatively, the weighted mean value of the value of the computation result of the right side of expression 20a and the value of the computation result of the right side of expression 21a and the weighted mean value of the value of the computation result of the right side of expression 20b and the value of the computation result of the right side of expression 21b may be determined as γda and βda, respectively. This is an example of the case where γda and βda are determined according to expression 22a and expression 22b. The terms of Mvirtmp and Fvirtmp in expression 20a and expression 20b or expression 22a and expression 22b may be omitted.

Alternatively, the predicted values of γd and βd at each control processing cycle until after predetermined time may be determined according to the expression 01 or expression 103 and the peak values of the determined γd and βd may be determined as γda and βda.

Further, even in the case where γda and βda are determined using any of expression 20a and expression 20b, or expression 21a and expression 21b, or expression 22a and expression 22b, the coefficient cij of these expressions may be provided with a frequency characteristic (in other words, the value of a variable to be multiplied by cij may be subjected to filtering by a low-pass filter or the like). Alternatively, the limitation of a temporal change rate of the variable may be placed on the value of the variable to be multiplied by the coefficient cij.

Supplementally, if γda and βda are determined by expression 21a and expression 21b or expression 22a and expression 22b described above, then each coefficient cij is desirably set such that the γda and βda bear meanings as the predicted values of the actual yaw rate γact and the actual vehicle center-of-gravity point side slip angle βact of the actual vehicle 1 after predetermined time.

If the reference dynamic characteristic model 16 is a linear model as represented by the expression 01 or expression 103, then βda and βda can be properly determined as the predicted values of a yaw rate and a vehicle center-of-gravity point side slip angle of the actual vehicle 1 or the model vehicle after predetermined time by using any of expression 20a and expression 20b, or expression 21a and expression 21b, or expression 22a and expression 22b.

If the current time values of γact and βact or the values obtained by filtering γact and βact are used in place of γda and βda, or if γda and βda are determined by expression 21a and expression 21b or expression 22a and expression 22b described above, then the virtual external forces Mvir and Fvir will be determined such that the state amount errors γerr and βerr are approximated to zero while restraining the current time values or filtered values or predicted values of the actual yaw rate γact and the actual vehicle center-of-gravity point side slip angle βact of the actual vehicle 1 from deviating from the permissible ranges [γdamin, γdamax] and [βdamin, βdamax], respectively.

Supplementally, more generally, the processing by the virtual external force determiner 20a may determine the virtual external forces Mvir and Fvir according to expression 200 given below.

[Mathematical Expression 7]

$$\begin{bmatrix} Fvir \\ Mvir \end{bmatrix} = \begin{bmatrix} Kfb11 & Kfb12 & Kfb13 & Kfb14 & Kfb15 & Kfb16 \\ Kfb21 & Kfb22 & Kfb23 & Kfb24 & Kfb25 & Kfb26 \end{bmatrix} \begin{bmatrix} \beta\_d \\ \gamma\_d \\ \beta\_act \\ \gamma\_act \\ \beta\_over \\ \gamma\_over \end{bmatrix} + \begin{bmatrix} Kfb\_\delta1 \\ Kfb\_\delta2 \end{bmatrix} \cdot \delta f\_ltd2 \quad \text{Expression 200}$$

Further, in the γ dead-zone processor 204 and the β dead-zone processor 205 of the γβ limiter 202, the amounts of deviation γover and βover have been determined by separately setting the permissible ranges [γdamin, γdamax] and [βdamin, βdamax] of γda and βda, respectively; alternatively, however, a permissible range (permissible area) for a pair of γda and βda may be set, considering the correlativity between γda and βda, to determine the amounts of deviation γover and βover.

For example, as illustrated in FIG. 13, an area A (a parallelogram area) enclosed by straight lines 1 to 4 on a coordinate plane having γda on the axis of abscissa and βda on the axis of ordinates is set as a permissible area A for a pair of γda and βda. In this case, the straight lines 1 and 3 are the straight lines that define a lower limit value and an upper limit value, respectively, of γda. The lower limit value and the upper limit value are set, for example, in the same manner as that for the lower limit value γdamin and the upper limit value γdamax of the permissible range [γdamin, γdamax] in the γ dead-zone processor 204. The straight lines 2 and 4 are the straight lines that define a lower limit value and an upper limit value, respectively, of βda. In this example, the setting is made such that the lower limit value and the upper limit value, respectively, linearly change according to γda. Further, the amounts of deviation γover and βover are determined, for example, as follows. If the pair of γda and βda exists within the permissible area A, as indicated by a point P1 in FIG. 13, then γover=βover=0. On the other hand, if the pair of γda and βda deviates from the permissible area A, as indicated by, for example, a point P2 in FIG. 13, then a point P3 on the boundary of the permissible area A that is closest to the point P2 among the points on the straight line 5 which passes the point P2 and has a predetermined inclination (a point P3 closest to P2 among the points existing on a straight line 5 in the permissible area A) is determined. Then, the difference between the value of γda at the point P2 and the value of γda at the point P3 is determined as the amount of deviation γover, and the difference between the value of βda at the point P2 and the value of βda at the point P3 is determined as the amount of deviation βover. If a point associated with the pair of γda and βda is, for example, a point P4 illustrated in FIG. 13, i.e., if a straight line 6 having a predetermined inclination (the same inclination as that of the straight line 5) to pass the point P4 associated with the pair of γda and βda does not intersect with the permissible area A (if no point exists on the straight line 6 in the permissible range A), then the difference between the value of γda at the point P4 and the value of γda at the point P5, which is closest to the straight line 6 among the points in the permissible range A, may be determined as the amount of deviation γover, and the difference between the value of βda at the point P4 and the value of βda at the point P5 may be determined as the amount of deviation βover.

Supplementally, the permissible area of the pair of γda and βda does not have to be a parallelogram area, and it may alternatively be, for example, an area A' having smoothly shaped boundary portions (shaped with no angular portions of acute angles), as indicated by the dashed line in FIG. 13.

Further, in the γβ limiter 202, the amounts of deviation γover and βover from [γdamin, γdamax] and [βdamin, βdamax] have been determined on both γda and βda, then the temporary values Mvirtmp and Fvirtmp have been corrected on the basis thereof; alternatively, however, the temporary values Mvirtmp and Fvirtmp may be corrected on the basis of only one of γover and βover. In this case, the processing by the processor 206 may determine the temporary value manipulated variables Mvir_over and Fvir_over by fixing the value of either one of γover and βover to zero.

Next, the processing by the actuator operation FB target value determiner 20b will be described with reference to FIG. 14 to FIG. 16. In the following explanation, the wheels W1 to W4 may be referred to as an n-th wheel Wn (n=1, 2, 3, 4).

FIG. 14 is a functional block diagram illustrating the processing by the actuator operation FB target value determiner 20b. Referring to the figure, the actuator operation FB target value determiner 20b first determines in a processor 220 a feedback yaw moment basic required value Mfbdmd, which is a basic required value of a moment in the yaw direction to be generated about the center-of-gravity point G of the actual vehicle 1 in order to bring the state amount errors γerr and βerr close to zero on the basis of received state amount errors γerr and βerr, as the basic required value of a feedback control input to the actuator device 3 of the actual vehicle 1.

To be more specific, as indicated by expression 23 given below, a vector (βerr, γerr)$^T$ composed of βerr and γerr is multiplied by a predetermined gain matrix Kfbdmd (by linearly coupling βerr and γerr), thereby determining Mfbdmd.

[Mathematical Expression 8]

$$Mfbdmd = Kfbdmd \cdot \begin{bmatrix} \beta\_err \\ \gamma\_err \end{bmatrix} \quad \text{Expression 23}$$

where $$Kfbdmd \equiv [\; Kfbdmd1 \quad Kfbdmd2 \;]$$

Alternatively, Mfbdmd may be determined on the basis of βerr, γerr and a first-order differential value dβerr/dt of βerr. For example, a vector composed of βerr, γerr and dβerr/dt may be multiplied by an appropriate gain matrix (by linearly coupling βerr, γerr, and dβerr/dt by an appropriate coefficient) so as to determine Mfbdmd.

Alternatively, at least one of elements Kfbdmd1 and Kfbdmd2 of the gain matrix Kfbdmd may be multiplied by a phase compensating element whose transfer function is expressed by (1+Tc1·s)/(1+Tc2·s). For instance, Kfbdmd1, which is a multiplier for βerr, may be multiplied by the phase compensating element, and the values of time constants Tc1 and Tc2 may be set such that Tc1>Tc2. In such a case, the term obtained by multiplying Kfbdmd1 by βerr will be equivalent to the result obtained by passing βerr and a differential value thereof, which have been linearly coupled, through a high-cut filter.

Subsequently, the actuator operation FB target value determiner 20b passes the Mfbdmd through a dead-zone processor 221 to determine a dead zone excess feedback yaw moment required value Mfbdmd_a. The graph of the dead zone processor 221 in the figure is a graph illustrating the relationship between Mfbdmd and Mfbdmd_a, the values in the direction of the axis of abscissas related to the graph indicating the values of Mfbdmd, while the values in the direction of the axis of ordinates indicating the values of Mfbdmd_a.

According to the present embodiment, in the feedback control of the actuator devices 3 of the actual vehicle 1, mainly the braking device of the driving/braking device 3A among the actuator devices 3 is operated to approximate the state amount errors γerr and βerr to zero. In this case, if the braking device is operated on the basis of Mfbdmd determined as described above, there is a danger that the braking device will be frequently operated. To prevent this, according to the present embodiment, the braking device is operated on the basis of the dead zone excess feedback yaw moment required value Mfbdmd_a obtained by passing Mfbdmd through the dead zone processor 221.

To be more specific, the processing by the dead zone processor 221 is carried out as follows. The dead zone processor 221 sets Mfbdmd_a=0 if the value of Mfbdmd exists in a predetermined dead zone established in the vicinity of zero. The dead zone processor 221 sets Mfbdmd_a=Mfbdmd−upper limit value if Mfbdmd is larger than an upper limit value (>0) of the dead zone, while the dead zone processor 221 sets Mfbdmd_a=Mfbdmd−lower limit value if Mfbdmd is smaller than a lower limit value (<0) of the dead zone. In other words, an excess from the dead zone of Mfbdmd is determined as Mfbdmd_a. Operating the braking device of the driving/braking device 3A on the basis of Mfbdmd_a determined as described above makes it possible to restrain frequent operation of the braking device on the basis of the state amount errors γerr and βerr.

Subsequently, an actuator operation FB target value distribution processor 222 carries out processing for determining the actuator operation FB target value (a feedback control input to an actuator device 3) on the basis of the dead zone excess feedback yaw moment required value Mfbdmd_a.

The processing by the actuator operation FB target value distribution processor 222 will be schematically described. The actuator operation FB target value distribution processor 222 determines an FB target n-th wheel brake driving/braking force Fxfbdmd_n (n=1, 2, 3, 4), which is a feedback target value of the driving/braking force of the wheels W1 to W4 by an operation of the braking device of the driving/braking device 3A (a feedback control input to the braking device to approximate γerr and βerr to zero), such that Mfbdmd_a is generated about the center-of-gravity point of the actual vehicle 1 (consequently to approximate γerr and βerr to zero). Alternatively, in addition to Fxfbdmd_n (n=1, 2, 3, 4), an active steering FB target lateral force Fyfbdmd_f, which is a feedback target value of the lateral forces of the front wheels W1 and W2 by an operation of the steering device 3B, is determined.

In this case, according to the present embodiment, if the dead zone excess feedback yaw moment required value Mfbdmd_a indicates a moment in the positive direction (a moment in the counterclockwise direction as observed from above the actual vehicle 1), then basically, the driving/braking force of the left wheels W1 and W3 of the actual vehicle 1 is increased in the braking direction thereby to determine the FB target n-th wheel brake driving/braking force Fxfbdmd_n (n=1, 2, 3, 4) such that Mfbdmd_a is generated about the center-of-gravity point G of the actual vehicle 1. If Mfbdmd_a is a moment in the negative direction (a moment in the clockwise direction as observed from above the actual vehicle 1), then basically, the FB target n-th wheel brake driving/braking force Fxfbdmd_n (n=1, 2, 3, 4) is determined such that the driving/braking force of the right wheels W1 and W3 of the actual vehicle 1 is increased in the braking direction thereby to generate Mfbdmd_a about the center-of-gravity point G of the actual vehicle 1.

In the following explanation, as illustrated in FIG. 15, the interval between the front wheels W1 and W2 (i.e., the tread of the front wheels W1 and W2) of the actual vehicle 1 is denoted by df, and the interval between the rear wheels W3 and W4 (i.e., the tread of the rear wheels W3 and W4) is denoted by dr, and the actual steering angle of the front wheels W1 and W2 (the actual front wheel steering angle) is denoted by δf_act. The distance between an n-th wheel Wn and the center-of-gravity point G of the actual vehicle 1 in the direction orthogonal to the longitudinal direction of the n-th wheel Wn (in the direction orthogonal on a horizontal plane) when the actual vehicle 1 is observed from above is denoted by Ln (n=1, 2, 3, 4). In the present embodiment, although the rear wheels W3 and W4 are not shown because they are non-steering control wheels, the actual steering angle of the rear wheels W3 and W4 (actual rear wheel steering angle) is denoted by δr_act. In the present embodiment, δr_act=0 and L3=L4=dr/2.

Lf in FIG. 15 denotes the distance in the longitudinal direction between the center-of-gravity point G of the actual vehicle 1 and the axle of the front wheels W1 and W2, and Lr denotes the distance in the longitudinal direction between the center-of-gravity point G of the actual vehicle 1 and the axle of the rear wheels W3 and W4. The values of these Lf and Lr are the same as the values of Lf and Lr related to the model vehicle illustrated in FIG. 3 described above.

The processing by the actuator operation FB target value distribution processor 222 will be specifically described below. First, it is assumed that the actual vehicle 1 is in a traveling-straight state (a traveling state in which δf_act=0), and an n-th wheel driving/braking force full required value Fxfullfbdmd_n, which is the driving/braking force of the n-th wheel Wn (n=1, 2, 3, 4) required to generate a moment in the yaw direction that is equal to Mfbdmd_a about the center-of-gravity point G of the actual vehicle 1 in the traveling-straight state is respectively determined by a processor 222a_n (n=1, 2, 3, 4).

To be more specific, Fxfullfbdmd_n (n=1, 2, 3, 4) is determined in each processor 222a_n by the multiplication calculation of the following expressions 24a to 24d.

$$Fxfullfbdmd\_1 = -(2/df) \cdot Mfbdmd\_a \qquad \text{Expression 24a}$$

$$Fxfullfbdmd\_2 = (2/df) \cdot Mfbdmd\_a \qquad \text{Expression 24b}$$

$$Fxfullfbdmd\_3 = -(2/dr) \cdot Mfbdmd\_a \qquad \text{Expression 24c}$$

$$Fxfullfbdmd\_4 = (2/dr) \cdot Mfbdmd\_a \qquad \text{Expression 24d}$$

Subsequently, the actuator operation FB target value distribution processor 222 determines a first wheel distribution ratio correction value K1_str and a second wheel distribution ratio correction value K2_str in processors 222b_1 and 222b_2, respectively, on the basis of the actual front wheel steering angle δf_act, and also determines a third wheel distribution ratio correction value K3_str and a fourth wheel distribution ratio correction value K4_str in processors 222b_3 and 222b_4, respectively, on the basis of the actual rear wheel steering angle δr_act. These respective n-th wheel distribution ratio correction values Kn_str(n=1, 2, 3, 4) are correction coefficients whereby Fxfullfbdmd_n is multiplied.

Here, as the actual front wheel steering angle δf_act changes from zero, the driving/braking forces of the first wheel W1 and the second wheel W2 that generate a moment in the yaw direction equivalent to Mfbdmd_a about the center-of-gravity point G of the actual vehicle 1 change from Fxfullfbdmd_1 and Fxfullfbdmd_2 determined according to the aforesaid expressions 24a and 24b, respectively. Similarly, if the rear wheels W3 and W4 are steering control wheels, then as the actual rear wheel steering angle δr_act changes from zero, the driving/braking forces of the third wheel W3 and the fourth wheel W4 that generate a moment in the yaw direction equivalent to Mfbdmd_a about the center-of-gravity point G of the actual vehicle 1 change from Fxfullfbdmd_3 and Fxfullfbdmd_4 determined according to the expressions 24c and 24d, respectively. The n-th wheel distribution ratio correction value Kn_str is basically a correction coefficient for determining the driving/braking force of the n-th wheel Wn that generates a moment in the yaw direction equal or close to Mfbdmd_a about the center-of-gravity point G of the actual vehicle 1 by correcting Fxfullfbdmd_n (n=1, 2, 3, 4), taking such influences of a steering angle into account.

In the present embodiment, however, the rear wheels W3 and W4 are non-steering control wheels, so that δr_act is always zero. Hence, K3_str and K4_str are in fact always set to "1." Therefore, the processors 222b_3 and 222b_4 may be omitted.

Meanwhile, K1_str and K2_str related to the front wheels W1 and W2 are determined as described below by the processors 222b_1 and 222b_2, respectively. First, the values of L1 and L2 shown in FIG. 15 are calculated by the geometric calculation of expressions 25a and 25b shown below from values of df and Lf, which are set beforehand, and a value of δf_act. As the value of δf_act in the calculation, a value (current time value) detected or estimated by the sensor/estimator 12 may be used, or alternatively, a last time value of a target value (a target value finally determined at each control processing cycle) of a steering angle of the front wheels W1 and W2 of the actual vehicle 1 may be used. Further, if the steering device 3B is a mechanical steering device, then the value may be determined from an overall steering ratio of the mechanical steering device and the steering angle θh in the drive manipulation inputs. Alternatively, a current time value of the unlimited front wheel steering angle δf_unltd determined by the processor 14a of the reference manipulated variable determiner 14 may be used.

$$L1 = (df/2) \cdot \cos \delta f\_act - Lf \cdot \sin \delta f\_act \quad \text{Expression 25a}$$

$$L2 = (df/2) \cdot \cos \delta f\_act + Lf \cdot \sin \delta f\_act \quad \text{Expression 25b}$$

Here, the result obtained by multiplying the driving/braking force of each of the front wheels W1 and W2 by L1 and L2, respectively, provides the moment in the yaw direction generated about the center-of-gravity point G of the actual vehicle 1. Therefore, basically, the driving/braking forces of the front wheels W1 and W2 for generating a moment in the yaw direction that is equal to Mfbdmd_a about the center-of-gravity point G can be determined by multiplying Fxfullfbdmd_1 and Fxfullfbdmd_2 by K1_str=(df/2)/L1 and K2_str=(df/2)/L2, respectively.

Doing as described above, however, tends to cause K1_str or K2_str to become excessive when L1 or L2 is small and to cause the overall feedback loop gain of the actual vehicle 1 based on the state amount errors γerr and βerr to become excessive, frequently resulting in an oscillation of a control system.

In the present embodiment, therefore, K1_str and K2_str are determined according to the following expressions 26a and 26b.

$$K1\_str = (df/2)/\max(L1, Lmin) \quad \text{Expression 26a}$$

$$K2\_str = (df/2)/\max(L2, Lmin) \quad \text{Expression 26b}$$

Here, in expression 26a and expression 26b, max(a,b) (a and b denote general variables) denotes a function for outputting a value of the variable a or b, whichever is larger, and Lmin denotes a positive constant that is smaller than df/2. This has prevented K1_str and K2_str from becoming excessive. In other words, according to the present embodiment, (df/2)/Lmin(>1) is defined as the upper limit value of K1_str and K2_str, and K1_str and K2_str are set at the upper limit value or less on the basis of the actual front wheel steering angle δf_act.

In the present embodiment, since the rear wheels W3 and W4 are non-steering control wheels, K3_str=K4_str=1, as described above. If, however, the rear wheels W3 and W4 are steering control wheels, then K3_str and K4_str are desirably set on the basis of the actual rear wheel steering angle δr_act in the same manner as that for setting K1_str and K2_str on the basis of the actual front wheel steering angle δf_act as described above.

Subsequently, the actuator operation FB target value distribution processor 222 determines the n-th wheel distribution gain Kn in the processor 222c_n (n=1, 2, 3, 4) on the basis of the actual front wheel side slip angle βf_act (current time value) or the actual rear wheel side slip angle βr_act (current time value). This Kn is a correction coefficient (a positive value that is smaller than 1) for correcting Fxfullfbdmd_n by multiplying the n-th wheel driving/braking force full required value Fxfullfbdmd_n by Kn.

In this case, the n-th wheel distribution gain Kn is determined as described below in each processor 222c_n.

A first wheel distribution gain K1 and a third wheel distribution gain K3 related to the first wheel W1 and the third wheel W3, which are longitudinally disposed on the left side of the actual vehicle 1, are determined such that the gains virtually continuously change on the basis of βf_act and βr_act, as shown by the solid-line graphs in FIGS. 16(a) and (b), respectively. A second wheel distribution gain K2 and a fourth wheel distribution gain K4 related to the second wheel W2 and the fourth wheel W4, which are longitudinally disposed on the right side of the actual vehicle 1, are determined such that the gains virtually continuously change on the basis of βf_act and βr_act, as shown by the dashed-line graphs in FIGS. 16(a) and (b), respectively. Incidentally, any one value of Kn is a positive value that is smaller than 1. Further, "virtually continuously" means that a jump (quantization) of a value that inevitably occurs when an analog quantity is expressed in terms of a discrete system does not impair the continuity of the analog quantity.

In this case, more specifically, regarding the first wheel distribution gain K1 and the third wheel distribution gain K3, K1 is determined on the basis of a value of βf_act such that it monotonously increases from a predetermined lower limit value to a predetermined upper limit value as βf_act increases from a negative value to a positive value, as shown by the solid-line graph in FIG. 16(a). Hence, K1 is determined such that, when βf_act takes a positive value, it takes a larger value than that when βf_act takes a negative value.

Meanwhile, K3 is determined on the basis of a value of βr_act such that it monotonously decreases from a predetermined upper limit value to a predetermined lower limit value as βr_act increases from a negative value to a positive value, as shown by the solid-line graph in FIG. 16(b). Hence, K3 is determined such that, when βr_act takes a negative value, K3 takes a larger value than that when βr_act takes a positive value.

The solid-line graphs in FIGS. 16(a) and (b) are set such that the sum of the values of K1 and K3 corresponding to βf_act and βr_act becomes substantially one when βf_act and βr_act agree or substantially agree with each other.

Further, regarding the second wheel distribution gain K2 and the fourth wheel distribution gain K4, K2 is determined on the basis of a value of βf_act such that it monotonously decreases from a predetermined upper limit value to a predetermined lower limit value as βf_act increases from a negative value to a positive value, as shown by the dashed-line graph in FIG. 16(a). In this case, the dashed-line graph indicating a relationship between K2 and βf_act is identical to the graph obtained by laterally reversing the solid-line graph indicating a relationship between K1 and βf_act around the axis of ordinates (the line of βf_act=0). Hence, the value of K2 at each value of βf_act is determined such that it is equal to the value of K1 at the value obtained by reversing the positive/negative of βf_act.

Further, K4 is determined on the basis of a value of βr_act such that it monotonously increases from a predetermined lower limit value to a predetermined upper limit value as βr_act increases from a negative value to a positive value, as shown by the dashed-line graph in FIG. 16(b). In this case, the dashed-line graph indicating the relationship between K4 and βr_act is identical to a graph obtained by laterally reversing the solid-line graph indicating the relationship between K3 and βr_act around the axis of ordinates (the line of βr_act=0). Hence, the value of K4 at each value of βr_act is determined such that it is equal to the value of K3 at the value obtained by reversing the positive/negative of βr_act.

By determining the n-th wheel distribution gain Kn (n=1, 2, 3, 4) as described above, in a situation wherein βf_act and βr_act take virtually the same value, such as when the actual vehicle 1 is in a normal traveling mode, the ratio of the first wheel distribution gain K1 corresponding to the front wheel W1 to the third wheel distribution gain K2 corresponding to the rear wheel W3 immediately behind the front wheel W1 will monotonously change as βf_act and βr_act change while maintaining the sum of K1 and K3 to be substantially constant. Similarly, the ratio of the second wheel distribution gain K2 corresponding to the front wheel W2 to the fourth wheel distribution gain K4 corresponding to the rear wheel W4 immediately behind the front wheel W2 will monotonously change as βf_act and βr_act change while maintaining the sum of K2 and K4 to be substantially constant.

The reason for determining the n-th wheel distribution gain Kn (n=1, 2, 3, 4) on the basis of βf_act and βr_act as described above will be discussed later.

After determining Kn_str and Kn (n=1, 2, 3, 4) as described above, the actuator operation FB target value distribution processor 222 multiplies each n-th wheel driving/braking force full required value Fxfullfbdmd_n (n=1, 2, 3, 4) by Kn_str and Kn by the processors 222b_n and 222c_n, respectively, thereby determining the n-th wheel distribution driving/braking force basic value Fxfb_n. In other words, the n-th wheel distribution driving/braking force basic values Fxfb_n (n=1, 2, 3, 4) are determined according to the following expressions 27a to 27d.

$$Fxfb\_1 = Fxfullfbdmd\_1 \cdot K1\_str \cdot K1 \qquad \text{Expression 27a}$$

$$Fxfb\_2 = Fxfullfbdmd\_2 \cdot K2\_str \cdot K2 \qquad \text{Expression 27b}$$

$$Fxfb\_3 = Fxfullfbdmd\_3 \cdot K3\_str \cdot K3 \qquad \text{Expression 27c}$$

$$Fxfb\_4 = Fxfullfbdmd\_4 \cdot K4\_str \cdot K4 \qquad \text{Expression 27d}$$

When Fxfb_n (n=1, 2, 3, 4) is determined as described above, if Mfbdmd_a>0, then Fxfb_1 and Fxfb_3 associated with the left wheels W1 and W3 provide a driving/braking force in a braking direction (a negative driving/braking force), while Fxfb_2 and Fxfb_4 associated with the right wheels W2 and W4 provide a driving/braking force in a driving direction (a positive driving/braking force). Further, if Mfbdmd_a<0, then Fxfb_1 and Fxfb_3 associated with the left wheels W1 and W3 provide a driving/braking force in the driving direction (a positive driving/braking force), while Fxfb_2 and Fxfb_4 associated with the right wheels W2 and W4 provide a driving/braking force in the braking direction (a negative driving/braking force).

Subsequently, the actuator operation FB target value distribution processor 222 passes the n-th wheel distribution driving/braking force basic value Fxfb_n (n=1, 2, 3, 4), which has been determined as described above, through a limiter 222d_n associated with each n-th wheel Wn thereby to determine respective FB target n-th wheel brake driving/braking force Fxfbdmd_n, which is the feedback target value of the driving/braking force of the n-th wheel Wn by an operation of the braking device of the driving/braking device 3A.

Here, the graphs of the limiters 222d_n (n=1, 2, 3, 4) in FIG. 14 are graphs illustrating the relationships between Fxfb_n and Fxfbdmd_n, the values in the direction of the axis of abscissas related to the graphs indicating the values of Fxfb_n, while the values in the direction of the axis of ordinates indicating the values of Fxfbdmd_n.

The limiter 222d_n outputs Fxfb_n directly as Fxfbdmd_n without processing it only if the value of Fxfb_n input thereto is zero or a negative value, and if Fxfb_n takes a positive value, then the value of Fxfbdmd_n to be output is set to zero independently of the value of Fxfb_n. In other words, Fxfbdmd_n is determined by limiting Fxfb_n with zero being an upper limit value.

Determining the FB target n-th wheel brake driving/braking force Fxfbdmd_n, respectively, as described above determines the FB target n-th wheel brake driving/braking force Fxfbdmd_n (n=1, 2, 3, 4) such that the driving/braking forces of the left wheels W1 and W3 of the actual vehicle 1 are increased in the braking direction (to set Fxfbdmd_1<0 and Fxfbdmd_3<0) if Mfbdmd_a>0, as described above, thereby to generate Mfbdmd_a about the center-of-gravity point G of the actual vehicle 1. In this case, for the right wheels W2 and W4, Fxfbdmd_2=Fxfbdmd_4=0 in the present embodiment.

Further, the FB target n-th wheel brake driving/braking force Fxfbdmd_n (n=1, 2, 3, 4) is determined such that the driving/braking forces of the right wheels W2 and W4 of the actual vehicle 1 are increased in the braking direction (to set Fxfbdmd_2<0 and Fxfbdmd_4<0) if Mfbdmd_a<0, thereby generating Mfbdmd_a about the center-of-gravity point G of the actual vehicle 1. In this case, for the left wheels W1 and W3, Fxfbdmd_1=Fxfbdmd_3=0 in the present embodiment.

And, in either case, the n-th wheel distribution gain Kn (n=1, 2, 3, 4) is determined such that it virtually continuously changes according to βf_act or βr_act, thus preventing a situation wherein Fxfbdmd_n discontinuously changes.

Here, the following will describe the reason for determining the n-th wheel distribution gain Kn (n=1, 2, 3, 4) on the basis of βf_act and βr_act in the tendency described above.

First, if Mfbdmd_a>0, then the FB target n-th wheel brake driving/braking force Fxfbdmd_n is determined such that the driving/braking forces of the first wheel W1 and the third wheel W3, which are the left wheels of the actual vehicle 1, are increased in the braking direction, as described above.

In this case, a situation wherein $\beta f\_act<0$ and $\beta r\_act<0$ is assumed. In such a situation, if it is assumed that K1 is set to a slightly larger value (to cause Fxfbdmd_1 to increase in the braking direction) and K3 is set to a slightly smaller value (to restrain Fxfbdmd_3 from increasing in the braking direction), then the lateral force of the first wheel W1 (this functions to generate a moment in the same direction as Mfbdmd_a about the center-of-gravity point of the actual vehicle 1) decreases, whereas the lateral force of the third wheel W3 (this functions to generate a moment in the opposite direction from Mfbdmd_a about the center-of-gravity point of the actual vehicle 1) slightly increases. For this reason, there is a danger that it becomes difficult to adequately generate a moment in the positive direction (a moment about the yaw axis) required by Mfbdmd_a about the center-of-gravity point G of the actual vehicle 1. Hence, it has been decided to determine the first wheel distribution gain K1 to be a slightly smaller value and to determine the third wheel distribution gain K3 to be a slightly larger value in the situation wherein $\beta f\_act<0$ and $\beta r\_act<0$.

Another situation wherein $\beta f\_act>0$ and $\beta r\_act>0$ when Mfbdmd_a>0 will be assumed. In such a situation, if K1 is set to a slightly smaller value (consequently to restrain Fxfbdmd_1 from increasing in the braking direction) and K3 is set to a slightly larger value (consequently to cause Fxfbdmd_3 to increase in the braking direction), then the lateral force of the first wheel W1 (this functions to generate a moment in the opposite direction from Mfbdmd_a about the center-of-gravity point of the actual vehicle 1) slightly increases, whereas the lateral force of the third wheel W3 (this functions to generate a moment in the same direction as Mfbdmd_a about the center-of-gravity point of the actual vehicle 1) decreases. For this reason, there is a danger that it becomes difficult to adequately generate a moment in the positive direction (a moment about the yaw axis) required by Mfbdmd_a about the center-of-gravity point G of the actual vehicle 1. Hence, it has been decided to determine the first wheel distribution gain K1 to be a slightly larger value and to determine the third wheel distribution gain K3 to be a slightly smaller value in the situation wherein $\beta f\_act>0$ and $\beta r\_act>0$.

If Mfbdmd_a<0, then the FB target n-th wheel brake driving/braking force Fxfbdmd_n is determined such that the driving/braking forces of the second wheel W2 and the fourth wheel W4, which are the right wheels of the actual vehicle 1, are increased in the braking direction, as described above.

In this case, a situation wherein $\beta f\_act<0$ and $\beta r\_act<0$ is assumed. In such a situation, if K2 is set to a slightly smaller value (to consequently restrain Fxfbdmd_2 from increasing in the braking direction) and K4 is set to a slightly larger value (to consequently cause Fxfbdmd_4 to increase in the braking direction), then the lateral force of the second wheel W2 (this functions to generate a moment in the opposite direction from Mfbdmd_a about the center-of-gravity point of the actual vehicle 1) increases, whereas the lateral force of the fourth wheel W4 (this functions to generate a moment in the same direction as Mfbdmd_a about the center-of-gravity point of the actual vehicle 1) decreases. For this reason, there is a danger that it becomes difficult to adequately generate a moment in the negative direction (a moment about the yaw axis) required by Mfbdmd_a about the center-of-gravity point G of the actual vehicle 1. Hence, it has been decided to determine the second wheel distribution gain K2 to be a slightly larger value and to determine the fourth wheel distribution gain K4 to be a slightly smaller value in the situation wherein $\beta f\_act<0$ and $\beta r\_act<0$.

Another situation wherein $\beta f\_act>0$ and $\beta r\_act>0$ when Mfbdmd_a<0 will be assumed. In such a situation, if K2 is set to a slightly larger value (consequently to cause Fxfbdmd_2 to increase in the braking direction) and K4 is set to a slightly smaller value (consequently to restrain Fxfbdmd_4 from increasing in the braking direction), then the lateral force of the second wheel W2 (this functions to generate a moment in the same direction as Mfbdmd_a about the center-of-gravity point of the actual vehicle 1) decreases, whereas the lateral force of the fourth wheel W4 (this functions to generate a moment in the opposite direction from Mfbdmd_a about the center-of-gravity point of the actual vehicle 1) increases. For this reason, there is a danger that it becomes difficult to adequately generate a moment in the negative direction (a moment about the yaw axis) required by Mfbdmd_a about the center-of-gravity point G of the actual vehicle 1. Hence, it has been decided to determine the second wheel distribution gain K2 to be a slightly smaller value and to determine the fourth wheel distribution gain K4 to be a slightly larger value in the situation wherein $\beta f\_act>0$ and $\beta r\_act>0$.

Thus, determining the n-th wheel distribution gain Kn (n=1, 2, 3, 4) as described above makes it possible to prevent a lateral force that becomes an obstacle in generating a moment of Mfbdmd_a in the yaw direction about the center-of-gravity point G of the actual vehicle 1 from becoming excessive while at the same time preventing a lateral force that is effective in generating a moment of Mfbdmd_a in the yaw direction about the center-of-gravity point G of the actual vehicle 1 from becoming too small.

Moreover, by determining the n-th wheel distribution gain Kn(n=1, 2, 3, 4) as described above, the sum of a value of K1 and a value of K3 and the sum of a value of K2 and a value of K4, respectively, become substantially one in a situation wherein $\beta f\_act$ and $\beta r\_act$ agree or substantially agree with each other, as in the case where the actual vehicle 1 is in a normal circular turn mode or a normal straight travel mode. This means that if the braking device of the driving/braking device 3A is operated faithfully in accordance with the FB target n-th wheel brake driving/braking force Fxfbdmd_n, then the gain of a transfer function from Mfbdmd_a to a moment (a moment in the yaw direction) actually generated about the center-of-gravity point G of the actual vehicle 1 becomes substantially one (a moment in the yaw direction actually generated becomes substantially equal to Mfbdmd_a).

Supplementally, there is a case where the difference between $\beta f\_act$ and $\beta r\_act$ increases in a transient motion situation or the like of the actual vehicle 1. And, in this case, the sum of a value of K1 and a value of K3 and the sum of a value of K2 and a value of K4, respectively, considerably deviate from one. To solve this problem, preferably, after the values of K1 and K3 are determined as described above, the values of K1 and K3 are corrected while maintaining the ratio of the values at a constant level such that the sum of the corrected values of K1 and K3 becomes substantially one. Similarly, it is preferred that, after the values of K2 and K4 are determined as described above, the values of K2 and K4 are corrected while maintaining the ratio of the values at a constant level such that the sum of the corrected values of K2 and K4 becomes substantially one. To be more specific, after the n-th distribution gain Kn (n=1, 2, 3, 4) is determined according to the graphs of FIGS. 16(a) and (b), K1', K2', K3' and K4' are determined by K1'=K1/(K1+K3), K3'=K3/(K1+K3), K2'=K2/(K2+K4), and K4'=K4/(K2+K4), and then, the determined K1', K2', K3' and K4' may be respectively re-determined as the values of K1, K2, K3 and K4.

Further, in addition to determining the FB target n-th wheel brake driving/braking force Fxfbdmd_n as described above, the actuator operation FB target value distribution processor 222 according to the present embodiment inputs the feedback yaw moment required value Mfbdmd to a processor 222e so as to determine, by the processor 222e, an active steering FB target lateral force Fyfbdmd_f, which is a feedback target value of the lateral force of the front wheels W1 and W2 by an operation of the steering device 3B. Here, the graph of the processor 222e in the figure is a graph illustrating a relationship between Mfbdmd and Fyfbdmd_f, the values in the direction of the axis of abscissas related to the graph indicating the values of Mfbdmd, while the values in the direction of the axis of ordinates indicating the values of Fyfbdmd_f. As illustrated in the graph, the processor 222e basically determines Fyfbdmd_f such that Fyfbdmd_f monotonously increases as Mfbdmd increases. In this case, Fyfbdmd_f is determined by using, for example, a map, from a value of Mfbdmd supplied to the processor 222e.

Alternatively, Fyfbdmd_f may be determined by multiplying Mfbdmd by a predetermined gain. Further, Fyfbdmd_f may be determined on the basis of Mfbdmd within a range between a predetermined upper limit value (>0) and a predetermined lower limit value (<0).

Supplementally, the processing by the processor 222e may be omitted regardless of whether the steering device 3B is an active steering device or a mechanical steering device. When determining the active steering FB target lateral force Fyfbdmd_f by the processing performed by the processor 222e and manipulating the operation of the steering device 3B on the basis of the determined Fyfbdmd_f, it is further preferable to determine Fxfbdmd_n (n=1, 2, 3, 4) and Fyfbdmd_f such that the sum of a moment in the yaw direction to be generated about the center-of-gravity point G of the actual vehicle 1 by the FB target n-th wheel brake driving/braking force Fxfbdmd_n (n=1, 2, 3, 4) and a moment in the yaw direction generated about the center-of-gravity point G of the actual vehicle 1 by the active steering FB target lateral force Fyfbdmd_f is substantially equal to the aforesaid feedback yaw moment basic required value Mfbdmd. For example, the active steering FB target lateral force Fyfbdmd_f may be determined on the basis of a difference between Mfbdmd and Mfbdmd_a. In this case, it is desirable to determine Fyfbdmd_f such that a moment in the yaw direction that is substantially equal to Mfbdmd is generated about the center-of-gravity point G of the actual vehicle 1 by Fyfbdmd_f when Mfbdmd_a=0.

The above has described the details of the processing by the actuator operation FB target value determiner 20b in the present embodiment. This processing determines the FB target n-th wheel brake driving/braking force Fxfbdmd_n (n=1, 2, 3, 4) or Fxfbdmd_n (n=1, 2, 3, 4) and the active steering FB target lateral force Fyfbdmd_f as the actuator operation FB target value such that Mfbdmd is approximated to zero (consequently to approximate the state amount errors γerr and βerr to zero), as described above.

The limiter [222d_n] (n=1, 2, 3, 4) may output, as Fxfbdmd_n, a value obtained by limiting Fxfb_n input thereto to not more than a predetermined positive upper limit value, which is slightly larger than zero. For example, if Fxfb_n is a value that is the upper limit value or less, then Fxfb_n is directly output as Fxfbdmd_n without processing it, or if Fxfb_n takes a positive value that is larger than the upper limit value, then the upper limit value is output as Fxfbdmd_n. In this case, Fxfbdmd_n of a positive value provides a feedback control input that functions to decrease the magnitude of the driving/braking force of the n-th wheel Wn in the braking direction by the braking device.

Further, for each wheel Wn (n=1, 2, 3, 4), the processing from the processor 222a_n to the limiter 222d_n (the processing for determining Fxfbdmd_n on the basis of Mfbdmd_a and δf_act or δr_act and βf_act or βr_act), or the processing from the processor 222b_n to the limiter 222d_n (the processing for determining Fxfbdmd_n on the basis of Fxfullfbdmd_n and δf_act or δr_act and βf_act or βr_act), or the processing from the processor 222c_n to the limiter 222d_n (the processing for determining Fxfbdmd_n on the basis of an output of the processor 222b_n and βf_act or βr_act), or the processing that combines two or more portions of the processing from the processor 222a_n to the limiter 222d_n (e.g., the processing from the processor 222b-n to the processor 222c_n) may be changed to determine an output by using a map or a function expression from input values necessary for such processing.

For instance, to carry out the processing from the processor 222c_n to the limiter 222d_n by using a map, a map for the first wheel may be set as illustrated in, for example, FIGS. 17(a) to (e), and a map for the third wheel may be set as illustrated in, for example, FIGS. 18(a) to (e). In this case, the graphs in FIGS. 17(a) to (e), respectively, illustrate the relationships between outputs of the processor 222b_1 (=Fxfullfbdmd_1·K1_str) and Fxfbdmd_1 in association with a plurality of representative types of values of βf_act, the individual values being shown in terms of the values in the direction of the axis of abscissas of the graphs and the values in the direction of the axis of ordinates. Further, the graphs in FIGS. 18(a) to (e), respectively, illustrate the relationships between outputs of the processor 222b_3 (=Fxfullfbdmd_3·K3_str) and Fxfbdmd_3 in association with a plurality of representative types of values of βr_act, the individual values being shown in terms of the values in the direction of the axis of abscissas of the graphs and the values in the direction of the axis of ordinates. In FIG. 17, regarding the values of βf_act, "βf−−" means a negative value having a relatively large absolute value, "βf−" means a negative value having a relatively small absolute value, "βf+" means a positive value having a relatively small absolute value, and "βf++" means a positive value having a relatively large absolute value. Similarly, in FIG. 18, regarding the values of βr_act, "βr−−" means a negative value having a relatively large absolute value, "βr−" means a negative value having a relatively small absolute value, "βr+" means a positive value having a relatively small absolute value, and "βr++" means a positive value having a relatively large absolute value.

Although not shown, a map for the second wheel may be set such that the relationship between outputs of the processor 222b_2 (=Fxfullfbdmd_2·K2_str) and Fxfbdmd_2 will be the same at each value of βf_act as that in the map for the first wheel associated with the values obtained by reversing the signs of the values (e.g., the relationship between an output of the processor 222b_2 when βf_act=βf− (=Fxfullfbdmd_2·K2_str) and Fxfbdmd_2 will be the same as the relationship between an output of the processor 222b_1 when βf_act=βf+ and Fxfbdmd_1 (the relationship illustrated by the graph of FIG. 17(c))). Similarly, although not shown, a map for the fourth wheel may be set such that the relationship between outputs of the processor 222b_4 (=Fxfullfbdmd_4·K4_str) and Fxfbdmd_4 will be the same at each value of βr_act as that in the map for the third wheel associated with the values obtained by reversing the signs of the values (e.g., the relationship between an output of the processor 222b_4 when βr_act=βr−

(=Fxfullfbdmd_4·K4_str) and Fxfbdmd_4 will be the same as the relationship between an output of the processor 222b_3 when βr_act=βr+ and Fxfbdmd_3 (the relationship illustrated by the graph of FIG. 18(c))).

In this example, if an output of the processor 222b_n (n=1, 2, 3, 4) is a value of zero or less, then Fxfbdmd_n is determined in the same manner as that illustrated in FIG. 14 described above. Meanwhile, if an output of the processor 222b_n (n=1, 2, 3, 4) is a positive value, then Fxfbdmd_n takes a positive value within a range of relatively small values as with the case where the upper limit value in the limiter 222d_n is set to a positive value as described above.

Supplementally, both the processors 222b_3 and 222b_4 associated with the third wheel W3 and the fourth wheel W4 share the same input values and output values; therefore, carrying out the processing from the processor [222c_3] to the limiter 222d_3 and the processing from the processor 222c_4 to the limiter 222d_4 on the third wheel W3 and the fourth wheel W4 by using the maps as described above is equivalent to carrying out the processing from the processor 222b_3 to the limiter 222d_3 and the processing from the processor 222b_4 to the limiter 222d_4 by using the maps.

Further, the n-th wheel distribution gain Kn (n=1, 2, 3, 4) may be determined on the basis of the actual vehicle center-of-gravity point side slip angle βact in place of βf_act or βr_act. In this case, the relationship between βact and the n-th wheel distribution gain Kn may be set to a relationship that has a tendency similar to that of the relationship between the aforesaid βf_act or βr_act and the n-th wheel distribution gain Kn. For example, the n-th wheel distribution gain Kn may be determined according to graphs obtained by replacing the values βf_act or βr_act, respectively, in the direction of the axis of abscissas in the graphs of FIGS. 16(a) and (b) by βact.

Alternatively, the n-th wheel distribution gain Kn (n=1, 2, 3, 4) may be determined according to a map or a function expression on the basis of the actual vehicle center-of-gravity point side slip angle βact, the actual yaw rate γact, and the actual traveling velocity Vact, or on the basis of βact, γact, Vact, and the actual front wheel steering angle δf_act. For instance, the relationship between βf_act and the first wheel distribution gain K1 and the second wheel distribution gain K2 described above (the relationship indicated by the graph of FIG. 16(a) described above) is converted beforehand into a relationship between βact, γact, Vact, δf_act, and K1, K2 on the basis of an expression obtained by replacing βf_d, βd, γd, Vd, and δf_d of the expression 02a related to the model vehicle by βf_act, βact, γact, Vact, and δf_act, then K1 and K2 are determined according to βact, γact, Vact, and δf_act on the basis of the relationship obtained by the conversion. Similarly, the relationship among βr_act and the third wheel distribution gain K3 and the fourth wheel distribution gain K4 described above (the relationship indicated by the graph of FIG. 16(b) described above) is converted beforehand into a relationship between βact, γact, Vact and K3, K4 on the basis of an expression obtained by replacing βr_d, βd, γd, and Vd of the expression 02b related to the model vehicle by βr_act, βact, γact, and Vact, then K3 and K4 are determined according to βact, γact, and Vact on the basis of the relationship obtained by the conversion.

Further, in the case where the n-th wheel distribution gain Kn is determined on the basis of βf_act or βr_act or βact, as described above, the values of βf_d, βr_d, and βd of the model vehicle of the reference dynamic characteristic model 16 may be used in place of βf_act, βr_act, and βact. According to the present embodiment, the motions of both the actual vehicle 1 and the model vehicle are operated so as to bring the state amount errors γerr and βerr close to zero, so that the state amounts of their motions will not become significantly apart from each other. Hence, βf_d, βr_d, and βd of the model vehicle may be used in place of βf_act, βr_act, and βact.

Alternatively, the n-th wheel distribution gain Kn may be determined on the basis of the weighted mean value of the βf_act and βr_act of the actual vehicle 1 and the βf_d and βr_d of the model vehicle, or the n-th wheel distribution gain Kn may be determined on the basis of the weighted mean value of the βact of the actual vehicle 1 and the βd of the model vehicle. In this case, the weights may be provided with a frequency characteristic (e.g., a frequency characteristic functioning as a phase compensating element).

Alternatively, for example, the first temporary value of the n-th wheel distribution gain Kn (n=1, 2, 3, 4) may be determined according to βf_act or βr_act or βact, the second temporary value of the n-th wheel distribution gain Kn may be determined according to βf_d or βr_d or βd, and then a resultant value of the weighed mean values or the weighted mean values or the like of the temporary values may be determined as the n-th wheel distribution gain Kn. For example, the first temporary value of K1 related to the first wheel W1 is determined on the basis of βf_act as indicated by the graph provided in FIG. 16(a) described above and the second temporary value of K1 is determined on the basis of βf_d in the same manner as that for the first temporary value. In this case, the tendency of changes in the second temporary value relative to βf_d may be the same as the tendency of changes in the first temporary value relative to βf_act. Then, a weighed mean value of these first temporary value and second temporary value is determined as the first wheel distribution gain K1. The same applies to other n-th wheel distribution gains K2, K3, and K4.

Further desirably, the value of the n-th wheel distribution gain Kn (n=1, 2, 3, 4) is determined such that the value is not only changed according to βf_act, βr_act, or βact or the like, but also changed according to the estimated friction coefficient μestm. For example, when determining the n-th wheel distribution gain Kn on the basis of βf_act or βr_act, as described above in relation to the present embodiment, K1 is desirably determined such that the first wheel distribution gain K1 when βf_act is a negative value having a large absolute value is further decreased as μestm is decreased. Further, K3 is desirably determined such that the third wheel distribution gain K3 when βr_act is a positive value having a large absolute value is further decreased as μestm is decreased. Similarly, K2 is desirably determined such that the second wheel distribution gain K2 when βf_act is a positive value having a large absolute value is further decreased as μestm is decreased. Further, K4 is desirably determined such that the fourth wheel distribution gain K4 when βr_act is a negative value having a large absolute value is further decreased as μestm is decreased. This is because, as μestm decreases, the lateral force of the n-th wheel Wn considerably reduces when the driving/braking force of the n-th wheel Wn (n=1, 2, 3, 4) in the braking direction is increased.

Further, a value of the n-th wheel distribution gain Kn (n=1, 2, 3, 4) (a value set on the basis of βf_act or βr_act (or on the basis of one of βact, βf_d, βr_d, and βd)) may be adjusted also on the basis of an actual ground contact load of the n-th wheel (a detected value or an estimated value of a translational force, which is in the vertical direction or a direction perpendicular to a road surface, of a road surface reaction force acting on the n-th wheel). In this case, the value of the n-th wheel distribution gain Kn is desirably determined such that it decreases as the actual ground contact load of the n-th wheel Wn decreases.

Alternatively, when the actual ground contact load of each n-th wheel Wn is expressed by Fzact_n (n=1, 2, 3, 4) and the total sum thereof is expressed by ΣFzact (=Fzact_1+Fzact_2+Fzact_3+Fzact_4), the values of the n-th wheel distribution gains K1 and K2 related to the front wheels W1 and W2 may be adjusted on the basis of the sum of the actual ground contact loads of the front wheels W1 and W2 (=Fzact_1+Fzact_2) or may be adjusted on the basis of a ratio of the sum with respect to ΣFzact (=(Fzact_1+Fzact_2)/ΣFzact). Similarly, the n-th wheel distribution gains K3 and K4 related to the rear wheels W3 and W4 may be adjusted on the basis of the sum of the actual ground contact loads of the rear wheels W3 and W4 (=Fzact_3+Fzact_4) or may be adjusted on the basis of a ratio of the sum with respect to ΣFzact (=(Fzact_3+Fzact_4)/ΣFzact). Alternatively, the value of each n-th wheel distribution gain Kn (n=1, 2, 3, 4) may be adjusted on the basis of the ratio of the actual ground contact load of each n-th wheel Wn with respect to ΣFzact (=Fzact_n/ΣFzact).

Further, in the present embodiment, as the feedback control input to the braking device of the driving/braking device 3A (as the actuator operation FB target value), the FB target n-th wheel brake driving/braking force Fxfbdmd_n (n=1, 2, 3, 4) has been determined; alternatively, however, instead of Fxfbdmd_n, a target slip ratio of each wheel Wn (n=1, 2, 3, 4) by the braking device may be determined or both the target slip ratio and Fxfbdmd_n may be determined.

Further, the actuator operation FB target value may be directly determined by using a map or the like from the state amount errors γerr and βerr, without determining Mfbdmd or Mfbdmd_a, which is an intermediate variable, to determine an actuator operation FB target value, such as Fxfbdmd_n. For example, the actuator operation FB target value may be determined by using a multidimensional map which uses variables, such as γerr, γd (or γact), βd (or βact), Vact, and μestm, as inputs.

The feedback yaw moment basic required value Mfbdmd may be determined such that Mfbdmd not only causes the state amount errors γerr and βerr to approximate zero but also causes the deviation amounts γover and βover determined by the γβ limiter 202 of the virtual external force determiner 20a to approximate zero (thereby to restrain the γda and βda from deviating from their permissible ranges [γdamin, γdamax] and [βdamin, βdamax], respectively). For example, Mfbdmd may be determined according to expression 28 given below by using appropriate coefficients Kfbdmd1 to Kfbdmd4.

$$Mfbdmd = Kfbdmd1 \cdot \gamma err + Kfbdmd2 \cdot \beta err - Kfbdmd3 \cdot \gamma over - Kfbdmd4 \cdot \beta over \qquad \text{Expression 28}$$

Supplementally, according to the present embodiment, the virtual external force temporary values Mvirtmp and Fvirtmp are manipulated to approximate γover and βover to zero by the γβ limiter 202, as described above, thereby determining the virtual external forces Mvir and Fvir. This alone restrains γd and βd of the model vehicle from deviating from their permissible ranges [γdamin, γdamax] and [βdamin, βdamax], respectively, when they change. Accordingly, the actuator operation FB target value changes such that γact and βact of the actual vehicle 1 are brought close to γd and βd, respectively. Therefore, even when the actuator operation FB target value is determined such that only γerr and βerr are brought close to zero, the γact and βact can be also consequently restrained from deviating from the permissible ranges [γdamin, γdamax] and [βdamin, βdamax]. However, determining Mfbdmd or Mfbdmd_a (so as to determine the actuator operation FB target value) such that γover and βover are also brought close to zero in addition to γerr and βerr as described above makes it possible to further effectively restrain the γact and βact from deviating from the permissible ranges [γdamin, γdamax] and [βdamin, βdamax], respectively.

[About the FF Law]

The processing by the FF law 22 will now be described in detail with reference to FIG. 19. FIG. 19 is a functional block diagram illustrating the processing by the FF law 22.

As described above, according to the present embodiment, a feedforward target value determined by the FF law 22 (a basic target value of the actuator devices 3 on the basis of drive manipulation inputs) includes the feedforward target values of the driving/braking forces of the wheels W1 to W4 of the actual vehicle 1 by the braking device of the driving/braking device 3A (hereinafter referred to as the FF target n-th wheel brake driving/braking forces (n=1, 2, 3, 4)), the feedforward target values of the driving/braking forces of the driving wheels W1 and W2 of the actual vehicle 1 by the driving system of the driving/braking device 3A (hereinafter referred to as the FF target n-th wheel driving system driving/braking forces (n=1, 2)), the feedforward target value of a reduction gear ratio (change gear ratio) of the speed change gear of the driving/braking device 3A (hereinafter referred to as the FF target transmission reduction gear ratio), and the feedforward target values of the steering angles of the steering control wheels W1 and W2 of the actual vehicle 1 by the steering device 3B (hereinafter referred to as the FF target front wheel steering angle δf_ff).

As illustrated in FIG. 19, the FF target front wheel steering angle δf_ff is determined by a processor 230 on the basis of the steering angle θh (or on the basis of θh and Vact) of drive manipulation inputs. In FIG. 19, it is assumed that the steering device 3B is the actuator-driven steering device. In this case, the processor 230 determines the FF target front wheel steering angle δf_ff by the same processing as the processing by the processor 14a of the reference manipulated variable determiner 14. More specifically, the steering angle θh is divided by a predetermined overall steering ratio "is" or an overall steering ratio "is" set on the basis of Vact to determine δf_ff. The value of δf_ff thus determined is the same as the value of the unlimited front wheel steering angle δf_unltd determined by the processor 14a of the reference manipulated variable determiner 14.

If the steering device 3B is the actuator-assisted steering device or a mechanical steering device, then it is unnecessary to determine δf_ff. Alternatively, δf_ff may be always set to zero. However, if the steering device 3B is the actuator-assisted steering device and has a function for correcting, on the basis of Vact, the steering angles of the front wheels W1 and W2 mechanically determined on the basis of the steering angle θh, then the correction may be determined on the basis of Vact and the obtained correction may be determined as δf_ff.

Supplementally, if the steering device 3B is an actuator-assisted steering device, then the basic steering angles of the front wheels W1 and W2 (the basic values of δf_act) are mechanically determined on the basis of the steering angle θh, so that δf_ff has a meaning as the feedforward target values of the correction amounts of the steering angles of the front wheels W1 and W2 by an actuator.

Further, the FF target n-th wheel brake driving/braking forces (n=1, 2, 3, 4) are respectively determined by processors 231a_n (n=1, 2, 3, 4) on the basis of a brake pedal manipulated variable of drive manipulation inputs. The graphs provided in the processors 231a-n in the figure respectively are graphs illustrating the relationship between brake pedal manipulated variables and the FF target n-th wheel brake driving/braking forces (n=1, 2, 3, 4), the values in the direction of the axis of abscissas in the graphs indicating the values of the brake pedal manipulated variables, while the values in the direction of the axis of ordinates indicating the FF target n-th wheel brake driving/braking forces. As illustrated in the graphs of the figure, the FF target n-th wheel brake driving/braking forces (<0) are basically determined such that the magnitudes (absolute values) thereof monotonously increase as the brake pedal manipulated variable increases. In the illustrated examples, the FF target n-th wheel brake driving/braking forces are set such that they are saturated when a brake pedal manipulated variable exceeds a predetermined amount (the increasing rate of the absolute value of the FF target n-th wheel brake driving/braking force relative to an increase in the brake pedal manipulated variable approaches zero or reaches zero), thereby preventing the magnitude of the FF target n-th wheel brake driving/braking force from becoming excessive.

The FF target n-th wheel driving system driving/braking forces (n=1, 2) and the FF target transmission reduction gear ratio are determined by a driving system actuator operation FF target value determiner 232 on the basis of an accelerator (gas) pedal manipulated variable, Vact, and a shift lever position among drive manipulation inputs. The processing by the driving system actuator operation FF target value determiner 232 may be the same method for determining a driving force transmitted from an engine to driving wheels and the reduction gear ratio of a speed change gear on the basis of an accelerator (gas) pedal manipulated variable, Vact, and the shift lever position of the speed change gear in a publicly known regular car, so that detailed explanation thereof in the present description will be omitted.

The above has described the specific processing by the FF law 22 in the present embodiment.

[About the Actuator Operation Target Value Synthesizer]

The processing by the actuator operation target value synthesizer 24 will now be described in detail. FIG. 20 is a functional block diagram illustrating the processing by the actuator operation target value synthesizer 24.

Referring to the figure, regarding the first wheel W1, the actuator operation target value synthesizer 24 determines, by an adder 240, the sum of the FF target first wheel brake driving/braking force of the actuator operation FF target value and the FF target first wheel driving system driving/braking force. Then, the sum is input as an FF total target first wheel driving/braking force FFtotal_1 into an optimum target first driving/braking force determiner 241a_1. Further, the sum of this FFtotal_1 and the FB target first wheel brake driving/braking force Fxfbdmd_1 of the actuator operation FB target value is determined by an adder 242. Then, the sum is input as an unlimited target first wheel driving/braking force Fxdmd_1 into the optimum target first driving/braking force determiner 241a_1.

Regarding the second wheel W2, the actuator operation target value synthesizer 24 determines, by an adder 243, the sum of the FF target second wheel brake driving/braking force of the actuator operation FF target value and the FF target second wheel driving system driving/braking force. Then, the sum is input as an FF total target second wheel driving/braking force FFtotal_2 into an optimum target second driving/braking force determiner 241a_2. Further, the sum of this FFtotal_2 and the FB target second wheel brake driving/braking force Fxfbdmd_2 of the actuator operation FB target value is determined by an adder 244 and then, the sum is input as an unlimited target second wheel driving/braking force Fxdmd_2 into the optimum target second driving/braking force determiner 241a_2.

Regarding the third wheel W3, the actuator operation target value synthesizer 24 directly inputs an FF target third wheel brake driving/braking force of the actuator operation FF target value as an FF total target third wheel driving/braking force FFtotal_3 into an optimum target third driving/braking force determiner 241a_3. Further, the sum of this FFtotal_3 and the FB target third wheel brake driving/braking force Fxfbdmd_3 of the actuator operation FB target value is determined by an adder 245 and then, the sum is input as an unlimited target third wheel driving/braking force Fxdmd_3 into the optimum target third driving/braking force determiner 241a_3.

Regarding the fourth wheel W4, the actuator operation target value synthesizer 24 directly inputs an FF target fourth wheel brake driving/braking force of the actuator operation FF target value as an FF total target fourth wheel driving/braking force FFtotal_4 into an optimum target fourth driving/braking force determiner 241a_4. Further, the sum of this FFtotal_4 and the FB target fourth wheel brake driving/braking force Fxfbdmd_4 of the actuator operation FB target value is determined by an adder 246 and then, the sum is input as an unlimited target fourth wheel driving/braking force Fxdmd_4 into the optimum target fourth driving/braking force determiner 241a_4.

Here, to generalize the FF total target n-th wheel driving/braking force FFtotal_n (n=1, 2, 3, 4), it means the total sum of a feedforward target value of the driving/braking force of the n-th wheel Wn by an operation of the driving system of the driving/braking device 3A (FF target n-th wheel driving system driving/braking force) and a feedforward target value of the driving/braking force of the n-th wheel Wn by an operation of the braking device (FF target n-th wheel brake driving/braking force). In this case, according to the embodiments in the present description, the driving wheels of the actual vehicle 1 are the front wheels W1 and W2, and the rear wheels W3 and W4 are the driven wheels; hence, for the rear wheels W3 and W4, the FF target n-th wheel brake driving/braking force (n=3, 4) is directly determined as the FF total target n-th wheel driving/braking force FFtotal_n.

Further, the unlimited target n-th wheel driving/braking force Fxdmd_n (n=1, 2, 3, 4) is the sum of the FF total target n-th wheel driving/braking force FFtotal_n and the FB n-th wheel brake driving/braking force, so that it means the total driving/braking force of the n-th wheel required by a feedforward control operation of the driving/braking device 3A (a feedforward control operation based on at least a drive manipulation input) and a feedback control operation (a feedback control operation based on at least state amount errors γerr and βerr).

Then, the actuator operation target value synthesizer 24 determines the target n-th wheel driving/braking force Fxcmd_n, which is the final target value of the driving/braking force of each n-th wheel Wn, by the optimum target n-th driving/braking force determiner 241a_n (n=1, 2, 3, 4), and also determines a target n-th wheel slip ratio, which is the final target value of the slip ratio of the n-th wheel.

In this case, the optimum target n-th driving/braking force determiner 241a_n (n=1, 2, 3, 4) receives a latest value (current time value) of the actual side slip angle of the n-th wheel Wn (more specifically, the actual front wheel side slip angle βf_act when n=1, 2 or the actual rear wheel side slip angle θr_act when n=3, 4) and a latest value (current time value) of the estimated friction coefficient μestm in addition to FFtotal_n and Fxdmd_n. Although not shown, the optimum target n-th driving/braking force determiner 241a-n (n=1, 2) associated with the front wheels W1 and W2 also receives a latest value (current time value) of the actual front wheel steering angle δf_act. Then, the optimum target n-th driving/braking force determiner 241a_n (n=1, 2, 3, 4) determines the target n-th wheel driving/braking force Fxcmd_n and the target n-th wheel slip ratio on the basis of the inputs supplied thereto, respectively, as will be described later.

Further, the actuator operation target value synthesizer 24 inputs the active steering FB target lateral force Fyfbdmd_f of the actuator operation FB target value and the FF target front wheel steering angle δf_ff of the actuator operation FF target value into an optimum target active steering angle determiner 247 so as to determine target front wheel steering angles [δ_fcmd], which are the final steering angle target values of the front wheels W1 and W2, by the optimum target active steering angle determiner 247. Incidentally, the [δ_fcmd] means the final target values of the steering angles themselves (the steering angles based on the longitudinal direction of the actual vehicle 1) of the front wheels W1 and W2 by an operation of an actuator if the steering device 3B is the actuator-driven steering device. Meanwhile, if the steering device 3B is the actuator-assisted steering device, then it means the final target values of the correction amounts of the steering angles of the front wheels W1 and W2 by an operation of an actuator.

The actuator operation target value synthesizer 24 directly outputs the FF target n-th wheel driving system driving/braking force(n=1, 2) of the actuator operation FF target value as the target n-th wheel driving system driving/braking force, which is the final target value of the driving/braking force of the n-th wheel Wn by an operation of the driving system of the driving/braking device 3A. Moreover, the actuator operation target value synthesizer 24 directly outputs the FF target transmission reduction gear ratio of the actuator operation FF target value as a target transmission reduction gear ratio, which is the final target value of the reduction gear ratio (speed change ratio) of the speed change gear of the driving/braking device 3A.

The processing by the optimum target n-th driving/braking force determiner 241a_n (n=1, 2, 3, 4) will be described below in detail. FIG. 21 is a flowchart illustrating the processing by the optimum target n-th driving/braking force determiner 241a_n.

Referring to the figure, first, in S100, it is preconditioned that the side slip angle of the n-th wheel Wn (n=1, 2, 3, 4) is an actual side slip angle (more specifically, the actual front wheel side slip angle βf_act for n=1, 2 and the actual rear wheel side slip angle βr_act for n=3, 4), and a road surface friction coefficient (the coefficient of friction between the n-th wheel Wn and a road surface) is the estimated friction coefficient µestm. Then, based on the precondition, an n-th wheel driving/braking force candidate Fxcand_n, which is the value of the driving/braking force of the n-th wheel Wn closest to the unlimited target n-th wheel driving/braking force Fxdmd_n (including a case of agreement therebetween), and an n-th wheel slip ratio candidate Scand_n, which is the value of the slip ratio of the n-th wheel Wn associated therewith, are determined.

Here, in general, there is a predetermined correlation based on the characteristics of wheel tires or the characteristics of a suspension device among the side slip angle and a road surface reaction force (a driving/braking force, a lateral force, and a ground contact load), a slip ratio and a road surface friction coefficient of each wheel. For example, there is a correlation indicated by expressions (2.57), (2.58), (2.72), and (2.73) in the aforesaid non-patent document 1 among a side slip angle, a road surface reaction force (a driving/braking force, a lateral force, and a ground contact load), a slip ratio and a road surface friction coefficient of each wheel.

Moreover, if, for example, the ground contact load and the road surface friction coefficient are set to be constant, then there is a correlation as illustrated in FIG. 2.36 of the aforesaid non-patent document 1 among the side slip angle, the driving/braking force, the lateral force, and the slip ratio of each wheel. Hence, the road surface reaction force and the slip ratio of each wheel when the side slip angle and the road surface friction coefficient individually take certain values cannot respectively take independent values; instead, the values thereof change according to the aforesaid correlations (hereinafter referred to as wheel characteristics relations). The slip ratio takes a negative value when the driving/braking force is a driving/braking force in the driving direction (>0), while it takes a positive value when the driving/braking force is a driving/braking force in the braking direction (<0).

Thus, the processing in S100 in the present embodiment determines a driving/braking force that is closest to or agrees with the unlimited target n-th wheel driving/braking force Fxdmd_n (a driving/braking force that provides a minimum absolute value of a difference from Fxdmd_n) and a slip ratio associated with the driving/braking force from the actual side slip angle βf_act or βr_act (latest value) of the n-th wheel Wn and the estimated road surface friction coefficient µestm (latest value) on the basis of a map which illustrates a relationship among a side slip angle, a road surface friction coefficient, a driving/braking force, and a slip ratio of the n-th wheel Wn and which has been prepared in advance. Then, the driving/braking force and the slip ratio determined as described above are determined as an n-th wheel driving/braking force candidate Fxcand_n and an n-th wheel slip ratio candidate Scand_n.

For the map used for the processing, the aforesaid wheel characteristics relationship, for example, may be specified or estimated beforehand by various experiments or the like or on the basis of the tire characteristics of the wheels W1 to W4 or the characteristics of the suspension device 3C, and the map may be prepared on the basis of the specified or estimated wheel characteristics relationship. The ground contact loads of n-th wheels Wn may be added as variable parameters to the map. In this case, the actual ground contact load Fzact_n of the n-th wheel Wn may be input to the optimum target n-th driving/braking force determiner 241a_n to determine Fxcand_n and Scand_n from the actual side slip angle βf_act or βr_act, the estimated friction coefficient µestm, and the actual ground contact load Fzact_n of the n-th wheel Wn. However, fluctuations in the actual ground contact load Fzact_n are relatively small in general, so that the actual ground contact load Fzact_n may be regarded as a fixed value.

Supplementally, if Fxdmd_n exists in a range of values of driving/braking forces that can be generated (that can be applied from a road surface) in the n-th wheel Wn (driving/braking forces that can be generated on the basis of the aforesaid wheel characteristics relationship) corresponding to a set of the actual side slip angle βf_act or βr_act and the estimated road surface friction coefficient µestm of the n-th wheel Wn or a set of these and the actual ground contact load Fzact_n, then the Fxdmd_n may be directly determined as Fxcand_n. Further, if Fxdmd_n deviates from the range, then an upper limit value (>0) or a lower limit value (<0) of the range, whichever is closer to Fxdmd_n may be determined as Fxcand_n.

Further, in association with the set of the actual side slip angle βf_act or βr_act and the estimated road surface friction coefficient µestm of the n-th wheel Wn or in association with the set of these and the actual ground contact load Fzact_n, a relationship between the slip ratio and the driving/braking force that can be generated in the n-th wheel Wn (a relationship between the slip ratio and the driving/braking force that can be generated according to the wheel characteristics relationship) will generally be a relationship in which the driving/braking forces have peak values (extremal values) with respect to changes in the slip ratio (a graph having slip ratio values on the axis of abscissas and the driving/braking force magnitude values on the axis of ordinates will be a graph that bulges upward). For this reason, in some cases, there are two types of slip ratio values that correspond to the values of driving/braking forces whose absolute values are smaller than the peak values. If there are two types of slip ratio values corresponding to Fxcand_n as described above, then, of the two types of slip ratio values, the slip ratio value that is closer to zero may be determined as an n-th wheel slip ratio candidate Scand_n. In other words, in the relationship between the slip ratio and the driving/braking force of the n-th wheel Wn (the relationship based on the wheel characteristics relationship), the n-th wheel slip ratio candidate Scand_n may be determined within a range between the slip ratio value, at which the driving/braking force reaches a peak value, and zero.

Supplementally, within the range between the slip ratio value, at which the driving/braking force reaches a peak value, and zero, the absolute value of a driving/braking force monotonously increases as the absolute value of the slip ratio increases from zero.

Subsequently, the procedure proceeds to S102 wherein an n-th wheel driving/braking force at the generation of a maximum moment Fxmmax_n and an n-th wheel slip ratio at the generation of a maximum moment Smmax_n, which is a slip ratio corresponding to the above Fxmmax_n, are determined under the same precondition as that in S100. Here, the n-th wheel driving/braking force at the generation of a maximum moment Fxmmax_n means the value of a driving/braking force component of a road surface reaction force that causes a moment in the yaw direction generated about the center-of-gravity point G of the actual vehicle 1 by a road surface reaction force to become maximum toward the same polarity (direction) as the polarity of the aforesaid feedback yaw moment basic required value Mfbdmd, the driving/braking force component being a component in a road surface reaction force that can be generated in the n-th wheel Wn when the side slip angle of the n-th wheel Wn is the actual side slip angle βf_act or βr_act and the road surface friction coefficient is the estimated friction coefficient μestm (more specifically, the resultant force of the driving/braking force and the lateral force that can be applied to the n-th wheel Wn from a road surface according to the wheel characteristics relationship). In this case, Fxmmax_n and Smmax_n are determined within a range wherein the absolute value of the driving/braking force monotonously increases as the absolute value of the slip ratio increases from zero in the relationship between the driving/braking force and the slip ratio of the n-th wheel Wn (the relationship based on the wheel characteristics relationship). Thus, Smmax_n is determined to take a value between the slip ratio value, at which the driving/braking force reaches a peak value, and zero.

In S102, regarding the front wheels W1 and W2 (when n=1 or 2), the n-th wheel driving/braking force at the generation of a maximum moment Fxmmax_n and the n-th wheel slip ratio at the generation of a maximum moment Smmax_n corresponding thereto are determined from, for example, the actual front wheel side slip angle βf_act, the estimated friction coefficient μestm, and the actual front wheel steering angle δf_act according to a map prepared beforehand (a map illustrating the relationship among front wheel side slip angles, road surface friction coefficients, front wheel steering angles, driving/braking forces at the generation of maximum moments, and slip ratios at the generation of maximum moments (the relationship based on the wheel characteristics relationship). Alternatively, from among the sets of driving/braking forces and lateral forces of the n-th wheel Wn (n=1 or 2) that can be generated with respect to sets of βf_act and μestm, the set of a driving/braking force and a lateral force that causes a moment in the yaw direction generated by the resultant force thereof about the center-of-gravity point G of the actual vehicle 1 to reach its maximum level is exploratively determined on the basis of the map illustrating the relationship among the front wheel side slip angles, road surface friction coefficients, slip ratios, driving/braking forces, and lateral forces, and the actual front wheel steering angle δf_act. Then, the driving/braking force and the slip ratio associated with the set may be determined as Fxmmax_n and Smmax_n, respectively.

Further, regarding the rear wheels W3 and W4, (when n=3 or 4), the n-th wheel driving/braking force at the generation of a maximum moment Fxmmax_n and the n-th wheel slip ratio at the generation of a maximum moment Smmax_n corresponding thereto are determined from, for example, the actual rear wheel side slip angle βr_act and the estimated friction coefficient μestm according to a map prepared beforehand (a map illustrating the relationship among rear wheel side slip angles, road surface friction coefficients, driving/braking forces at the generation of maximum moments, and slip ratios at the generation of maximum moments (the relationship based on the wheel characteristics relationship). Alternatively, from among the sets of driving/braking forces and lateral forces of the n-th wheel Wn (n=3 or 4) that can be generated with respect to sets of βr_act and μestm, the set of a driving/braking force and a lateral force that causes a moment in the yaw direction generated by the resultant force thereof about the center-of-gravity point G of the actual vehicle 1 to reach a maximum level is exploratively determined according to the map illustrating the relationship among the rear wheel side slip angles, the road surface friction coefficients, the slip ratios, the driving/braking forces, and the lateral forces. Then, the driving/braking force and the slip ratio associated with the set may be determined as Fxmmax_n and Smmax_n, respectively.

Incidentally, the processing in S102 may include the actual ground contact load Fzact_n of the n-th wheel Wn as a variable parameter as with the case described in relation to the processing in S100 described above.

Subsequently, the processing in S104 to S112 is carried out, as will be described later, so as to determine the target n-th wheel driving/braking force Fxcmd_n. In this case, the target n-th wheel driving/braking force Fxcmd_n is determined to satisfy the following conditions (1) to (3). Regarding conditions (1) to (3), the priority rank is higher in the order of (1), (2), and (3). If no target n-th wheel driving/braking force [Fxcmd_n] that satisfies all the conditions (1) to (3) can be determined, then the target n-th wheel driving/braking force Fxcmd_n is determined such that a condition with higher priority is preferentially satisfied.

Condition (1): If an FF total target n-th wheel driving/braking force FFtotal_n and a target n-th wheel driving/braking force Fxcmd_n are driving/braking forces in the braking direction, then the magnitude (the absolute value) of the target n-th wheel driving/braking force Fxcmd_n is not smaller than the magnitude (the absolute value) of the FF total target n-th wheel driving/braking force FFtotal_n. In other words, 0>Fxcmd_n>FFtotal_n does not happen.

Condition (2): If the target n-th wheel driving/braking force Fxcmd_n has the same polarity as that of the n-th wheel driving/braking force at the generation of a maximum moment Fxmmax_n, then the magnitude (the absolute value) of Fxcmd_n does not exceed the magnitude (the absolute value) of the Fxmmax_n. In other words, Fxcmd_n>Fxmmax_n>0 or Fxcmd_n<Fxmmax_n<0 does not happen.

Condition (3): The target n-th wheel driving/braking force Fxcmd_n agrees with the n-th wheel driving/braking force candidate Fxcand_n as much as possible (more precisely, the absolute value of a difference between Fxcmd_n and Fxcand_n is minimized).

Here, condition (1) is a condition for preventing the target n-th wheel driving/braking force Fxcmd_n from becoming smaller than the driving/braking force in the braking direction of the n-th wheel Wn of the actual vehicle 1 (this corresponds to FFtotal_n) required by an operation of the brake pedal performed by the driver of the actual vehicle 1. Supplementally, according to the embodiments in the present description, the rear wheels W3 and W4 are driven wheels, so that the FF total target n-th wheel driving/braking force FFtotal_n (n=3, 4) and the target n-th wheel driving/braking force Fxcmd_n (n=3, 4) related to the rear wheels W3 and W4 always take values of zero or less. Therefore, regarding the rear wheels W3 and W4, condition (1) is equivalent to a condition that "the magnitude (the absolute value) of the target n-th wheel driving/braking force Fxcmd_n does not become smaller than the magnitude (the absolute value) of the FF total target n-th wheel driving/braking force FFtotal_n."

Further, condition (2) is a condition for preventing a lateral force generated in the n-th wheel Wn on the basis of the target n-th wheel driving/braking force Fxcmd_n from becoming excessively small.

Further, condition (3) is a condition for satisfying as much as possible the control requirements (targets) of operations of the actuator devices 3 determined by the actuator operation FB target value determiner 20b and the FF law 22. Incidentally, Fxcand_n is, as described above, the value of a driving/braking force closest to the unlimited target n-th wheel driving/braking force Fxdmd_n (including a case of agreement therebetween) within a range of the values of driving/braking forces that can be generated in the n-th wheel Wn according to the wheel characteristics relationship (a wheel characteristics relationship observed when it is preconditioned that the side slip angle of the n-th wheel Wn is an actual side slip angle βf_act or βr_act and a road surface friction coefficient is the estimated friction coefficient μestm). Therefore, the condition (3) is, in other words, equivalent to a condition that the target n-th wheel driving/braking force Fxcmd_n takes a value within the range of values of driving/braking forces that can be generated in the n-th wheel Wn according to the wheel characteristics relationship (the wheel characteristics relationship observed when it is preconditioned that the side slip angle of the n-th wheel Wn is the actual side slip angle βf_act or βr_act and a road surface friction coefficient is the estimated friction coefficient μestm) and agrees with or approximates (the absolute value of a difference from Fxdmd_n is minimized) the unlimited target n-th wheel driving/braking force Fxdmd_n (a driving/braking force based on a control requirement) as much as possible.

To be more specific, the processing of S104 to S112 described above is carried out as follows. First, the procedure proceeds to S104 wherein it is determined whether the magnitude relationship between Fxcand_n determined in S100 and Fxmmax_n determined in S102 is 0>Fxmmax_n>Fxcand_n or 0<Fxmmax_n<Fxcand_n. If the result of the determination is NO, then the procedure proceeds to S106 wherein the value of Fxcand_n is substituted into the target n-th wheel driving/braking force Fxcmd_n.

More specifically, if Fxcand_n and Fxmmax_n have polarities that are different from each other or if the Fxcand_n and Fxmmax_n have the same polarity and the magnitude (the absolute value) of Fxcand_n is the magnitude (the absolute value) of Fxmmax_n or less, then the value of Fxcand_n is directly substituted into Fxcmd_n. Incidentally, the value of Fxcand_n is substituted into Fxcmd_n (provided Fxcmd_n=0) also when Fxcand_n=0 (at this time, Fxdmd_n is also zero).

Meanwhile, if the determination result in S104 is YES, then the procedure proceeds to S108 wherein the value of Fxmmax_n (the value determined in S102) is substituted into the target n-th wheel driving/braking force Fxcmd_n.

By the processing up to this point, Fxcmd_n is determined such that the conditions (2) and (3) are satisfied (provided that condition (2) is given a higher priority).

After the processing in S106 or S108, the procedure proceeds to S110 wherein it is determined whether the magnitude relationship between the FF total target n-th wheel driving/braking force FFtotal_n and the current target n-th wheel driving/braking force Fxcmd_n (the value determined in S106 or S108) is expressed by 0>Fxcmd_n>FFtotal_n. If the result of the determination is YES, then the procedure proceeds to S112 wherein FFtotal_n is re-substituted into the target n-th wheel driving/braking force Fxcmd_n. More specifically, if the FF total target n-th wheel driving/braking force FFtotal_n and the n-th wheel driving/braking force candidate Fxcmd_n determined in S106 or S108 are driving/braking forces in the braking direction and the magnitude (the absolute value) of Fxcmd_n is smaller than the magnitude (the absolute value) of FFtotal_n, then the value of FFtotal_n is substituted into Fxcmd_n. If the determination result in S110 is NO, then the value of Fxcmd_n at that instant is maintained as it is.

By the aforesaid processing in S104 to S112, as previously described, basically, the target n-th wheel driving/braking force Fxcmd_n is determined such that the conditions (1) to (3) are satisfied. Further, if no target n-th wheel driving/braking force Fxcmd_n that satisfies all the conditions (1) to (3) can be determined, then the target n-th wheel driving/braking force Fxcmd_n is determined such that a condition having a higher priority is preferentially satisfied.

If the determination result in S110 is NO, or after the processing in S112, the processing in S114 is carried out. In this S114, a slip ratio associated with Fxcmd_n determined by the processing in S106 to S112 as described above is determined as the target n-th wheel slip ratio Scmd_n. In this case, by the processing in S104 to S112, Fxcmd_n takes the value of one of Fxcand_n, Fxmmax_n, and FFtotal_n. And, if Fxcmd_n=Fxcand_n, then the n-th wheel slip ratio candidate Scand_n determined in S100 is determined as Scmd_n. If Fxcmd_n=Fxmmax_n, then the n-th wheel slip ratio at the generation of a maximum moment Smmax_n determined in S102 is determined as Scmd_n. If Fxcmd_n=FFtotal_n, then the slip ratio associated with FFtotal_n is determined according to, for example, a map used for the processing in S100, and the determined slip ratio may be determined as Scmd_n. In this case, if there are two types of values of the slip ratio associated with FFtotal_n, then a slip ratio value that is closer to zero (a value within the range between a slip ratio value, at which the driving/braking force of the n-th wheel Wn reaches a peak value, and zero) may be determined as Scmd_n. If FFtotal_n deviates from the range of the values of driving/braking forces that can be generated in the n-th wheel Wn in the map, then a slip ratio associated with the value of the driving/braking force that is closest to FFtotal_n may be determined as Scmd_n.

The above has described in detail the processing by the optimum target n-th driving/braking force determiner $241a\_n$ (n=1, 2, 3, 4).

In the present embodiment, the target n-th wheel driving/braking force Fxcmd_n has been determined first and then the target n-th wheel slip ratio Scmd_n associated therewith has been determined; reversely, however, the target n-th wheel slip ratio Scmd_n may be determined, and then the target n-th wheel driving/braking force Fxcmd_n associated therewith may be determined. In this case, the target n-th wheel slip ratio Scmd_n may be determined by the same processing as that in S104 to S112 described above on the basis of conditions related to the target n-th wheel slip ratio Scmd_n associated with the aforesaid conditions (1) to (3), and after that, Fxcmd_n associated with the Scmd_n may be determined. In this case, in the relationship between the slip ratios and the driving/braking forces based on the wheel characteristics relationship of the n-th wheel Wn, Scmd_n is determined within a range between the slip ratio value, at which the driving/braking force reaches a peak value, and zero.

The processing by the optimum target active steering angle determiner 247 will now be described. FIG. 22 is a functional block diagram illustrating the processing by the optimum target active steering angle determiner 247.

Referring to the figure, the optimum target active steering angle determiner 247 first determines, by a processor 247a on the basis of Fyfbdmd_f, the FB active steering angle δf_fb, which indicates change amounts of the steering angles of the front wheels W1 and W2 required for the actual vehicle 1 to generate the active steering FB target lateral force Fyfbdmd_f determined by the actuator operation FB target value determiner 20b in the front wheels W1 and W2 (more specifically, the resultant force of a lateral force of the front wheel W1 and a lateral force of the front wheel W2 is changed by Fyfbdmd_f). In this case, the processor 247a determines the cornering power Kf_1 of the first wheel W1 according to a predetermined function expression or a map on the basis of, for example, the actual ground contact load Fzact_1 of the first wheel W1, and also determines the cornering power Kf_2 of the second wheel W2 according to a predetermined function expression or a map on the basis of the actual ground contact load Fzact_2 of the second wheel W2. The function expression or map is set in advance on the basis of the tire characteristics of the front wheels W1 and W2 of the actual vehicle 1. Then, the cornering powers Kf_1 and Kf_2 are used to determine the FB active steering angle δf_fb according to the following expression 30.

$$\delta f\_fb=(1/(Kf\_1+Kf\_2))\cdot Fyfbdmd\_f \quad \text{Expression 30}$$

The FB active steering angle δf_fb determined as shown above corresponds to the correction amount of a front wheel side slip angle required to change the resultant force of the lateral forces of the front wheels W1 and W2 by Fyfbdmd_f.

Normally, changes in the actual ground contact loads Fzact_1 and Fzact_2 are small, so that the coefficient (1/(Kf_1+Kf_2)) by which Fyfbdmd_f is multiplied in expression 30 may be set to a constant value. Further, the cornering power Kf_1 and Kf_2 may be determined on the basis of the actual ground contact loads Fzact_1, Fzact_2 and the estimated friction coefficient μestm.

Subsequently, the optimum target active steering angle determiner 247 adds the δf_fb determined as described above to the FF target front wheel steering angle δf_ff by an adder 247b so as to determine the target front wheel steering angle δfcmd.

If the active steering FB target lateral force Fyfbdmd_f based on the state amount errors γerr and βerr is not deter-
mined or if Fyfbdmd_f=0 is always maintained, then δf_ff may be directly determined as the target front wheel steering angle δf_cmd.

The above has presented the detailed explanation of the processing by the actuator operation target value synthesizer 24.

[About the Actuator Drive Control Unit]

The actuator drive control unit 26 operates the actuator devices 3 of the actual vehicle 1 such that the target value determined by the actuator operation target value synthesizer 24 is satisfied. For example, the actuator manipulated variable of the driving system is determined such that the driving/braking force (the driving/braking force in the driving direction) of the first wheel W1 by an operation of the driving system of the driving/braking device 3A becomes the target first wheel driving system driving/braking force, and the driving system is operated on the basis thereof. Further, the actuator manipulated variable of the braking device is determined such that the driving/braking force of the actual road surface reaction force of the first wheel W1 (the sum of the driving/braking force of the first wheel W1 by an operation of the driving system and the driving/braking force of the first wheel W1 by an operation of the braking device (the driving/braking force in the braking direction)) becomes the target first wheel driving/braking force Fxcmd_1, and the braking device is actuated on the basis thereof. Further, in this case, the operation of the driving system or the braking device is adjusted so as to bring a difference between the actual slip ratio of the first wheel W1 and the target first wheel slip ratio Scmd_1 close to zero. The same applies to the remaining wheels W2 to W4.

Further, if the steering device 3B is an actuator-driven steering device, then the actuator manipulated variable of the steering device 3B is determined such that the actual front wheel steering angle δf_act agrees with the target front wheel steering angle δfcmd, and the operation of the steering device 3B is controlled on the basis thereof. If the steering device 3B is an actuator-assisted steering device, then the operation of the steering device 3B is controlled such that the actual front wheel steering angle δf_act agrees with the sum of the target front wheel steering angle δf_cmd and a mechanical steering angle component based on the steering angle θh.

The reduction gear ratio of the speed change gear of the driving system of the driving/braking device 3A is controlled on the basis of the target transmission reduction gear ratio.

Regarding the control amounts of the driving/braking forces, the lateral forces and the like of the wheels W1 to W4, the operations of the driving/braking device 3A, the steering device 3B, and the suspension device 3C tend to interfere with each other. In such a case, the operations of the driving/braking device 3A, the steering device 3B, and the suspension device 3C are desirably controlled integrally by the processing of decoupling in order to control the control amounts to target values.

SECOND EMBODIMENT

The following will describe a second embodiment of the present invention. The present embodiment differs from the aforesaid first embodiment only in the characteristics adjusting matrix K for adjusting the transient response characteristic of a model vehicle. Hence, the explanation will be focused mainly on the different aspect, and the explanation of the same construction and the same processing as those in the first embodiment will be omitted.

The aforesaid first embodiment has shown an example wherein k2 out of the model characteristics adjusting parameters k1 and k2, which are the diagonal components of the characteristic adjusting matrix K of the expression 01, has been variably set according to the traveling velocity Vact (=Vd) and k1 has been fixed to "1" in order to enhance the attenuation properties of the state amounts γd and βd of the model vehicle based on stepped changes in the steering angle θh.

In contrast to this, according to the present embodiment, the value of k2 out of the model characteristics adjusting parameters k1 and k2 is fixed to "1." Further, the value of k1 is variably set according to the traveling velocity Vact in the processing by the reference dynamic characteristic model 16 in order to enhance the attenuation properties of the state amounts βd and γd of the model vehicle based on stepped changes in the steering angle θh.

Specifically, the value of the model characteristics adjusting parameter k1 is variably set according to the traveling velocity Vact in the same manner as that for setting the value of k2 in, for example, the aforesaid first embodiment. More specifically, in a situation wherein Vact≦Vd_critical holds, k1 is set to 1. Further, in a situation wherein Vact>Vd_critical holds, the value of k1 is set according to Vact such that the response characteristics of the state amounts βd and γd of the model vehicle based on stepped changes in the steering angle θh become the critical braking characteristics. In this case, the value of k1 when Vact>Vd_critical is the value of k that satisfies expression 105 given below.

$$(k1 \cdot a11 + a22)^2 - 4 \cdot k1 \cdot (a11 \cdot a22 + a12 \cdot a21) = 0 \quad \text{Expression 105}$$

The value of k1 set as described above is set to a value that is larger than "1" in a situation wherein Vact>Vd_critical holds. At this time, the value of k1 monotonously increases as Vact rises.

Thus, variably setting the value of the model characteristics adjusting parameter k1 on the basis of the traveling velocity Vact makes it possible to turn the transient response characteristics of the state amounts βd and γd of the model vehicle based on stepped changes in the steering angle θh into non-oscillatory characteristics while maintaining the steady-state characteristics of the model vehicle at characteristics that approximate the steady-state characteristics of the actual vehicle 1, as with the first embodiment.

The construction and processing other than those described above are the same as those in the first embodiment.

Supplementally, the value of k1 in the case where Vact>Vd_critical holds may be set to a value which is slightly larger than the value of k1 which causes the response characteristics of the state amounts βd and γd of the model vehicle represented by expression 01 to turn into the critical braking characteristic. In other words, the value of k1 may be set such that the response characteristics of the state amounts βd and γd of the model vehicle turn into the over-braking characteristics. Further, in the case where the traveling velocity Vact is extremely slow (a traveling velocity of not more than a predetermined value which is smaller than the critical braking velocity Vd_critical), the value of k1 may be set to be smaller than "1" within the range wherein the responsiveness of the model vehicle does not turn into an oscillatory characteristic.

THIRD EMBODIMENT

A third embodiment of the present invention will now be described. The present embodiment differs from the aforesaid first embodiment or the second embodiment only in the characteristics adjusting matrix K for adjusting the transient response characteristic of a model vehicle. Hence, the explanation will be focused mainly on the different aspect, and the explanation of the same construction and the same processing as those in the first embodiment or the second embodiment will be omitted.

In the first embodiment and the second embodiment, only one of the model characteristics adjusting parameters k1 and k2 of the characteristics adjusting matrix K of the aforesaid expression 01 has been variably set in order to enhance the attenuation properties of the state amounts βd and γd of the model vehicle based on stepped changes in the steering angle θh. In this case, if the traveling velocity Vact (=Vd) is higher than the critical braking velocity Vd_critical, then the absolute value of a solution (eigenvalue) of the characteristics equation det(λ·I−K·A)=0 of the model vehicle tends to become excessively large. Consequently, the responsiveness (velocity responsiveness) of the state amounts γd and βd of the model vehicle to stepped changes in the steering angle θh tends to become higher than that of the actual vehicle 1. For example, the absolute value of a solution (eigenvalue) of the characteristics equation of the model vehicle in the aforesaid first embodiment changes according to the traveling velocity Vact, as illustrated by the dashed-line graph of FIG. 23. As illustrated in the figure, in a high-velocity area wherein the traveling velocity Vact is higher than a predetermined velocity Vx(>Vd_critical), the absolute value of a solution (eigenvalue) of the characteristics equation of the model vehicle increases as the traveling velocity Vact rises.

Hence, especially in a case where the gains of the virtual external forces Fvir and Mvir (model operation control inputs) relative to the state amount errors βerr and γerr have been set to be small values, the state amount errors βerr and γerr sometimes become relatively large in a transient period when the actual vehicle 1 is traveling at a high velocity. And, in such a case, there is a danger in which the manipulated variable of an actuator based on the feedback control by the actuator devices 3 (the driving/braking device 3A and the steering device 3B) on the basis of the state amount errors βerr and γerr becomes excessive.

According to the third embodiment, therefore, both model characteristics adjusting parameters k1 and k2 of the characteristics adjusting matrix K of expression 01 are variably set. This arrangement prevents the solution of the characteristics equation det(λ·I−K·A)=0 of the model vehicle, i.e., the absolute value of the eigenvalue of the model vehicle, from becoming excessive while enhancing the attenuation properties of the state amounts μd and γd of the model vehicle.

Specifically, according to the present embodiment, the values of both model characteristics adjusting parameters k1 and k2 are variably set according to the traveling velocity Vact. In this case, the values of k1 and k2 are set such that the response characteristics of the state amounts γd and βd of the model vehicle represented by expression 01 will not be oscillatory (such that the response characteristics will be the critical braking or over-braking characteristics) and the absolute value of the solution of the characteristics equation of the model vehicle will remain at a predetermined value or less. The sets of values of k1 and k2 that may satisfy such a condition are, for example, mapped beforehand on the basis of the traveling velocity Vact. Then, the processing by the reference dynamic characteristic model 16 at each control processing cycle sets the values of k1 and k2 from the value of the traveling velocity Vact (the current time value) according to the map.

FIGS. 24(a) and (b) are graphs illustrating the setting examples of the values of k1 and k2, respectively, based on the actual traveling velocity Vact in the present embodiment.

In this example, the values of k1 and k2 in a situation wherein Vact≦Vd_critical applies are both set to "1." Further, in a situation wherein Vact>Vd_critical holds, the value of k2 is set such that it monotonously increases as Vact increases as approximately with the aforesaid first embodiment, as illustrated in FIG. 24(b). Meanwhile, the value of k1 is maintained at "1" until Vact rises to the aforesaid predetermined velocity Vx, as shown in FIG. 24(a). Then, when Vact becomes larger than Vx, i.e., Vact>Vx, the value of k1 is set such that it monotonously decreases as Vact rises. In this case, in the example illustrated in FIG. 24, in a situation wherein Vact>Vx holds, the value of k1 is set such that the absolute value of the solution (eigenvalue) of the characteristics equation det($\lambda \cdot I - K \cdot A$)=0 of the model vehicle is equal to the absolute value of the solution of the characteristics equation when Vact=Vx and the response characteristic of the state amounts γd and βd of the model vehicle becomes the critical braking characteristic.

By setting the values of k1 and k2 as described above, the absolute value of the solution (eigenvalue) of the characteristics equation of the model vehicle becomes a value which is not more than the absolute value of the solution of the characteristics equation when Vact=Vx at any traveling velocity Vact at which Vact>Vx holds. In the present embodiment, as illustrated by the solid-line graph of FIG. 23, the absolute value of the solution (eigenvalue) of the characteristics equation of the model vehicle is maintained at a value that is equal to the absolute value of the solution of the characteristics equation when Vact=Vx at any traveling velocity Vact at which Vact>Vx holds.

Supplementally, in the case where the values of all diagonal components k1 and k2 of the characteristics adjusting matrix K are variably set, as in the present embodiment, the value of the solution of the characteristics equation of the model vehicle can be arbitrarily set.

According to the present embodiment, variably setting the values of both model characteristics adjusting parameters k1 and k2 on the basis of the traveling velocity Vact makes it possible to prevent the response characteristics of the state amounts βd and γd of the model vehicle from becoming oscillatory characteristics and also prevent the absolute value of the solution of the characteristics equation of the model vehicle and the consequent responsiveness (velocity responsiveness) of the state amounts βd and γd of the model vehicle relative to changes in the steering angle θh from becoming excessive. Incidentally, the characteristics adjusting matrix K does not influence the steady-state characteristics of the model vehicle. Hence, the steady-state characteristics of the model vehicle can be maintained at characteristics that approximate the steady-state characteristics of the actual vehicle 1, independently of changes in the values of the model characteristics adjusting parameters k1 and k2, as with the first embodiment and the second embodiment.

In the embodiments described above, the description has been given by taking, as an example, the case where the dynamic characteristic model of the second-order system is used; however, the present invention can be applied to the case where a dynamic characteristic model of the third order or more is used.

For instance, as the reference dynamic characteristic model, a model that takes into account the response delay of a change in a lateral force relative to a change in the side slip angle of a wheel may be used.

In this case, the dynamic characteristics of the reference dynamic characteristic model are represented by, for example, expression 110 given below.

[Mathematical Expression 9]

$$\frac{d}{dt}\begin{bmatrix} \beta d \\ \gamma d \\ \text{Ffy\_d} \\ \text{Fry\_d} \end{bmatrix} = K_{4a} \cdot \left( A_{4a} \cdot \begin{bmatrix} \beta d \\ \gamma d \\ \text{Ffy\_d} \\ \text{Fry\_d} \end{bmatrix} + \begin{bmatrix} 0 \\ 0 \\ -kyf \cdot Vd \\ 0 \end{bmatrix} \cdot \delta f\_d + \begin{bmatrix} 0 \\ 0 \\ Fvir1 \\ Fvir2 \end{bmatrix} \right) \quad \text{Expression 110}$$

where $$K_{4a} = \begin{bmatrix} k1 & 0 & 0 & 0 \\ 0 & k2 & 0 & 0 \\ 0 & 0 & k3 & 0 \\ 0 & 0 & 0 & k4 \end{bmatrix}$$

$$A_{4a} = \begin{bmatrix} 0 & -1 & 2/(m \cdot Vd) & 2/(m \cdot Vd) \\ 0 & 0 & 2 \cdot Lf/I & -2 \cdot Lf/I \\ kyf \cdot Vd & kyf \cdot Lf & -kyf \cdot Vd/Kf & 0 \\ kyr \cdot Vd & kyr \cdot Lr & 0 & -kyr \cdot Vd/Kr \end{bmatrix}$$

kyf and kyr in the note of expression 110 denote the lateral rigidity of a front wheel and the lateral rigidity of a rear wheel, respectively. The meanings of m, Lf, Lr, and I are the same as those of the aforesaid expression 01. Further, Ffy_d and Fry_d denote the lateral force per wheel of the front wheels and the lateral force per wheel of the rear wheels, respectively. Further, Fvir1 and Fvir2 denote the virtual external forces (virtual translational forces) additionally applied to the model vehicle as the model manipulated variable control inputs to approximate the differences in state amount (the difference in yaw rate and the difference in vehicle center-of-gravity point side slip angle) between the actual vehicle 1 and the model vehicle of expression 110 to zero. Fvir1 and Fvir2 mean virtual lateral translational forces to be applied to the model vehicle at a front wheel position and a rear wheel position, respectively.

Further, $K_{4a}$ in expression 110 denotes a diagonal matrix for adjusting the dynamic characteristics of the reference dynamic characteristic model, as with the characteristics adjusting matrix K in the aforesaid expression 01. Variably setting the value of one or more diagonal components among the diagonal components k1, k2, k3, and k4 of the characteristics adjusting matrix $K_{4a}$ in expression 110 to a value other than zero makes it possible to enhance the attenuation properties of the state amounts βd and γd relative to stepped changes in the steering angle θh (stepped changes in the front wheel steering angle δf_d) to be higher than the attenuation property of the actual vehicle 1 while at the same time maintaining the steady-state characteristics of the model of expression 110 constant.

Further, as the reference dynamic characteristic model, a model which has interference between a motion about the roll axis of a vehicle and a motion about the yaw axis may be used. Such a model is represented in a form of the following expression 111 obtained by, for example, adding a virtual external force for operating a model (a model operation control input) and a characteristics adjusting parameter to expressions (6.29)', (6.30)' and (6.31)' of the aforesaid non-patent document 1.

$$d/dt(\beta d, \gamma d, \phi d, \phi d')^T = K_{4b} \cdot (A_{4b} \cdot (\beta d, \gamma d, \phi d, \phi d')^T + B \cdot \delta f\_d + Bvir \cdot (Fyvir, Mzvir, Mxvir)^T) \quad \text{Expression 111}$$

where $\phi d$ in expression 111 denotes the roll angle of a vehicle body 1B (the angle of inclination about the roll axis), $\phi d'$ denotes a differential value of $\phi d$ (the angular velocity of a roll angle), $A_{4b}$ denotes a square matrix of 4 rows and 4 columns, B denotes a matrix of 4 rows and 1 column, and Bvir denotes a matrix of 4 rows and 3 columns. Further, Fyvir, Mzvir, and Mxvir are virtual external forces as the model operation control inputs for bringing state amount errors (e.g., a vehicle center-of-gravity point side slip angle error, a yaw rate error, and an error of a roll angle or an angular velocity thereof) close to zero. In this case, Fyvir denotes a lateral virtual translational force, Mzvir denotes a virtual moment about the yaw axis, and Mxvir denotes a virtual moment about the roll axis. These virtual external forces Fyvir, Mzvir, and Mxvir are determined on the basis of the state amount errors.

Further, $K_{4b}$ of expression 111 denotes a diagonal matrix (a diagonal matrix of 4 rows and 4 columns) for adjusting the dynamic characteristics of the reference dynamic characteristic model, as with the characteristics adjusting matrix K of expression 01 described above. By defining one or more diagonal components among the four diagonal components of the characteristics adjusting matrix $K_{4b}$ of expression 111 as the parameter or parameters for adjusting the response characteristic of the model of expression 111, and by variably setting the value or values thereof to a non-zero value or values, it is possible to enhance the attenuation properties of the state amounts $\beta d$ and $\gamma d$ relative to stepped changes in the steering angle $\theta h$ (stepped changes in the front wheel steering angle $\delta f\_d$) to be higher than the attenuation property of the actual vehicle 1 while maintaining the steady-state characteristics of the model of expression 111 constant.

Further, the first to the third embodiments described above have shown the examples wherein the state amount related to a side slip of the vehicle and the state amount related to a rotation about the yaw axis have been used as the state amounts to be controlled; however, the state amounts related to other motions of the vehicle may be used. For example, the state amount related to a rotative motion about the roll axis (e.g., a roll angle and an angular velocity thereof) may be used. In this case, the attenuation property of the roll angle or the angular velocity thereof may be enhanced in the case where the traveling velocity of the vehicle is relatively high.

Further, the aforesaid first to third embodiments have presented the description, taking the four-wheeled vehicle as an example; however, the present invention can be applied also to a vehicle, such as a two-wheeled motor vehicle.

Industrial Applicability

As explained above, the present invention is useful in that the invention permits the provision of a vehicle, such as an automobile, which is capable of turning the response characteristic of a vehicle relative to a change in a drive manipulated variable, such as a steering angle, into a characteristic with a high attenuation property, independently of a motional state of the vehicle, and which exhibits excellent behavior characteristics.

BRIEF DESCRIPTION OF THE DRAWINGS

FIG. 19 is a functional block diagram illustrating the processing by an FF law in the first embodiment.

Figure 1:
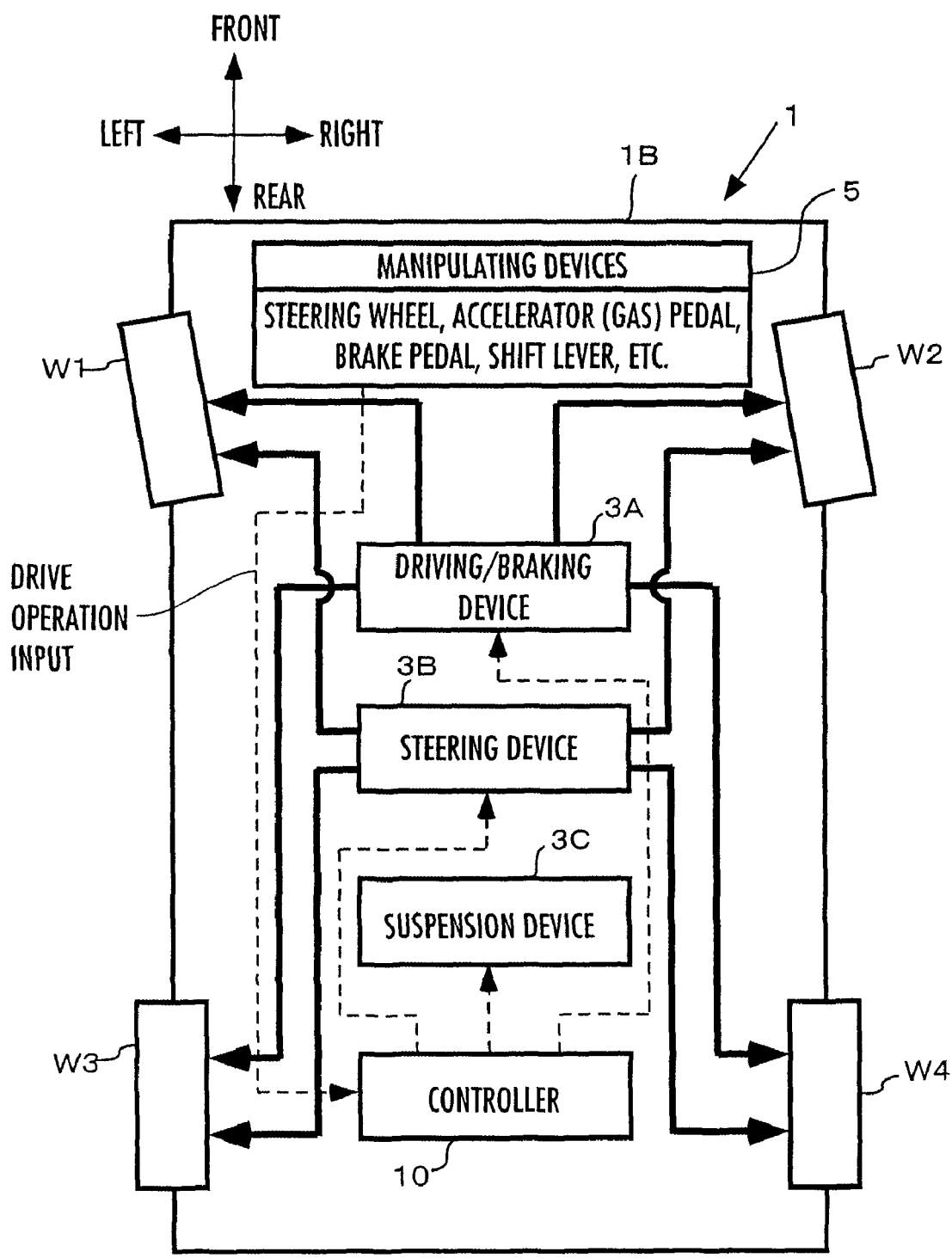
FIG. 1 is a block diagram illustrating a schematic construction of a vehicle in an embodiment of the present invention.
Figure 2:
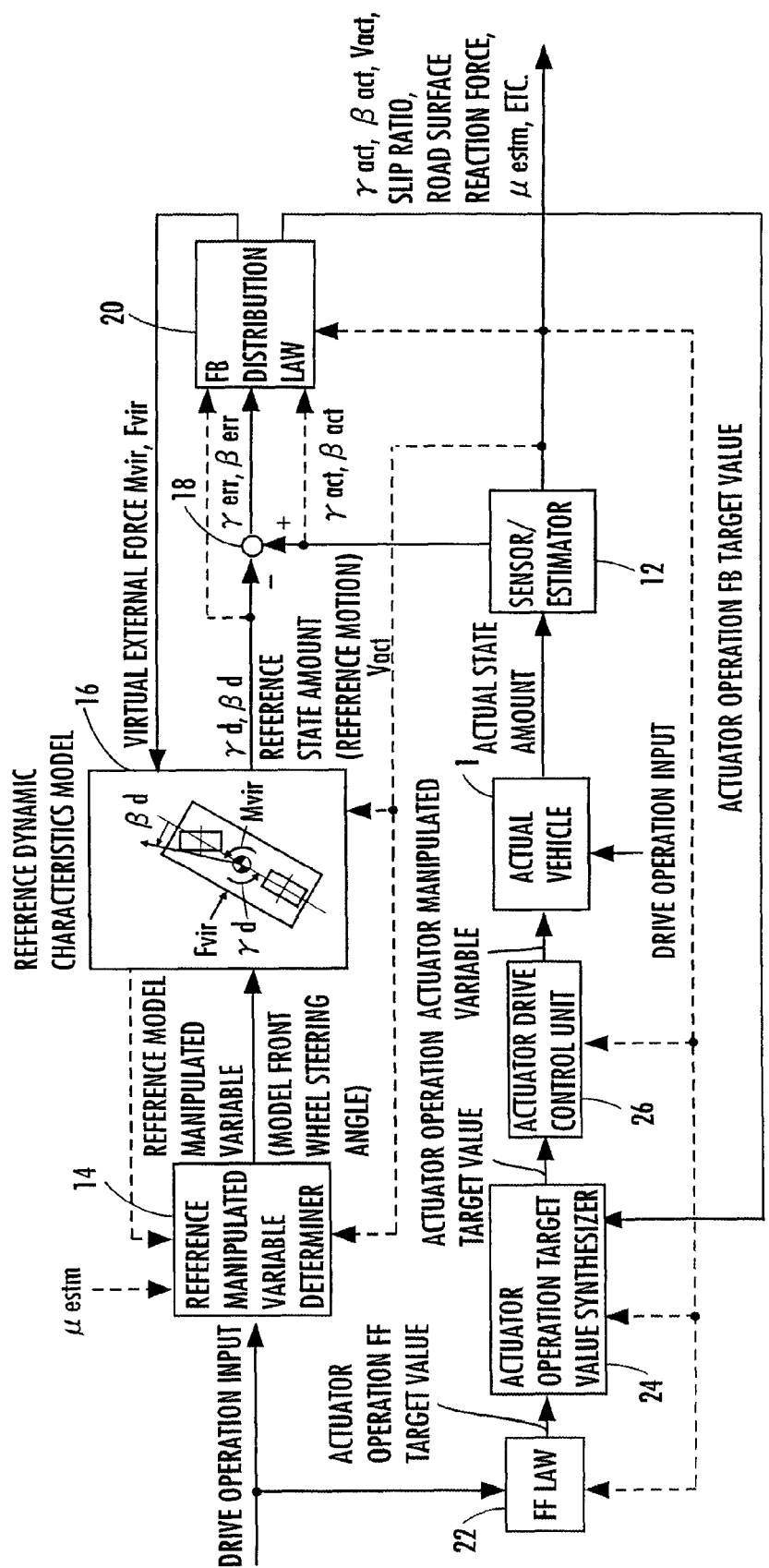
FIG. 2 is a functional block diagram schematically illustrating a general control processing function of a controller provided in a vehicle in a first embodiment of the present invention.
Figure 3:
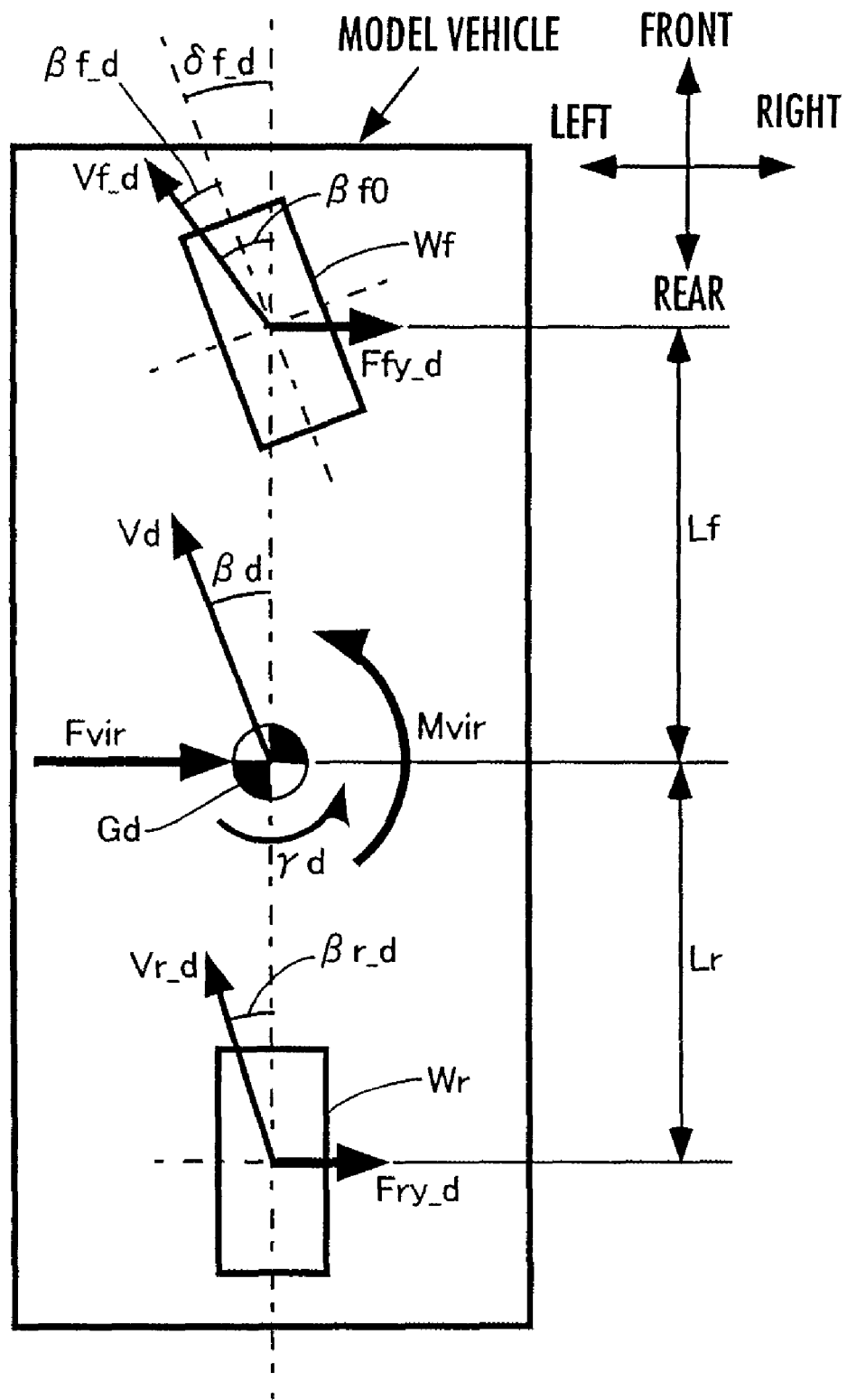
FIG. 3 is a diagram illustrating the structure of a vehicle on a reference dynamic characteristic model (vehicle model) in the first embodiment.
Figure 4A:
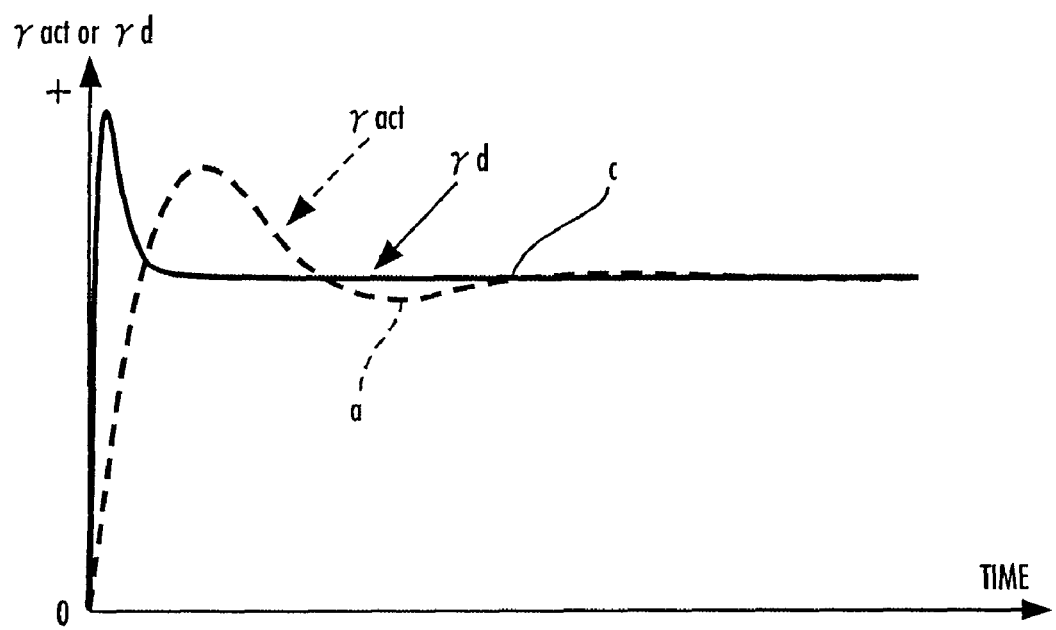
FIG. 4(a) is a graph illustrating the response characteristic of a yaw rate in each of an actual vehicle and a vehicle model.
Figure 4B:
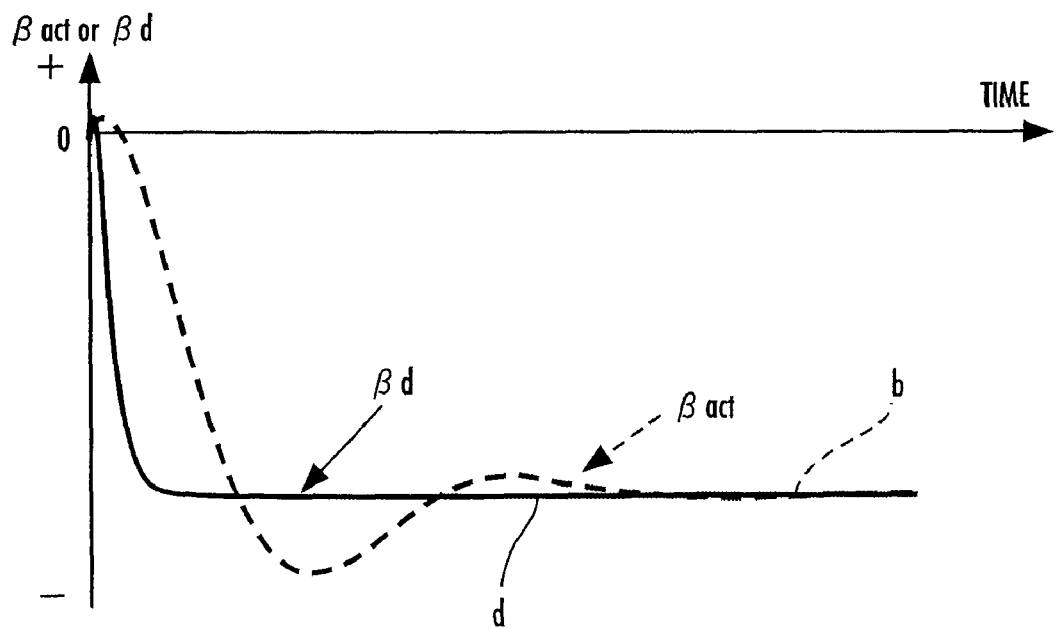
FIG. 4(b) is a graph illustrating the response characteristic of a vehicle center-of-gravity point side slip angle in each of the actual vehicle and the vehicle model.
Figure 5:
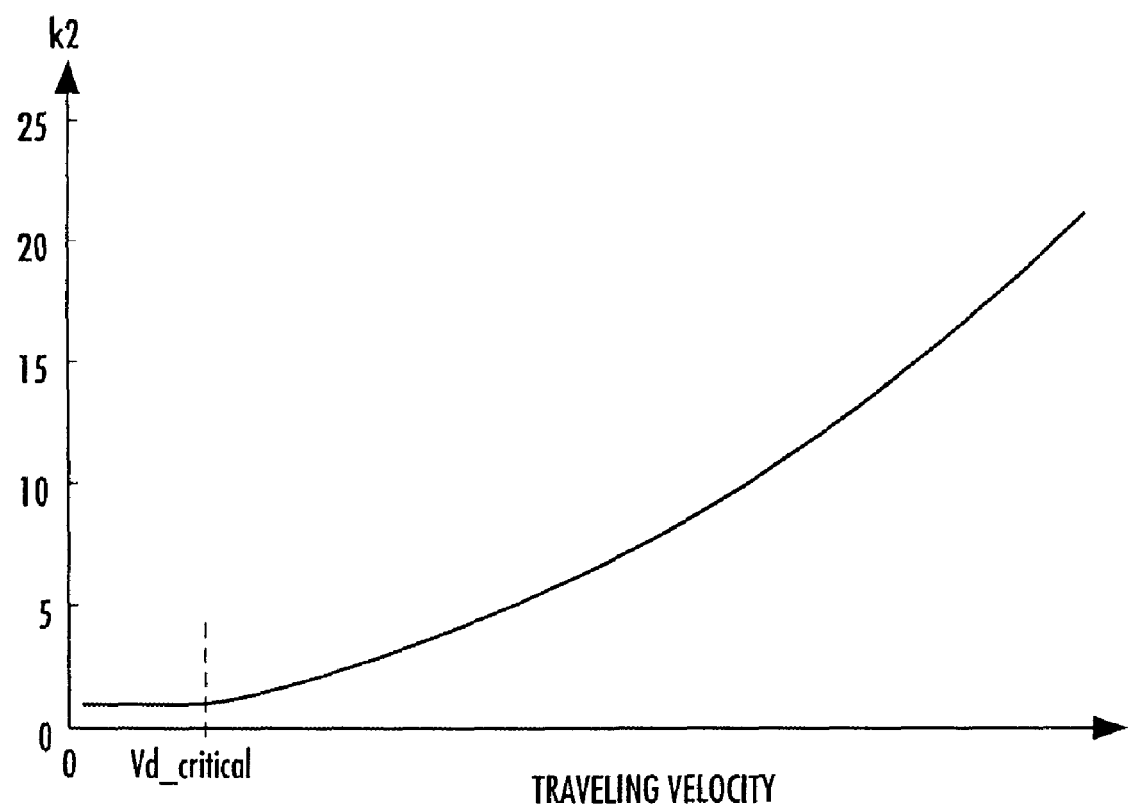
FIG. 5 is a graph illustrating a setting example of a model characteristics adjusting parameter k2 in the first embodiment.
Figure 6:
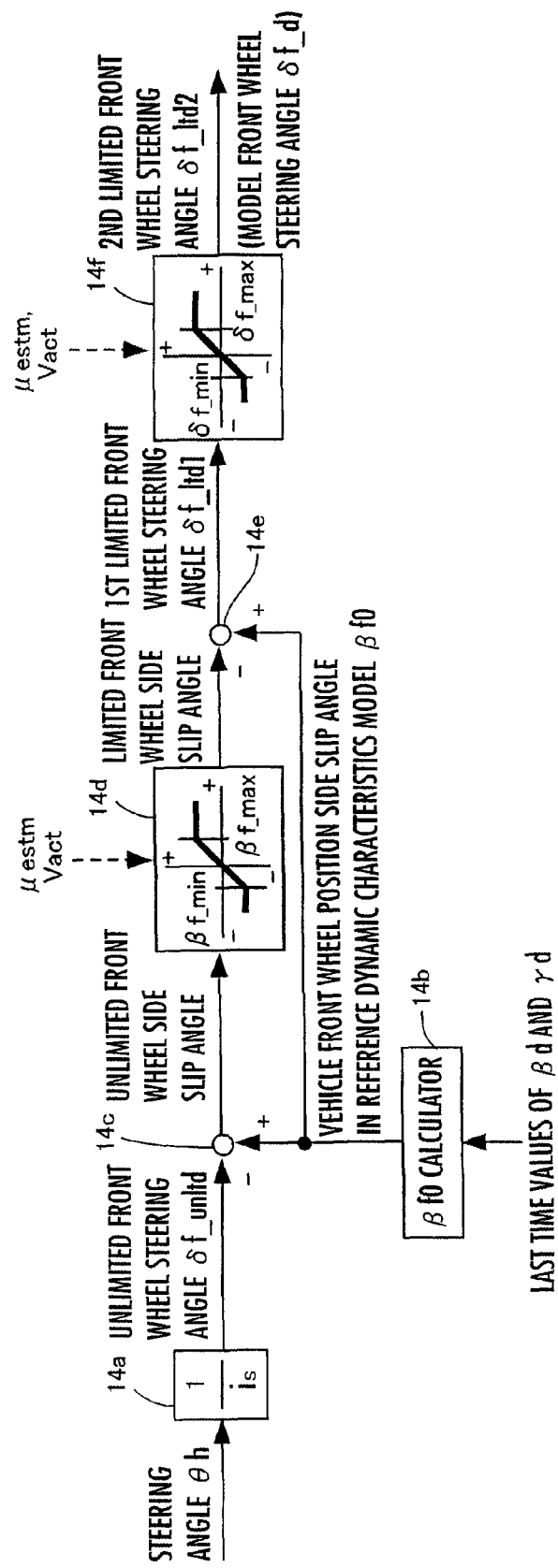
FIG. 6 is a functional block diagram illustrating the details of a processing function of a reference manipulated variable determiner in the first embodiment.
Figure 7A:
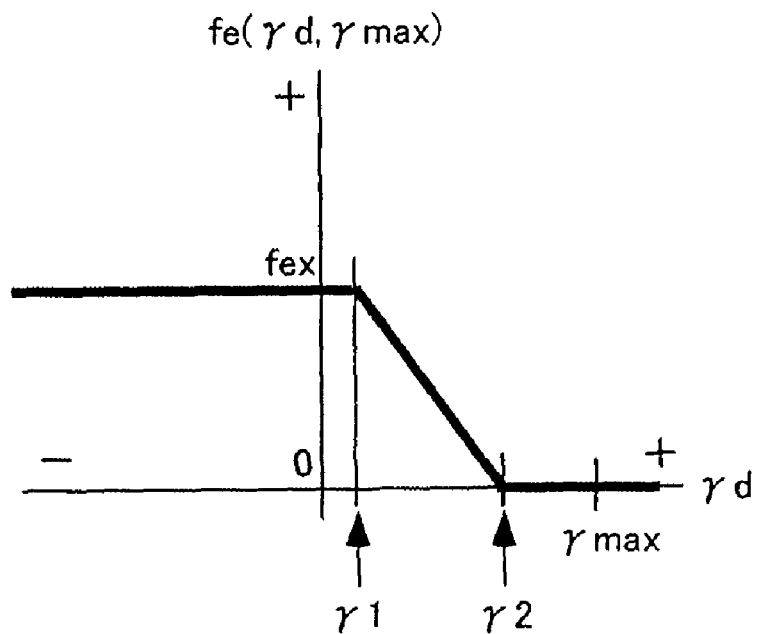
FIG. 7 is a graph for describing the processing by a limiter for preventing excessive centrifugal forces, which is provided in the reference manipulated variable determiner in the first embodiment.
Figure 7B:
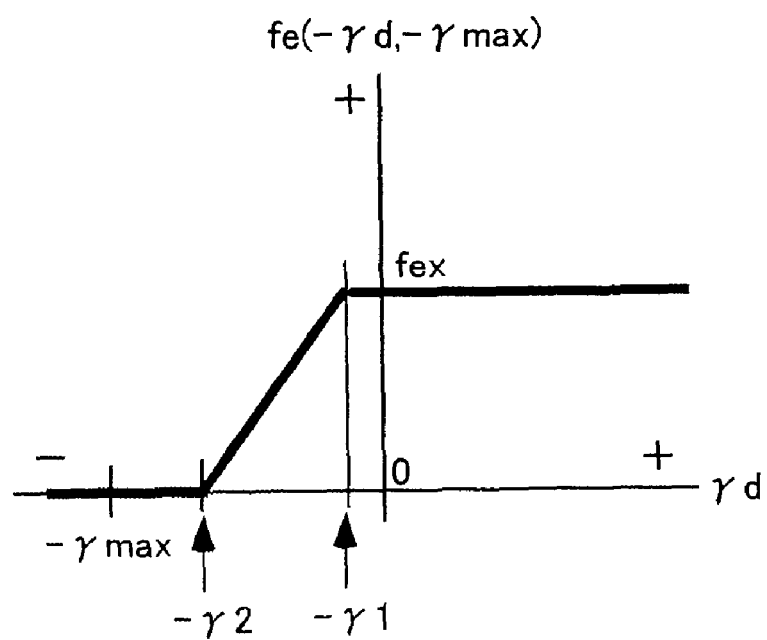
Figure 8:
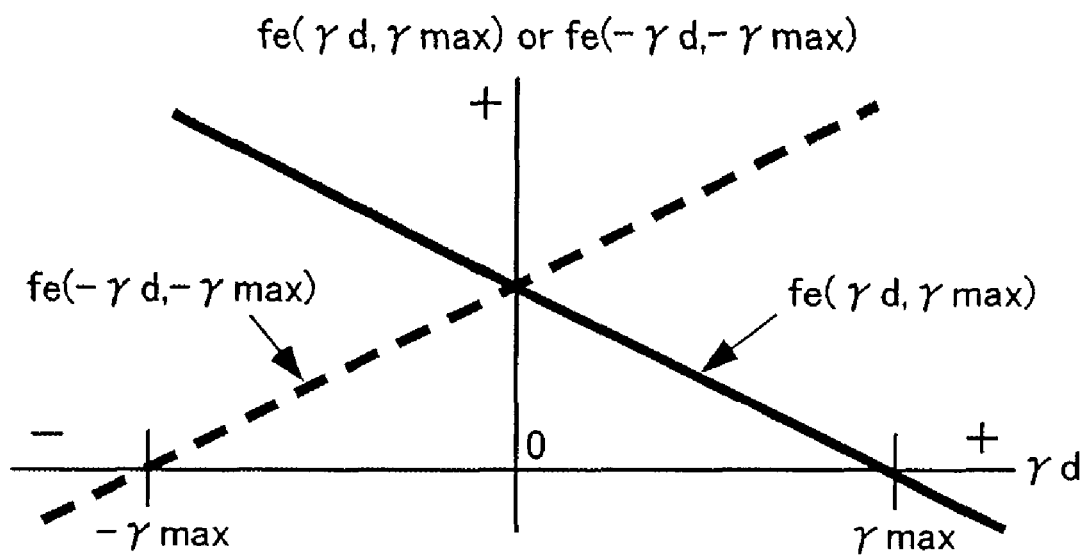
FIG. 8 is a graph for describing another example of the processing by the limiter for preventing excessive centrifugal forces in the first embodiment.
Figure 9:
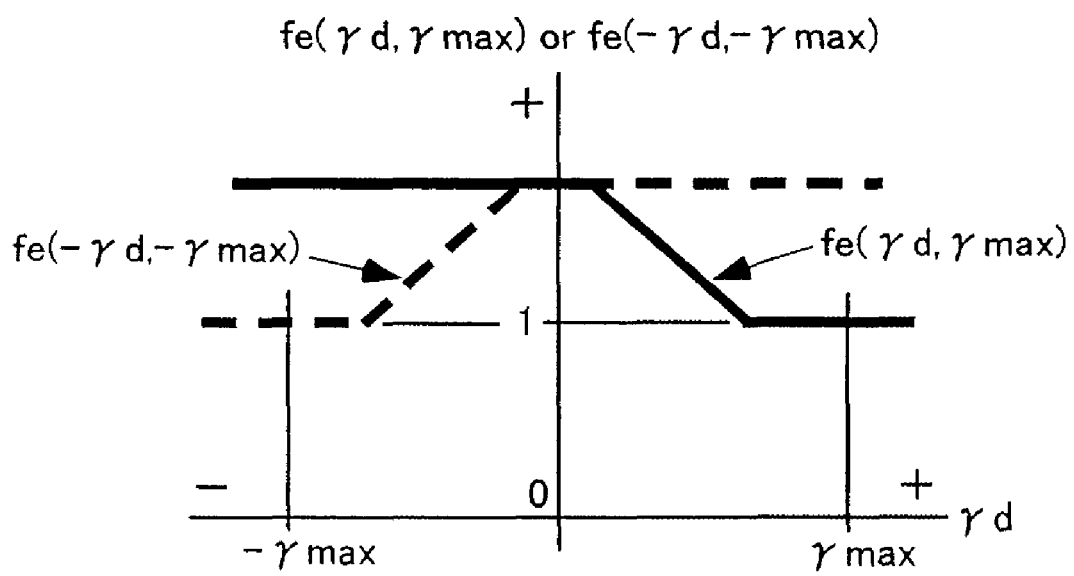
FIG. 9 is a graph for describing still another example of the processing by the limiter for preventing excessive centrifugal forces in the first embodiment.
Figure 10:
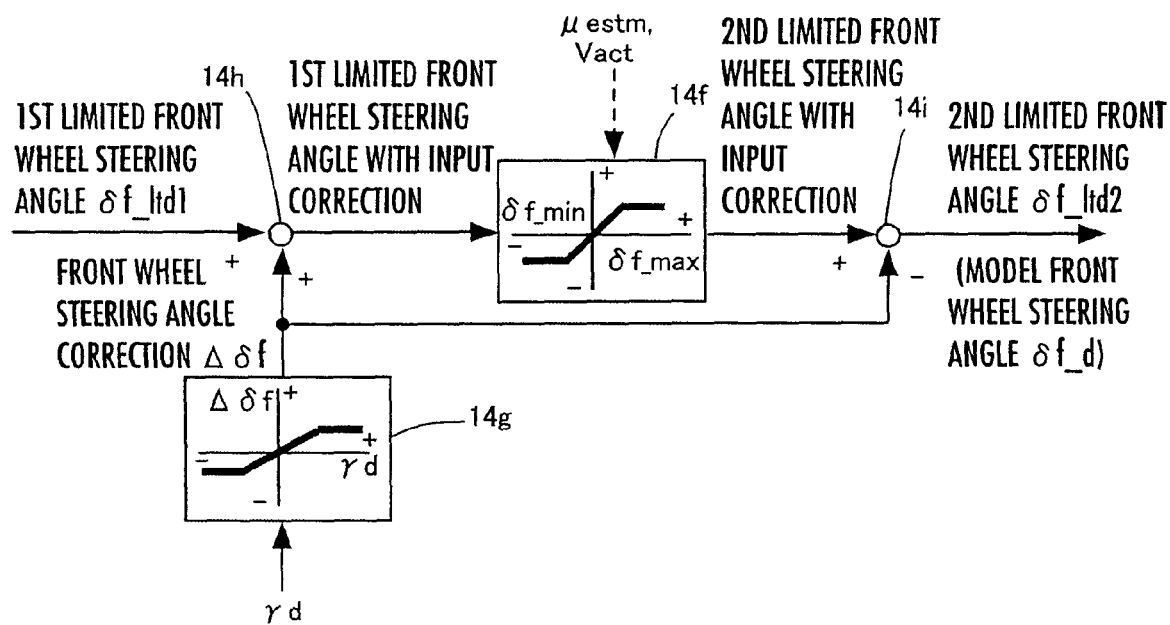
FIG. 10 is a functional block diagram illustrating another example of processing for determining a second limited front wheel steering angle $\delta f\_ltd2$ in the reference manipulated variable determiner in the first embodiment.
Figure 11:
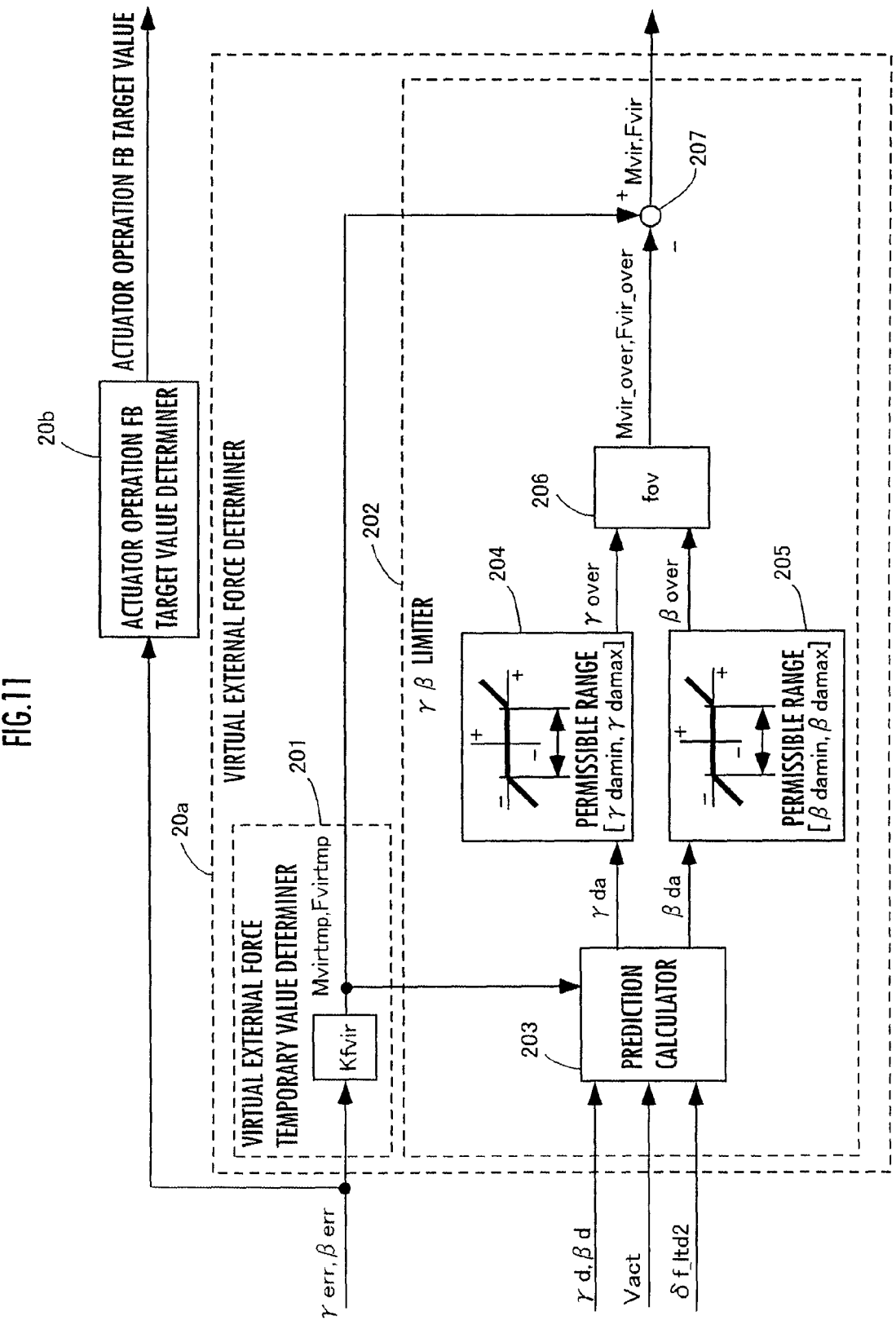
FIG. 11 is a functional block diagram illustrating the processing function of an FB distribution law in the first embodiment.
Figure 12:
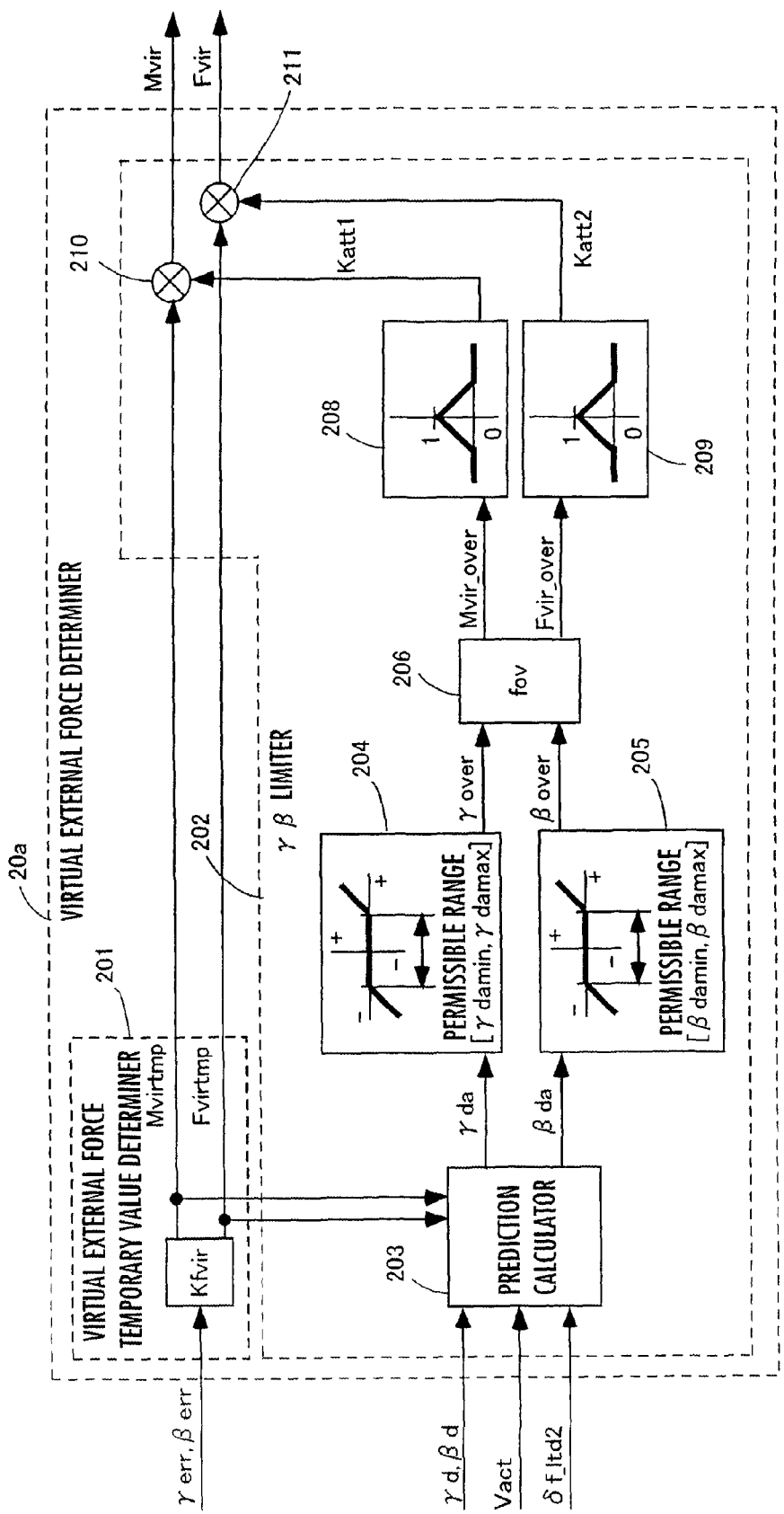
FIG. 12 is a functional block diagram illustrating another example of the processing by a virtual external force determiner in the first embodiment.
Figure 13:
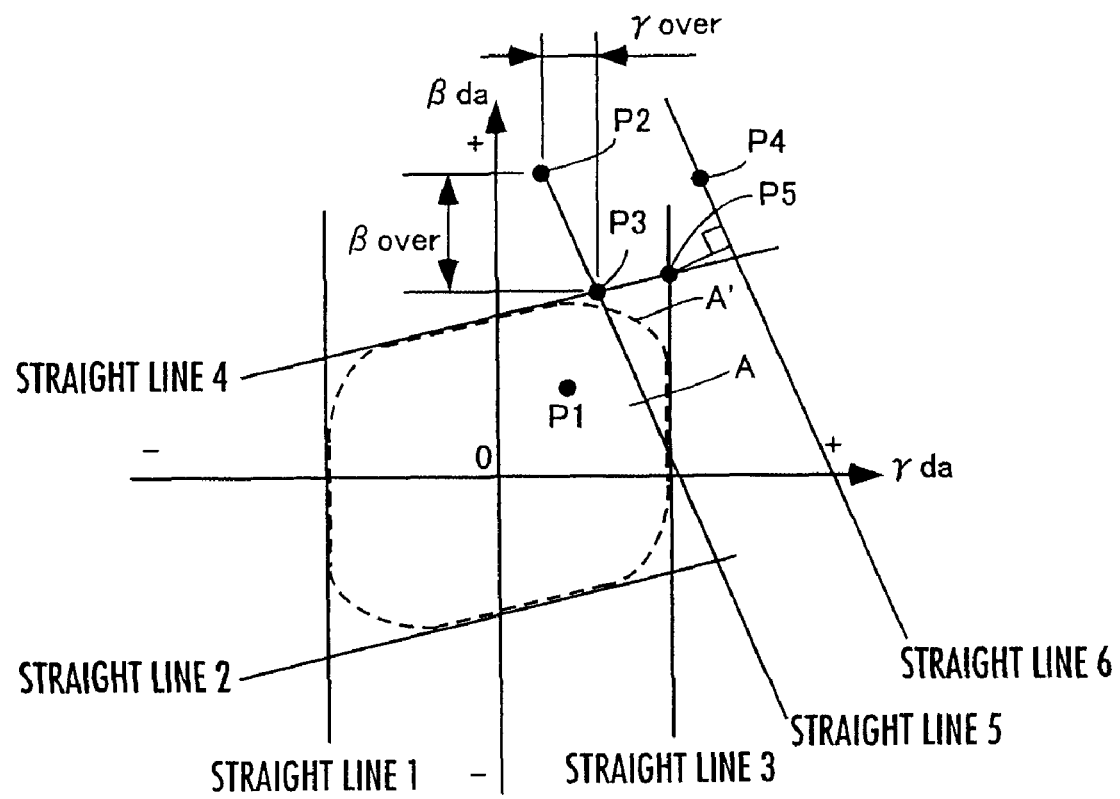
FIG. 13 is a graph for describing another example of the processing by an $\gamma\beta$ limiter in the first embodiment.
Figure 14:
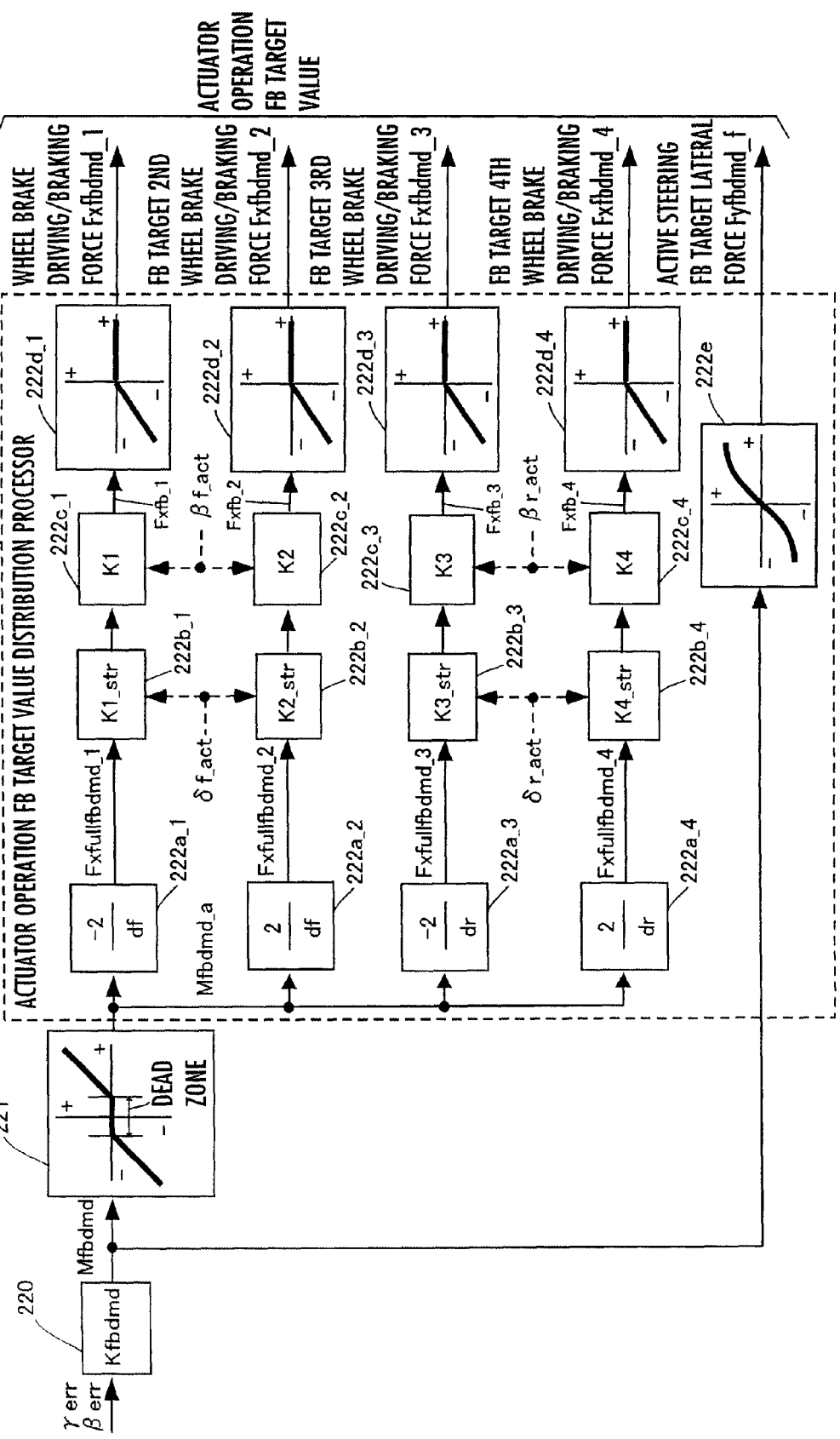
FIG. 14 is a functional block diagram illustrating the processing by an actuator operation FB target value determiner in the first embodiment.
Figure 15:
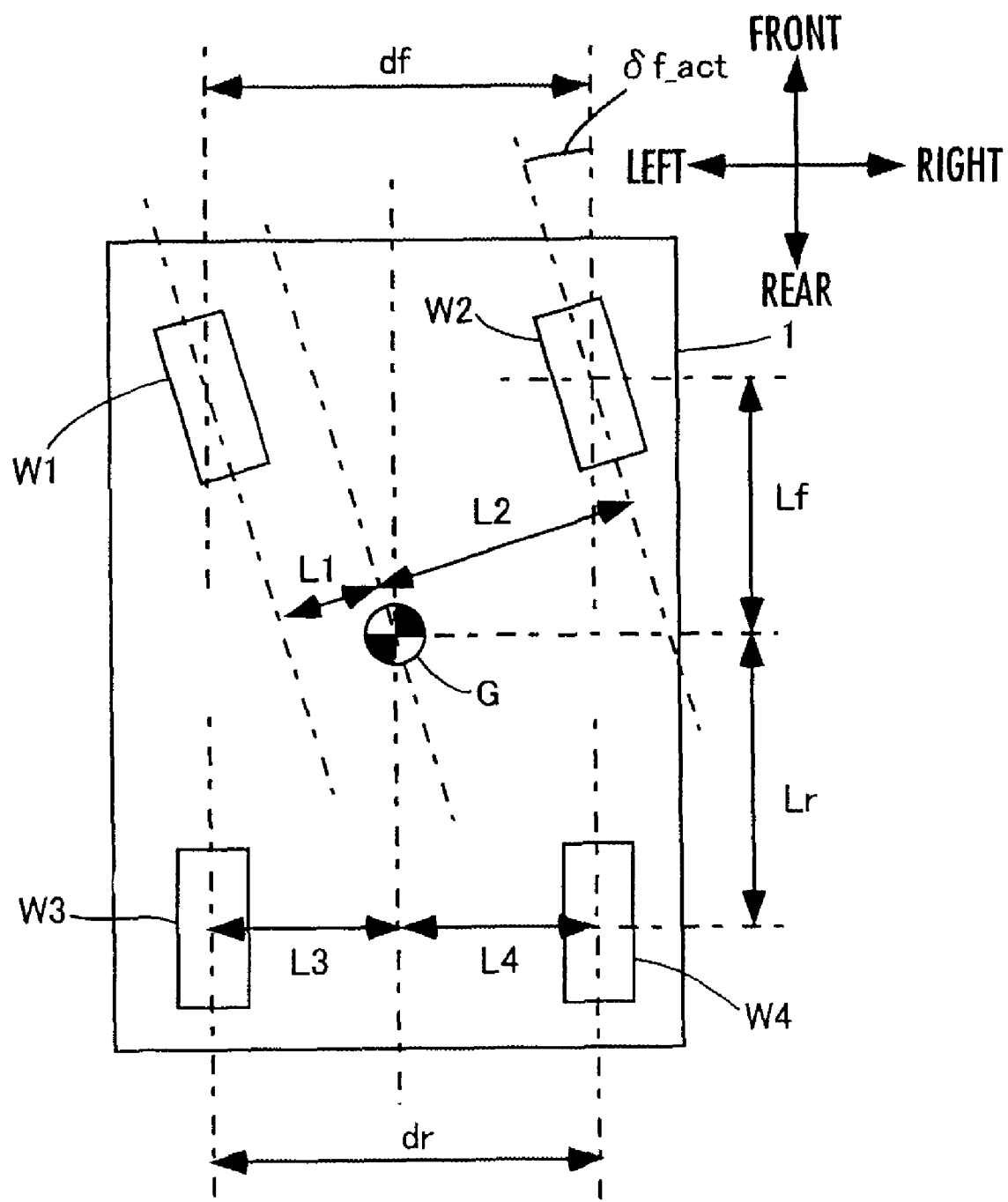
FIG. 15 is a diagram for describing a variable used in the processing by the actuator operation FB target value determiner in the first embodiment.
Figure 16A:
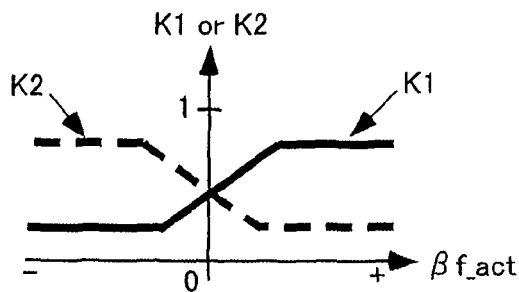
FIGS. 16(a) and (b) are graphs illustrating distribution gain setting examples used in the processing by the actuator operation FB target value determiner in the first embodiment.
Figure 16B:
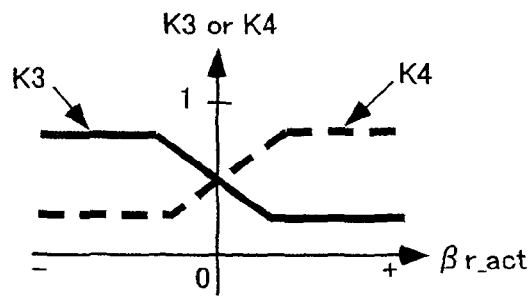
Figure 17A:
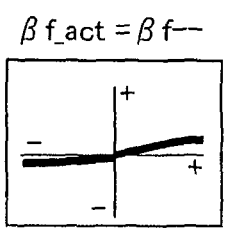
FIGS. 17(a) to (e) are diagrams illustrating the maps used with another example of the processing by the actuator operation FB target value determiner in the first embodiment.
Figure 17B:
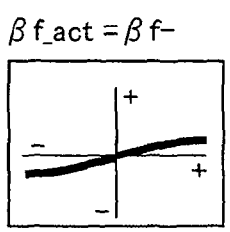
Figure 17C:
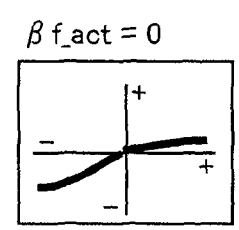
Figure 17D:
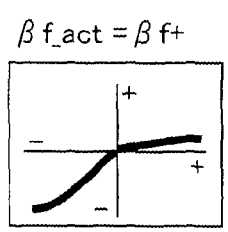
Figure 17E:
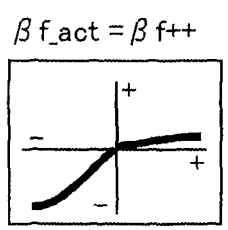
Figure 18A:
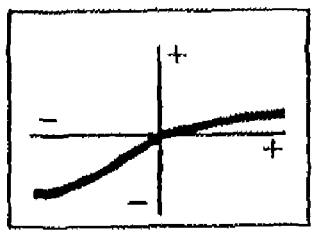
FIGS. 18(a) to (e) are diagrams illustrating the maps used with still another example of the processing by the actuator operation FB target value determiner in the first embodiment.
Figure 18B:
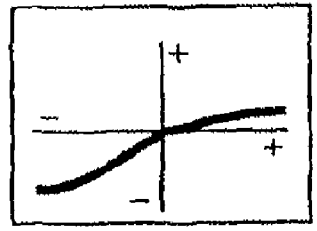
Figure 18C:
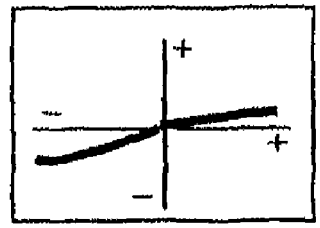
Figure 18D:
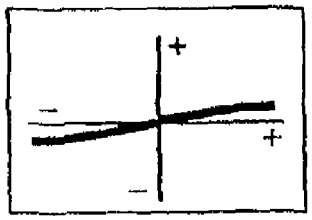
Figure 18E:
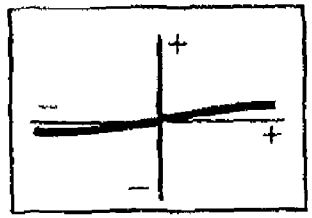
Figure 20:
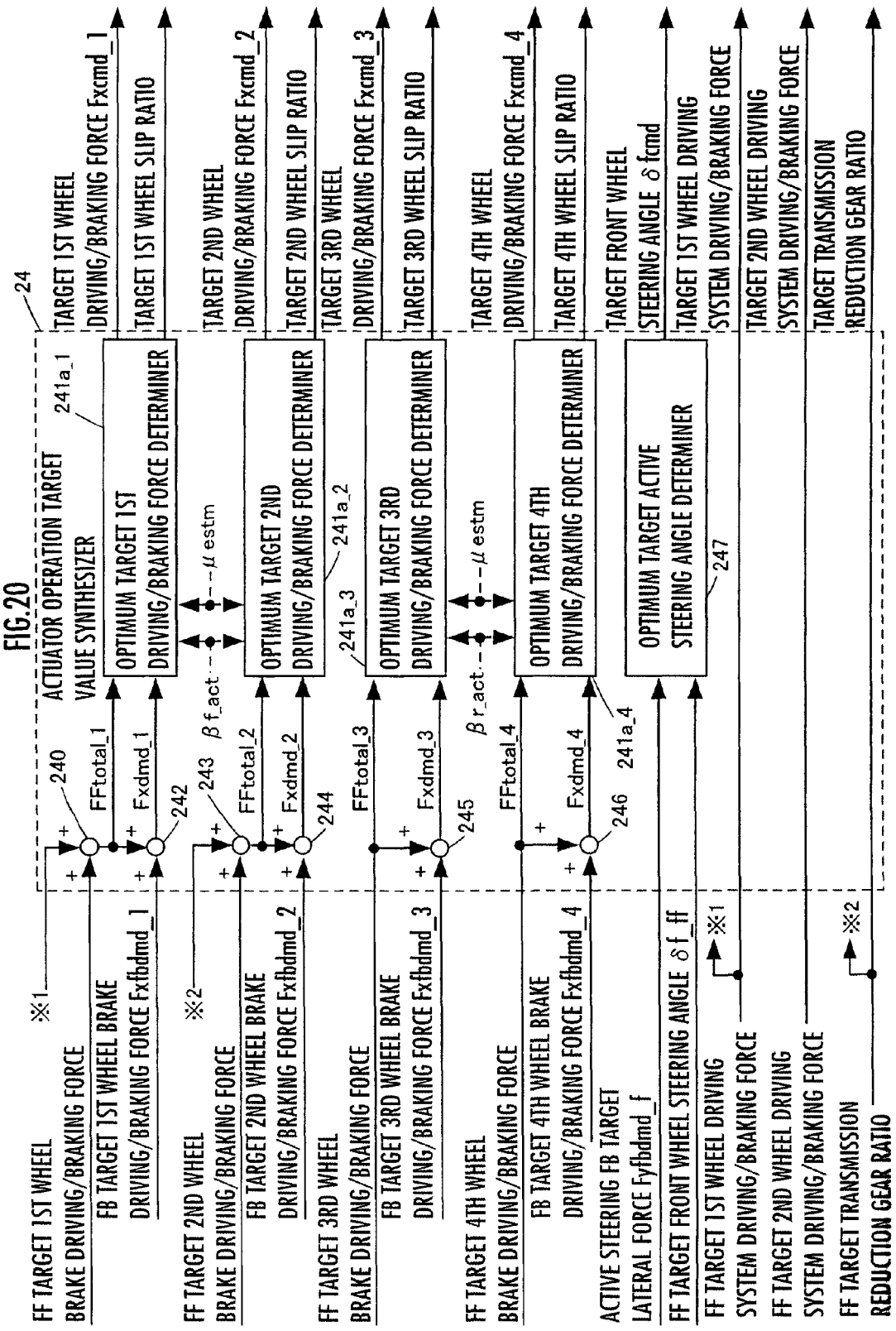
FIG. 20 is a functional block diagram illustrating the processing by an actuator operation target value synthesizer in the first embodiment.
Figure 21:
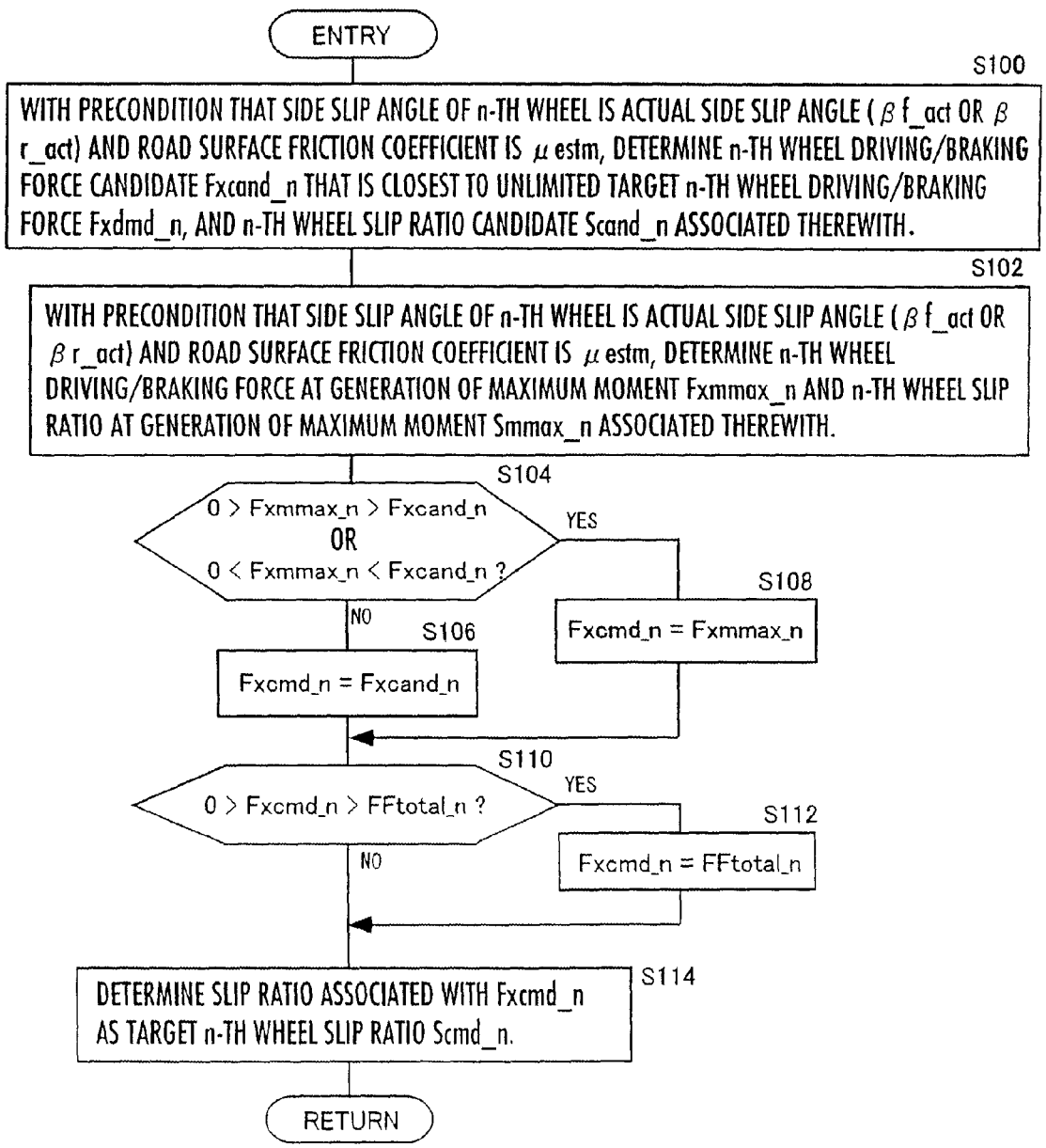
FIG. 21 is a flowchart illustrating the processing by an optimum target n-th wheel driving/braking force determiner provided in the actuator operation target value synthesizer in the first embodiment.
Figure 22:
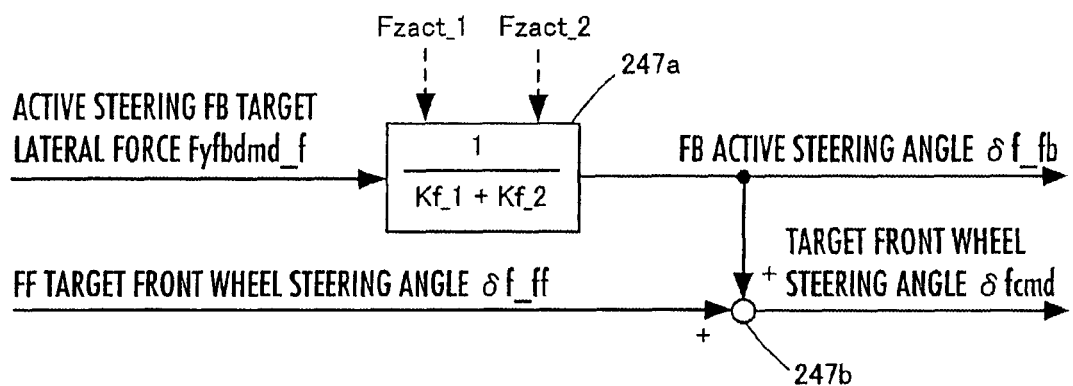
FIG. 22 is a functional block diagram illustrating the processing by an optimum target active steering angle determiner provided in the actuator operation target value synthesizer in the first embodiment.
Figure 23:
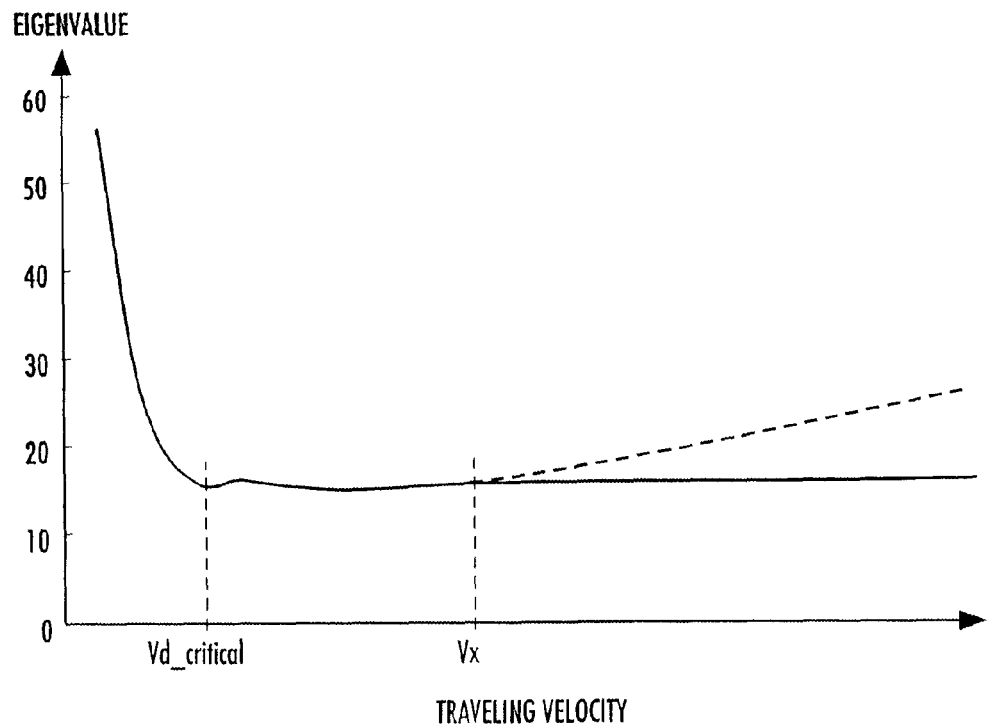
FIG. 23 is a graph illustrating the relationship between the eigenvalues of a model vehicle and the traveling velocities of a vehicle in a third embodiment.
Figure 24A:
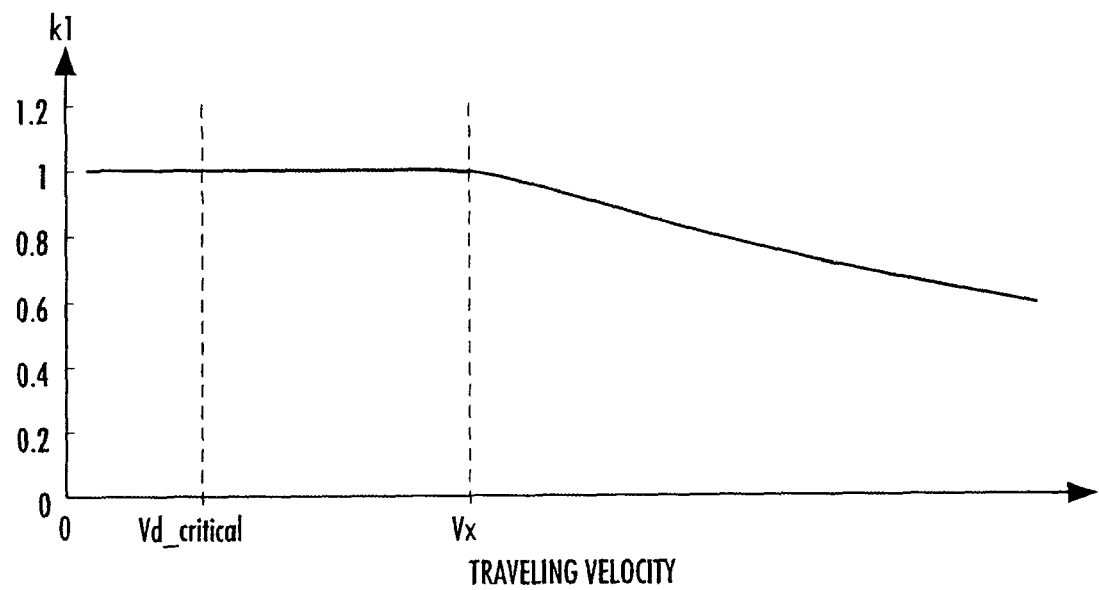
FIGS. 24(*a*) and 24(*b*) are a graph illustrating selling examples of model characteristics adjusting parameters k1 and k2 in the third embodiment.
Figure 24B:
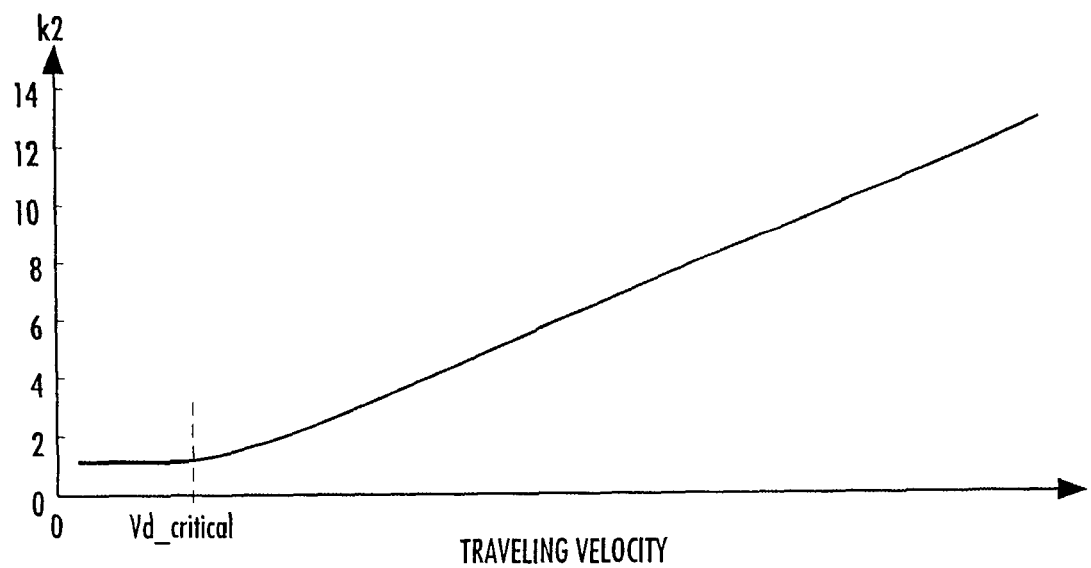

The invention claimed is:

1. A vehicle control device equipped with a drive manipulated variable detecting element configured to detect a drive manipulated variable that indicates a state of drive manipulation of a vehicle by a driver of the vehicle having a plurality of wheels, an actuator device provided in the vehicle so as to permit the manipulation of a predetermined motion of the vehicle, an actual state amount grasping element configured to detect or estimate an actual state amount vector, which is a set of the values of a plurality of types of state amounts related to a predetermined motion of an actual vehicle, a model state amount determining element configured to determine a model state amount vector, which is a set of the values of a plurality of types of state amounts of a vehicle on a vehicle model established beforehand as a model representing the dynamic characteristic of the vehicle, and a state amount error calculating element configured to calculate a state amount error, which is the difference between the value of each type of state amount of the detected or estimated actual state amount vector and the value of a state amount of each type of the determined model state amount vector, to control the operation of at least the actuator device such that the state amount error approximates zero, the vehicle control device comprising:

a state amount error response control element configured to determine an actual vehicle actuator operation control input for operating the actuator device of the actual vehicle and a vehicle model operation control input for manipulating a motion of the vehicle on the vehicle model on the basis of at least the calculated state amount error such that the state amount error approximates zero;

an actuator device control element configured to control the operation of the actuator device on the basis of at least the determined actual vehicle actuator operation control input;

the model state amount determining element being configured to determine the model state amount vector on the basis of at least the detected drive manipulated variable and the determined vehicle model operation control input; and a vehicle model characteristics setting element configured to variably set the value of at least one parameter of the vehicle model on the basis of a motional state of the actual vehicle such that an attenuation property of the value of each type of state amount of the model state amount vector based on a stepped change in the drive manipulated variable in a state wherein the vehicle model operation control input is maintained at zero turns into a high attenuation characteristic which is a characteristic higher than the attenuation property of the value of each type of state amount of the actual state amount vector based on a stepped change in the drive manipulated variable in a state wherein the actual vehicle actuator operation control input is maintained at zero.

2. The vehicle control device according to claim 1, wherein the high attenuation characteristic is a critical-braking or over-braking response characteristic.

3. The vehicle control device according to claim 1, wherein the plurality of types of state amounts includes two or more types of state amounts related to a side slip and a rotation about a yaw axis of the vehicle, and the vehicle model characteristics setting element is configured to variably set the value of a parameter of the vehicle model according to the traveling velocity of the actual vehicle.

4. The vehicle control device according to claim 3, wherein the vehicle model characteristics setting element is configured to variably set the value of a parameter of the vehicle model according to the traveling velocity such that the absolute value of the eigenvalue of the vehicle model becomes a predetermined value or less at least when the traveling velocity is higher than a predetermined velocity.

5. The vehicle control device according to claim 1, wherein the vehicle model characteristics setting element is configured to variably set the value of a parameter of the vehicle model such that the relationship between the steady-state value of the drive manipulated variable when the drive manipulated variable is changed in steps in a state wherein the vehicle model operation control input is maintained at zero and the steady-state value of each type of state amount of the model state amount vector is maintained at a certain relationship.

* * * * *